United States Patent
Yamada et al.

(10) Patent No.: US 6,236,538 B1
(45) Date of Patent: May 22, 2001

(54) MAGNETIC STRUCTURE AND MAGNETIC HEAD USING THE SAME

(75) Inventors: Naoshi Yamada; Hitoshi Ohta; Hiroshi Fukumoto; Naoya Tanaka; Yuichi Yoshida; Takuji Oda, all of Amagasaki (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/136,123

(22) Filed: Oct. 14, 1993

(30) Foreign Application Priority Data

Oct. 20, 1992 (JP) .................................. 4-281419
Sep. 20, 1993 (JP) .................................. 5-233136

(51) Int. Cl.[7] .................................................. G11B 5/147
(52) U.S. Cl. .................................................... 360/126
(58) Field of Search .................................. 360/123, 125, 360/126

(56) References Cited

U.S. PATENT DOCUMENTS

| | | | |
|---|---|---|---|
| 3,881,244 | 5/1975 | Kendall | 29/602 |
| 4,044,394 | * 8/1977 | Hanazono et al. | 360/123 |
| 4,149,205 | * 4/1979 | Berghof et al. | 360/123 |
| 4,275,428 | 6/1981 | Lehureau | 360/121 |
| 4,439,793 | 3/1984 | Nater | 360/121 |
| 4,477,853 | 10/1984 | Lemke | 360/125 |
| 4,539,615 | 9/1985 | Arai | 360/121 |
| 4,550,492 | 11/1985 | Lemke | 360/121 |
| 4,743,988 | 5/1988 | Sato et al. | 360/121 |
| 4,809,103 | 2/1989 | Lazzari | 360/103 |
| 4,825,532 | 5/1989 | Ricards | 360/122 |
| 5,029,031 | 7/1991 | Sakata | 360/121 |
| 5,065,271 | 11/1991 | Matsuura | 360/126 |
| 5,122,917 | * 6/1992 | Spainger | 360/126 |
| 5,146,378 | 9/1992 | Makino | 360/121 |
| 5,189,580 | * 2/1993 | Pisharody et al. | 360/123 |

FOREIGN PATENT DOCUMENTS

| | | | |
|---|---|---|---|
| 32230 | * 7/1981 | (EP) | 360/126 |
| 0197158 | 4/1986 | (EP) | . |
| 364986 | 4/1990 | (EP) | . |
| 379324 | 7/1990 | (EP) | . |
| 0 463 908 | 1/1992 | (EP) | . |
| 650997 | 3/1951 | (GB) | . |
| 695150 | 8/1953 | (GB) | . |
| 801982 | 9/1958 | (GB) | . |
| 1 433 902 | 4/1976 | (GB) | . |
| 2 039 124 | 7/1980 | (GB) | . |
| 2057177 | 3/1981 | (GB) | . |
| 2265045 | 9/1993 | (GB) | . |
| 59-002221 | 1/1984 | (JP) | . |
| 2-179910 | 7/1990 | (JP) | . |
| 4-206012 | 7/1992 | (JP) | . |
| 4-360006 | 12/1992 | (JP) | . |
| WO 82/01615 | 5/1982 | (WO) | . |

* cited by examiner

*Primary Examiner*—George J. Letscher
(74) *Attorney, Agent, or Firm*—Burns, Doane, Swecker & Mathis, LLP

(57) ABSTRACT

A magnetic structure and a magnetic head capable of reducing the size thereof and raising the degree of integration is disclosed which has a structure including a substrate having a plurality of ridge-like projections each having slant side-surfaces; the substrate having thereon: a first conductive passage consisting of a plurality of parallel and conductive passages each of which is formed on opposing slant surfaces of adjacent projections and on the bottom surface between the slant surfaces; a first insulating layer stacked on the first conductive passage and the substrate; a magnetic core made of magnetic material enclosed in a groove-shape recess formed by the adjacent projections and the bottom surface; a second insulating layer stacked on the magnetic core; and a second conductive passage formed on the second insulating layer to sequentially connect ends of the first conductive passage to form a helical coil, wherein the magnetic core is separated by the projection so that a plurality of coils are integrally formed on the same substrate.

10 Claims, 53 Drawing Sheets

11a  11c  11b
   \___ ___/
       11

11a  11c  11b
   \___ ___/
       11

MAGNETIC STRUCTURE AND MAGNETIC HEAD USING THE SAME

BACKGROUND OF THE INVENTION

1. Field of the Invention

The present invention relates to a magnetic structure, for example, a magnetic head to be mounted on a magnetic recording/reproducing apparatus, such as a video cassette tape recorder or an audio tape recorder, and more particularly to a multi-channel magnetic head adaptable to a high density recording/reproducing operation in which data must be simultaneously recorded/reproduced to and from an array composed of a multiplicity of head chips.

2. Description of the Related Art

A magnetic recording apparatus, such as a digital VCR for recording video signals by a PCM (Pulse Code Modulation) method or a high grade VCR for recording high grade video signals, must record a considerably large quantity of signals as compared with a conventional household VCR or a digital audio tape recorder. Therefore, wide band signals as compared with the foregoing conventional apparatuses must be recorded/reproduced. Since a multi-track recording method is effective to record/reproduce the wide band signals, a multi-channel magnetic head has been suggested. In order to reduce the size and the weight of the magnetic recording apparatus and to enlarge the recording capacity, the track must be narrowed and the relative speed between the magnetic recording medium and the head must be decreased. However, the foregoing structure raises a problem in that a reproduction signal having a sufficient S/N ratio cannot easily be obtained. Therefore, a magnetic head comprising a multiplex-winding coil and a recording/reproducing combined type head has been suggested in order to obtain a reproduction signal having a sufficient S/N ratio even if the relative speed is not sufficient high.

The multi-channel magnetic head is categorized to a magnetic head comprising a single head chip of a plural-bulk type which is secured to the base thereof and a magnetic head having an arrangement that a multiplicity of thin-film head chips are formed on the same substrate. The latter thin-film type magnetic head exhibits an advantage in terms of facility of narrowing the track and improving the relative positional accuracy between the magnetic gaps. The multi-channel thin-film magnetic head has been disclosed in Japanese Patent Laid-Open No. 4-186511, Japanese Patent Laid-Open No. 4-188414, Japanese Patent Laid-Open No. 2-179910, Japanese Patent Laid-Open No. 62-31013, Japanese Patent Laid-Open No. 61-39914 and Japanese Patent Laid-Open No. 58-94120. The multi-channel magnetic head of the recording/reproducing combined type has been disclosed in Japanese Patent Laid-Open No. 2-94014.

The conventional multi-channel thin-film magnetic head is categorized to a type arranged as shown in FIG. 68A and comprising a magnetic head chip having a multiplicity of spiral-type coils and to a type arranged as shown in FIG. 68B and comprising a magnetic head chip having a helical coil. Referring to FIGS. 68A and 68B, reference numeral 1 represents a substrate, 25 represents a spiral coil, 26 represents a helical coil, and 31 represents a magnetic core. The magnetic head chip comprising the spiral coil exhibits an advantage that it can easily be manufactured and the insulation of the coil can easily be realized. However, the fact that the area is enlarged if the number of turns is increased for the purpose of obtaining a satisfactory reproduction signal output undesirably widens the intervals between the magnetic head chips at the time of integrating a multiplicity of the magnetic head chips, and therefore, there arises a problem in that the track cannot easily be narrowed.

The magnetic head chip having the helical coil shown in FIG. 68B enables narrowing of the track and increasing in the number of turns to be realized easily. However, limitations present in the size of the magnetic head inhibit to obtain a sufficiently large number of turns and therefore a problem is raised in that the S/N ratio of the reproduction signal is lowered. Further, the structure arranged in such a manner that the coil 26a and the magnetic core 31 are integrally formed by a lithography technology inhibits satisfactorily thickening the magnetic core 31 at the time of forming the coil 26. In this case, there arises a problem in that the recording/reproducing efficiency cannot easily be improved.

If the connection between the coil of the magnetic head chip and an external electric circuit is established by a conventional method in which the electrode pads disposed at both ends of each coil are bonded or connected by making use of connectors, the number of connections is greatly increased in a case of a multi-channel structure comprising tens to hundreds of tracks. In this case, there arises a problem that reliability deteriorates and connection cannot easily be established because the diameter of the connection cable cannot be reduced. What is worse, the size of the electrode pad sometimes limits the intervals between the magnetic head chips. Therefore, a problem rises in that the magnetic head chips cannot easily be disposed at intervals shorter than the size of the electrode pad.

The conventional multi-channel thin-film magnetic head encounters a problem in that a satisfactory tracking operation cannot be performed if the track width and the track angle have been changed due to expansion/contraction of the magnetic recording medium occurring due to heat.

SUMMARY OF THE INVENTION

The present invention is directed to overcome the foregoing problems and, accordingly, an object of the present invention is to provide a magnetic structure and a magnetic head capable of reducing the size thereof and raising the degree of integration.

According to one aspect of the present invention claimed in claim 1, there is provided a magnetic structure comprising a substrate having a groove-shape recess having slant side-surfaces, the substrate having thereon: a first conductive passage consisting of a plurality of parallel and conductive passages formed on the two side surface and the bottom surface of the recess; a first insulating layer stacked on the first conductive passage and the substrate; a magnetic core made of magnetic material enclosed in the recess; a second insulating layer stacked on the magnetic core; and a second conductive passage formed on the second insulating layer to sequentially connect ends of the first conductive passage to form a helical coil.

According to another aspect of the present invention claimed in claim 2, there is provided a magnetic structure comprising a substrate having a plurality of ridge-like projections each having slant side-surfaces; the substrate having thereon: a first conductive passage consisting of a plurality of parallel and conductive passages each of which is formed on opposing slant surfaces of adjacent projections and on the bottom surface between the slant surfaces; a first insulating layer stacked on the first conductive passage and the substrate; a magnetic core made of magnetic material enclosed in a groove-shape recess formed by the adjacent projections and the bottom surface; a second insulating layer stacked on the magnetic core; and a second conductive passage formed on the second insulating layer to sequentially connect ends of the first conductive passage to form a helical coil, wherein the magnetic core is separated by the projection so that a plurality of coils are integrally formed on the same substrate.

According to another aspect of the present invention claimed in claim 3, there is provided a magnetic head comprising: a substrate on which a plurality of ridge-like projections each having slant side surfaces and having different lengths are at least disposed in such a manner that longer projections are disposed on the two sides of each of short projections; a first conductive passage consisting of a plurality of parallel and conductive passages each of which is formed on opposing slant surfaces of an adjacent short projection and a long projection and on the bottom surface between the slant surfaces; a first insulating layer stacked on the first conductive passage and the substrate; a magnetic core made of magnetic material enclosed in a groove-shape recess formed by the adjacent projections and the bottom surface; a magnetic gap made of magnetic material formed in the magnetic core on the side adjacent to a magnetic recording medium sliding surface; a second insulating layer stacked on the magnetic core; and a second conductive passage formed on the second insulating layer to sequentially connect ends of the first conductive passage to form the first conductive passage formed on the two sides of the short projection into one helical coil, wherein the magnetic core is separated by the long projections so that a plurality of magnetic head chips are integrally formed on the same substrate.

According to another aspect of the present invention claimed in claim 4, there is provided a magnetic head comprising: a substrate having a plurality of ridge-like projections each having slant side surfaces; a first conductive passage consisting of a plurality of parallel and conductive passages each of which is formed on opposing slant surfaces of adjacent projections and the bottom surface between the slant surfaces; a first insulating layer stacked on the first conductive passage and the substrate; a first magnetic core made of magnetic material enclosed in a groove-shape recess formed by the adjacent projections and the bottom surface; a second conductive passage formed on the first magnetic core while interposing a second insulating layer to sequentially connect the first conductive passage ends as to form helical coils; a non-magnetic insulating layer stacked on the first magnetic core on the side adjacent to a magnetic recording medium sliding surface and on the second conductive passage to form a magnetic gap; a third conductive passage composed of a plurality of parallel and conductive passages formed on the non-magnetic insulating layer; a third insulating layer stacked on the third conductive passage; a second magnetic core made of magnetic material stacked to be formed into ridge-like projections each having slant surfaces on the non-magnetic insulating layer and the third insulating layer; a fourth insulating layer stacked on the two side surfaces and the top surface of the second magnetic core; and a fourth conductive passage formed on the fourth insulating layer to form helical coils by sequentially connecting the third conductive passage ends, wherein a plurality of magnetic head chips are integrally formed.

According to another aspect of the present invention claimed in claim 5, there is provided a magnetic head comprising: a substrate having, at substantially the same positions on the top surface and the lower surface thereof, a plurality of ridge-like projections each having slant side surfaces, the substrate having bottom surfaces, each of which is disposed between adjacent projections, the length of which is shorter than that of the projection and each of which has end surfaces recessed from the end surfaces of the projection; a first conductive passage formed on the top surface of the substrate and a third conductive passage formed on the lower surface of the same, the first conductive passage and the third conductive passage respectively being disposed on the facing slant surfaces of adjacent projections, which are formed on the top surface and the lower surface, and the bottom surface between the slant surfaces, and composed of a plurality of parallel and conductive passages; a first insulating layer stacked on the first conductive passage; a third insulating layer stacked on the third conductive passage; a first magnetic core formed on the upper surface and a second magnetic core formed on the lower surface, the first magnetic core and the second magnetic core being made of magnetic material enclosed from the upper surfaces of the first and third insulating layers to the two end surfaces of the projection projecting over the two end surfaces of the bottom surface; a magnetic gap made of non-magnetic material formed on the magnetic core on the side adjacent to a magnetic recording medium sliding surface; second and fourth insulating layers respectively stacked on the first and second magnetic cores; a second conductive passage formed on the second insulating layer as to sequentially connect the first conductive passage ends to form a helical coil; and a fourth conductive passage formed on the lower surface of the fourth insulating layer to sequentially connect the third conductive passage ends to form a helical coil, wherein a plurality of magnetic head chips are integrally formed.

According to another aspect of the present invention claimed in claim 6, there is provided a magnetic head comprising a second magnetic core made of magnetic material formed on the first and second conductive passage according to claim 2 while interposing a non-magnetic insulating layer for forming the magnetic gap, wherein a plurality of magnetic head chip are integrally formed on the same substrate.

According to another aspect of the present invention claimed in claim 7, there is provided a magnetic head according to any one of claims 1 to 6, wherein the first conductive passage is formed from the bottom surface of a groove-shape recess to the two side surfaces and the top surface of the same.

According to another aspect of the present invention claimed in claim 8, there is provided a magnetic structure and a magnetic head according to any one of claims 1 to 6, wherein the first conductive passage is formed from a recess formed on the top surface of a groove-shape recess to the two side surfaces and the top surface of the same.

According to another aspect of the present invention claimed in claim 9, there is provided a magnetic structure and a magnetic head according to any one of claims 1 to 8, wherein the first conductive passage is at least formed in a groove portion formed from the bottom surface to the side surfaces of the groove-shape recess.

According to another aspect of the present invention claimed in claim 10, there is provided a magnetic head comprising, on a common substrate thereof, a plurality of magnetic head chips each having a magnetic core, a coil and a magnetic gap, the magnetic head, wherein a power supply line, means for establishing the electrical connections between the power supply line and each coil of the magnetic head chips, and means for controlling the electrical connections are integrally formed with the substrate.

According to another aspect of the present invention claimed in claim 11, there is provided a magnetic head having a plurality of magnetic head chips on a common substrate thereof, the magnetic head comprising: a reproduction signal amplifying circuit formed integrally with the substrate.

According to another aspect of the present invention claimed in claim 12, there is provided a magnetic head having, on a substrate thereof, a plurality of magnetic head chips each having a coil, the magnetic head comprising: means for reciprocating the substrate in a direction in which the head chips are disposed, wherein the substrate is reciprocated in the direction, in which the head chips are disposed, at an amplitude shorter than the shortest recording wavelength of the magnetic recording medium and as well as at a speed sufficiently higher than the speed at which the magnetic recording medium is moved so that a signal recorded on the magnetic recording medium is reproduced.

According to another aspect of the present invention claimed in claim 13, there is provided a magnetic head having a plurality of magnetic head chips formed on a common substrate thereof, the magnetic head comprising: means for causing a direction in which the magnetic head chips are disposed on the substrate to be diagonal with respect to a direction in which the magnetic recording medium is moved; and means for rotating the substrate around an axis perpendicular to the recording surface, wherein the substrate is rotated by the rotating means to reproduce a signal recorded on the magnetic recording medium while making a magnetic gap of at least one magnetic head chip to coincide with each track of the magnetic recording medium.

According to another aspect of the present invention, there is provided a magnetic head having a plurality of magnetic head chips formed on a common substrate thereof, the magnetic head comprising: means for causing a direction in which the magnetic head chips are disposed on the substrate to be diagonal with respect to a direction in which the magnetic recording medium is moved; means for rotating the substrate around an axis perpendicular to the recording surface; and means for translating the substrate in a direction of the width of the magnetic recording medium, wherein the substrate is translated and rotated by the translating means and the rotating means to reproduce a signal recorded on the magnetic recording medium while making a magnetic gap of at least one magnetic head chip to coincide with the direction of each track of the magnetic recording medium.

According to another aspect of the present invention, there is provided a magnetic head comprising: a plurality of magnetic head chips formed on a common substrate thereof, wherein a direction in which the magnetic head chips are disposed on the substrate is caused to be diagonal with respect to a direction in which the magnetic recording medium is moved, and a plurality of the substrates are disposed in a direction of the width of the magnetic recording medium, the substrate having, in a direction in which the magnetic head chips are disposed, a length shorter than the width of the recording medium when the length is projected to a direction of the width of the magnetic recording medium.

According to another aspect of the present invention, there is provided a magnetic recording head comprising: a plurality of magnetic head chips formed on a common substrate thereof, wherein a plurality of the substrates, on which all magnetic gaps of the magnetic head chips are made to be the same angle, are disposed in a direction in which the magnetic recording medium is moved, and the substrates are disposed in such a manner that at least two angles are made by directions in which the magnetic head chips are disposed from a direction in which the magnetic recording medium is moved so that at least two azimuth angles are made.

According to another aspect of the present invention, there is provided a magnetic recording head comprising: a plurality of magnetic head chips on a common substrate thereof, wherein the shape of the substrate on the side adjacent to a magnetic recording medium sliding surface is curved surface in a direction in which the magnetic head chips are disposed, and the curved surface projects toward the magnetic recording medium.

The magnetic structure claimed in claim 1 of the present invention comprises the substrate having the groove-shape recess having the slant side-surfaces, the substrate having thereon: the first conductive passage consisting of the plurality of the parallel and conductive passages formed on the two side surface and the bottom surface of the recess; the first insulating layer stacked on the first conductive passage and the substrate; the magnetic core made of the magnetic material enclosed in the recess; the second insulating layer stacked on the magnetic core; and the second conductive passage formed on the second insulating layer to sequentially connect the ends of the first conductive passage to form the helical coil. Therefore, the number of turns of the coil can be increased while eliminating the necessity of enlarging the track intervals. As a result, the coil can easily be formed even if the magnetic core is thickened. Further, a plurality of helical coils having the same number of turns or different number of turns can be formed on the common magnetic core.

The magnetic structure claimed in claim 2 of the present invention comprises the substrate having the plurality of the ridge-like projections each having the slant side-surfaces; the substrate having thereon: the first conductive passage consisting of the plurality of the parallel and conductive passages each of which is formed on the opposing slant surfaces of the adjacent projections and on the bottom surface between the slant surfaces; the first insulating layer stacked on the first conductive passage and the substrate; the magnetic core made of the magnetic material enclosed in the groove-shape recess formed by the adjacent projections and the bottom surface; the second insulating layer stacked on the magnetic core; and the second conductive passage formed on the second insulating layer to sequentially connect the ends of the first conductive passage to form the helical coil, wherein the magnetic core is separated by the projection so that the plurality of the coils are integrally formed on the same substrate. Therefore, the magnetic cores of the multiplicity of magnetic structure can assuredly be separated by the projections formed on the substrate. Since the coils are formed by making use of slant surfaces of the projections, the helical coils can assuredly be formed on thick magnetic core. Since the magnetic structures can accurately and integrally be formed on the same substrate, magnetic structures having uniform characteristics can be manufactured. The number of turns of the coil can be increased and the coils can be formed even if the magnetic core is thick. Further, a multiplicity of magnetic structures can be densely disposed while preventing cross talk.

The magnetic head claimed in claim 3 of the present invention comprises: the substrate on which the plurality of the ridge-like projections each having the slant side surfaces and having the different lengths are at least disposed in such a manner that the longer projections are disposed on the two sides of each of the short projections; the first conductive passage consisting of the plurality of the parallel and conductive passages each of which is formed on the opposing slant surfaces of the adjacent short projection and the long projection and on the bottom surface between the slant surfaces; the first insulating layer stacked on the first conductive passage and the substrate; the magnetic core made of the magnetic material enclosed in the groove-shape recess formed by the adjacent projections and the bottom surface; the magnetic gap made of the magnetic material formed in the magnetic core on the side adjacent to the magnetic recording medium sliding surface; the second insulating layer stacked on the magnetic core; and the second conductive passage formed on the second insulating layer to sequentially connect the ends of the first conductive passage to form the first conductive passage formed on the two sides of the short projection into the one helical coil, wherein the magnetic core is separated by the long projections so that the plurality of the magnetic head chips are integrally formed on the same substrate. Therefore, mutliplex-winding type coils can be formed while preventing enlargement of intervals, and the coils can be formed even if the magnetic core is thickened. Since the coils for a plurality of channels are integrally formed, the relative position between the respective magnetic gaps can easily be made precise.

The magnetic head claimed in claim 4 of the present invention comprises: the substrate having the plurality of the ridge-like projections each having the slant side surfaces; the first conductive passage consisting of the plurality of the parallel and conductive passages each of which is formed on the opposing slant surfaces of the adjacent projections and the bottom surface between the slant surfaces; the first insulating layer stacked on the first conductive passage and the substrate; the first magnetic core made of the magnetic material enclosed in the groove-shape recess formed by the adjacent projections and the bottom surface; the second conductive passage formed on the first magnetic core while interposing the second insulating layer to sequentially connect the first conductive passage ends as to form the helical coils; the non-magnetic insulating layer stacked on the first magnetic core on the side adjacent to the magnetic recording medium sliding surface and on the second conductive passage to form the magnetic gap; the third conductive passage composed of the plurality of the parallel and conductive passages formed on the non-magnetic insulating layer; the third insulating layer stacked on the third conductive passage; the second magnetic core made of the magnetic material stacked to be formed into the ridge-like projections each having the slant surfaces on the non-magnetic insulating layer and the third insulating layer; the fourth insulating layer stacked on the two side surfaces and the top surface of the second magnetic core; and the fourth conductive passage formed on the fourth insulating layer to form the helical coils by sequentially connecting the third conductive passage ends, wherein the plurality of the magnetic head chips are integrally formed. Therefore, a magnetic head can be provided, the number of turns of which can easily be increased, in which the intervals can be shorted significantly, and which exhibits accurate length of the magnetic gap and the relative position.

The magnetic head claimed in claim 5 of the present invention comprises: the substrate having, at substantially the same positions on the top surface and the lower surface thereof, the plurality of the ridge-like projections each having the slant side surfaces, the substrate having the bottom surfaces, each of which is disposed between the adjacent projections, the length of which is shorter than that of the projection and each of which has the end surfaces recessed from the end surfaces of the projection; the first conductive passage formed on the top surface of the substrate and the third conductive passage formed on the lower surface of the same, the first conductive passage and the third conductive passage respectively being disposed on the facing slant surfaces of the adjacent projections, which are formed on the top surface and the lower surface, and the bottom surface between the slant surfaces, and composed of the plurality of the parallel and conductive passages; the first insulating layer stacked on the first conductive passage; the third insulating layer stacked on the third conductive passage; the first magnetic core formed on the upper surface and the second magnetic core formed on the lower surface, the first magnetic core and the second magnetic core being made of the magnetic material enclosed from the upper surfaces of the first and third insulating layers to the two end surfaces of the projection projecting over the two end surfaces of the bottom surface; the magnetic gap made of the non-magnetic material formed on the magnetic core on the side adjacent to the magnetic recording medium sliding surface; the second and fourth insulating layers respectively stacked on the first and second magnetic cores; the second conductive passage formed on the second insulating layer as to sequentially connect the first conductive passage ends to form the helical coil; and the fourth conductive passage formed on the lower surface of the fourth insulating layer to sequentially connect the third conductive passage ends to form the helical coil, wherein the plurality of magnetic head chips are integrally formed. Therefore, disposition of the coils on the upper surface of the substrate and the lower surface of the same enables the distance between coils of the magnetic head for the plural channels can be lengthened. Therefore, the mutual influence of the coils can be eliminated considerably. Further, a magnetic head can be provided, the number of turns of which can easily be increased, in which the intervals can be shorted significantly, and which exhibits accurate length of the magnetic gap and the relative position.

The magnetic head claimed in claim 6 of the present invention comprises the second magnetic core made of the magnetic material formed on the first and second conductive passage according to claim 2 while interposing the non-magnetic insulating layer for forming the magnetic gap, wherein the plurality of the magnetic head chip are integrally formed on the same substrate. Therefore, magnetic heads for the plural channels formed into a narrow-track structure in which exciting magnetic pole and magnetic pole to be excited are disposed while interposing the magnetic gap can easily be formed. In particular, multi-channel magnetic heads suitable to vertical magnetic recording operation can be provided.

The magnetic head claimed in claim 7 of the present invention and according to any one of claims 1 to 6 has the arrangement that the first conductive passage is formed from the bottom surface of the groove-shape recess to the two side surfaces and the top surface of the same. Therefore, the allowance of the positional error of the contact hole at the time of forming the helical coil surrounding the magnetic core can be enlarged, causing the reliability to be improved and the manufacturing cost to be reduced.

The magnetic head claimed in claim 8 of the present invention and according to any one of claims 1 to 6 has the arrangement that the first conductive passage is formed from the recess formed on the top surface of the groove-shape recess to the two side surfaces and the top surface of the same. Therefore, the allowance of the positional error of the contact hole at the time of forming the helical coil surrounding the magnetic core can be enlarged, causing the reliability to be improved and the manufacturing cost to be reduced. Further, the conductive passages formed on the top surface of the substrate can assuredly be separated from each other, and therefore, insulation can be maintained.

The magnetic head claimed in claim 9 of the present invention and according to any one of claims 1 to 8 has the arrangement that the first conductive passage is at least formed in the groove portion formed from the bottom surface to the side surfaces of the groove-shape recess. Therefore, the magnetic core can be formed while preventing formation of projections and pits, and accordingly, a magnetic core exhibiting excellent magnetic flux efficiency can be obtained. Further, insulation between the conductive passages formed in the recess by the groove portion can be maintained.

The magnetic head claimed in claim 10 of the present invention comprises, on the common substrate thereof, the plurality of the magnetic head chips each having the magnetic core, the coil and the magnetic gap, the magnetic head, wherein the power supply line, the means for establishing the electrical connections between the power supply line and each coil of the magnetic head chips, and the means for controlling the electrical connections are integrally formed with the substrate. Therefore, the number of connections between the coils of the magnetic head chips and an external electric circuit can significantly be decreased. Further, the electrode pads can be omitted to connect the coils and the external electric circuit. Therefore, the track pitch can be shortened, the recording density can be raised and the reliability can be improved.

The magnetic head of the present invention has the plurality of the magnetic head chips on the common substrate thereof, the magnetic head comprising: the reproduction signal amplifying circuit formed integrally with the substrate. Therefore, the S/N ratio of the reproduction signal can be improved and the number of connections between the coils of the magnetic head chips and an external electric circuit can significantly be decreased.

The magnetic head of the present invention has, on the substrate thereof, the plurality of the magnetic head chips each having the coil, the magnetic head comprising: the means for reciprocating the substrate in the direction in which the head chips are disposed, wherein the substrate is reciprocated in the direction, in which the head chips are disposed, at the amplitude shorter than the shortest recording wavelength of the magnetic recording medium and as well as at the speed sufficiently higher than the speed at which the magnetic recording medium is moved so that the signal recorded on the magnetic recording medium is reproduced. Therefore, a reproduction signal having sufficiently high level voltage can be obtained even if the number of turns of the coil is too small and even if the relative speed between the recording medium and the magnetic head is unsatisfactory. Further, the size of the actuator required in the reciprocating means can be reduced.

The magnetic head of the present invention has the plurality of the magnetic head chips formed on the common substrate thereof, the magnetic head comprising: the means for causing the direction in which the magnetic head chips are disposed on the substrate to be diagonal with respect to the direction in which the magnetic recording medium is moved; and the means for rotating the substrate around the axis perpendicular to the recording surface, wherein the substrate is rotated by the rotating means to reproduce the signal recorded on the magnetic recording medium while making the magnetic gap of at least one magnetic head chip to coincide with each track of the magnetic recording medium. Therefore, reproduction can be performed while eliminating an influence of the change of the track width occurring due to expansion/contraction of the width of the tape caused from the temperature change and an influence of the change of the track angle.

The magnetic head of the present invention has the plurality of magnetic head chips formed on the common substrate thereof, the magnetic head comprising: the means for causing the direction in which the magnetic head chips are disposed on the substrate to be diagonal with respect to the direction in which the magnetic recording medium is moved; the means for rotating the substrate around the axis perpendicular to the recording surface; and the means for translating the substrate in the direction of the width of the magnetic recording medium, wherein the substrate is translated and rotated by the translating means and the rotating means to reproduce the signal recorded on the magnetic recording medium while making the magnetic gap of at least one magnetic head chip to coincide with the direction of each track of the magnetic recording medium. Therefore, reproduction can be performed while eliminating an influence of the change of the track width occurring due to expansion/contraction of the width of the tape caused from the temperature change and an influence of the change of the track angle. Further, even if deviation in the direction of the width of the magnetic recording medium takes place in the positional relationship between the magnetic recording medium and the magnetic head, it can be modified and reproduction can be performed.

The magnetic head of the present invention comprises: the plurality of magnetic head chips formed on the common substrate thereof, wherein the direction in which the magnetic head chips are disposed on the substrate is caused to be diagonal with respect to the direction in which the magnetic recording medium is moved, and the plurality of the substrates are disposed in the direction of the magnetic recording medium, the substrate having, in the direction in which the magnetic head chips are disposed, the length shorter than the width of the recording medium when the length is projected to the direction of the width of the magnetic recording medium. Therefore, the length of the magnetic head in the direction, in which the magnetic recording medium is moved, can be shortened, the contact area can be decreased and the movement resistance of the magnetic recording medium can be reduce.

The magnetic head of the present invention comprises: the plurality of the magnetic head chips formed on the common substrate thereof, wherein the plurality of the substrates, on which all magnetic gaps of the magnetic head chips are made to be the same angle, are disposed in the direction in which the magnetic recording medium is moved, and the substrates are disposed in such a manner that at least the two angles are made by directions in which the magnetic head chips are disposed from the direction of the width in which the magnetic recording medium is moved so that at least the two azimuth angles are made. Therefore, a desired azimuth angle can easily be given to the magnetic head and it can easily be manufactured.

The magnetic head of the present invention comprises: the plurality of the magnetic head chips on the common substrate thereof, wherein the shape of the substrate on the side adjacent to the magnetic recording medium sliding surface is the curved surface in the direction in which the magnetic head chips are disposed, and the curved surface projects toward the magnetic recording medium. Therefore, excellent contact of the magnetic recording medium with respect to the magnetic head can be realized.

BRIEF DESCRIPTION OF THE DRAWINGS

FIG. 20A is a perspective view which illustrates a substrate and a first conductive passage, and FIG. 20B is a perspective view which illustrates a state where magnetic material is enclosed;

DESCRIPTION OF THE PREFERRED EMBODIMENTS

Preferred embodiments of the present invention will now be described with reference to the drawings.

First Embodiment

Figure 1:
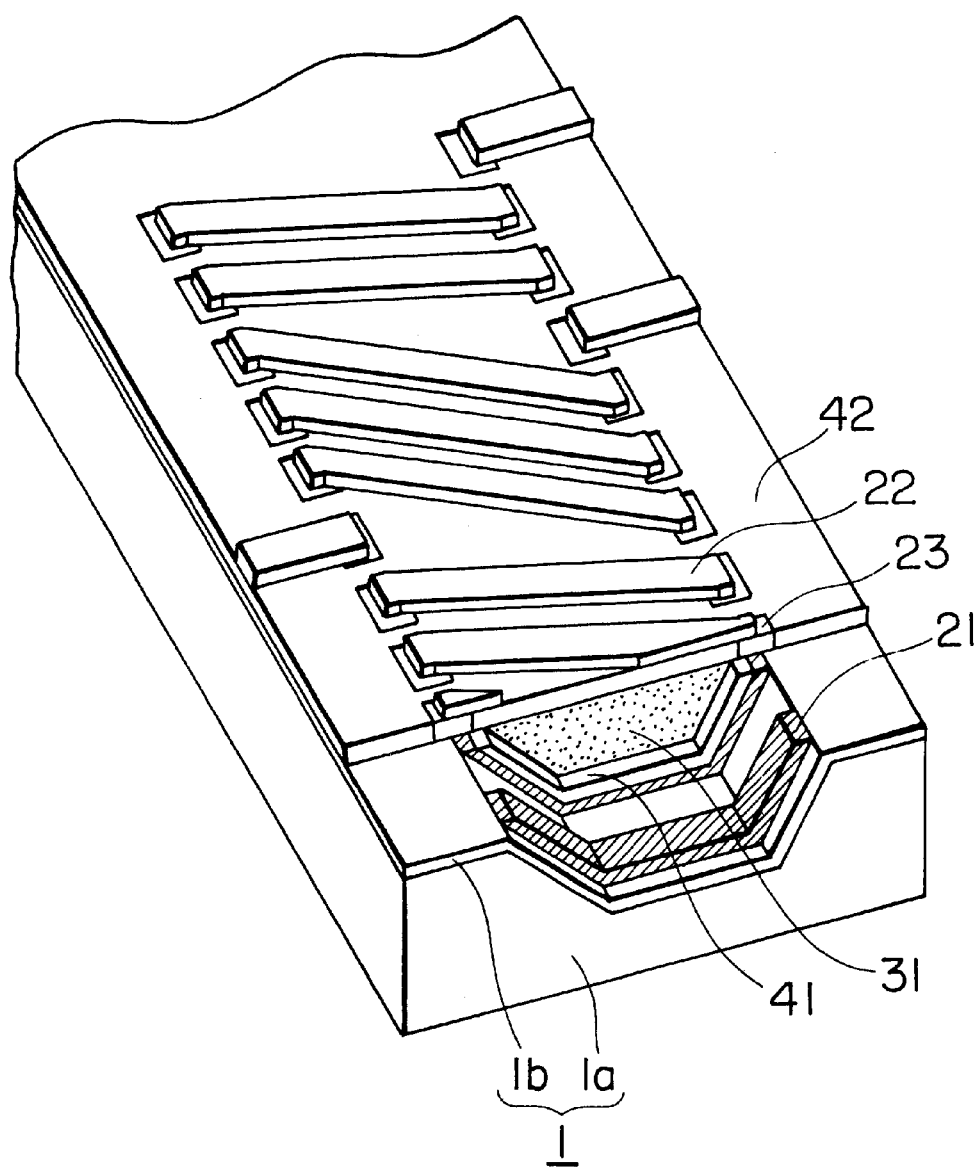
FIG. 1 is a partially-broken perspective view which illustrates a magnetic structure according to a first embodiment of the present invention.
Figure 2:
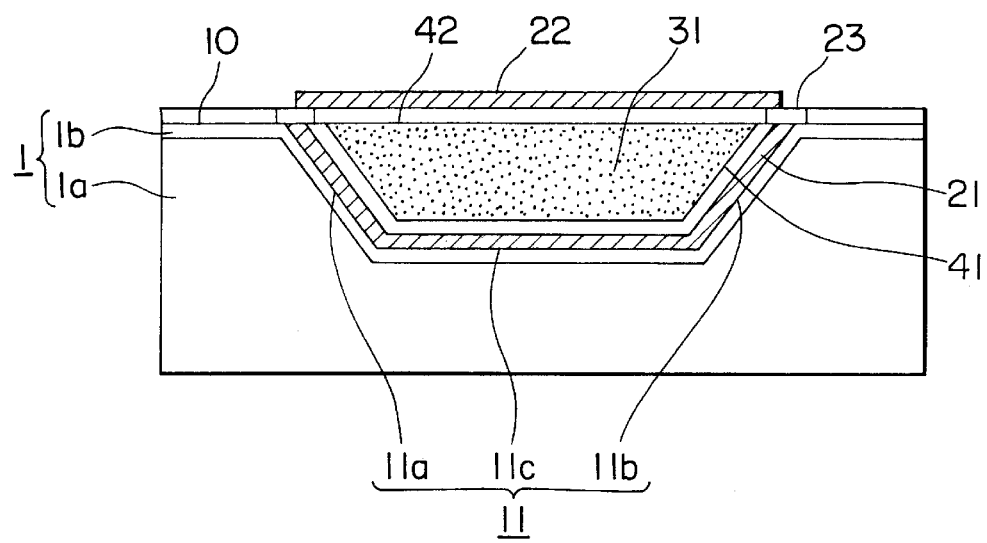
FIG. 2 is a lateral cross sectional view which illustrates the magnetic structure according to the first embodiment.
Figure 3:
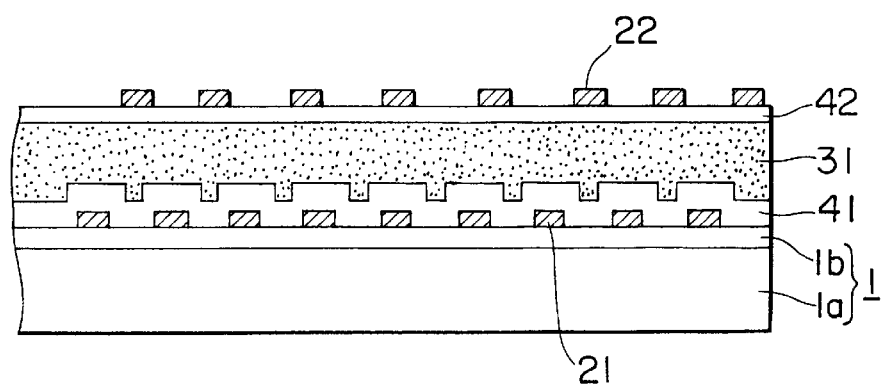
FIG. 3 is a vertical cross sectional view which illustrates the magnetic structure according to the first embodiment.
Figure 4:
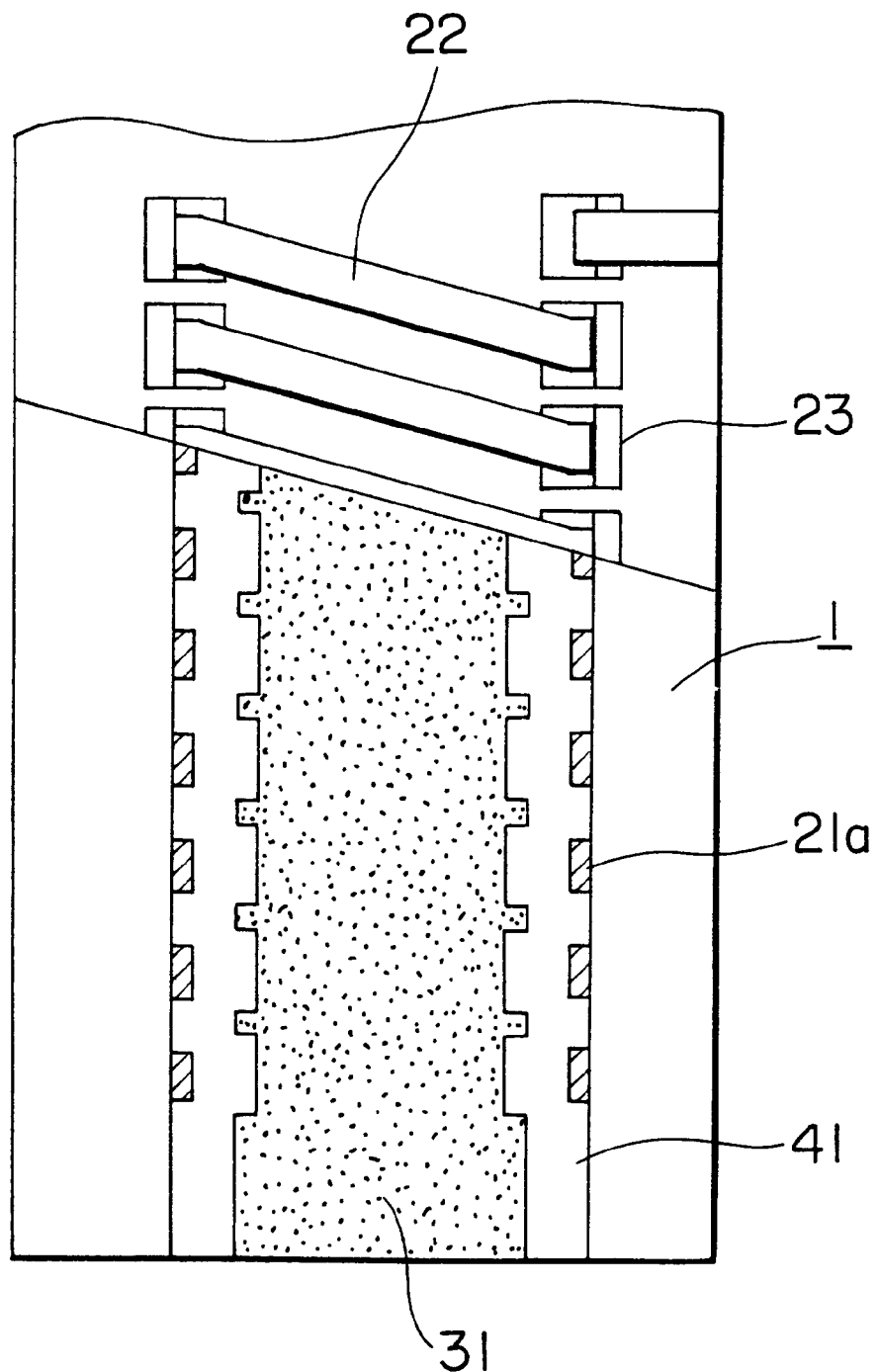
FIG. 4 is a partially-broken horizontal cross sectional view which illustrates the magnetic structure according to the first embodiment.

An embodiment of a magnetic structure claimed in claim 1 of the present invention will now be described. FIG. 1 is a broken perspective view which illustrates a magnetic structure according to a first embodiment of the present invention. FIG. 2 is a lateral cross sectional view, FIG. 3 is a vertical cross sectional view, FIG. 4 is a horizontal cross sectional view and FIG. 5 is a top view.

The magnetic structure according to this embodiment, as shown in FIG. 1, comprises a substrate 1, first conductive passages 21, second conductive passages 22, magnetic cores 31, first insulating layers 41 and second insulating layers 42. The structure is, as shown in FIG. 2, arranged in such a manner that a multiplex-winding helical coil composed of the first and second conductive passages 21 and 22 is wound around the magnetic core 31 while interposing the first and second insulating layers 41 and 42.

The substrate 1 is an insulating substrate comprising a single-crystal silicon substrate 1a and an insulating layer 1b made Of $SiO_2$ or the like, the substrate 1 having a recess 11 therein. The recess 11 is formed by side surfaces 11a, 11b and a bottom surface 11c, the side surfaces 11a and 11b being formed diagonally with respect to a substrate top surface 10. The bottom surface 11c is made substantially in parallel to the substrate top surface 10. The first conductive passages 21 formed in the recess 11 comprise a plurality of parallel and conductive passages formed on the side surfaces 11a, 11b and the bottom surface 11c and made of aluminum or copper. The first insulating layers 41 are formed for the purpose of preventing occurrence of a short circuit of the first conductive passages 21 and enhancing heat radiation from the same, the first insulating layers 41 being made of insulating material, such as $SiO_2$, having a thickness thicker than that of each of the first conductive passages 21. Since the thickness of the first insulating layer 41 is thicker than that of the first conductive passage 21, the allowance of the position and dimension error of the second conductive passages 22 and contact holes 23 can be enlarged at the time of forming the second conductive passages 22. As a result, the insulation from the magnetic core 31 can easily be realized and the manufacturing cost can be reduced. The magnetic core 31 is made of magnetic material, such as Permalloy or Sendust enclosed in the recess 11 to have a thickness thinner than the depth of the recess 11. The second insulating layer 42 is made of insulating material, such as $SiO_2$, and formed for the purpose of preventing a short cut occurring in the second conductive passages 22, conductive passages 54, 55 and 56 and enhancing heat radiation from the same. The contact holes 23 are formed in the second insulating layers 41 for the purpose of establishing the connections between end surfaces 21a of the first conductive passages 21 and the second conductive passages 22. The second conductive passages 22 comprises a plurality of parallel and conductive passages made of aluminum or copper, the second conductive passages 22 sequentially connecting the first conductive passage ends 21a by the contact holes 23 formed in the second insulating layers 42.

Figure 5:
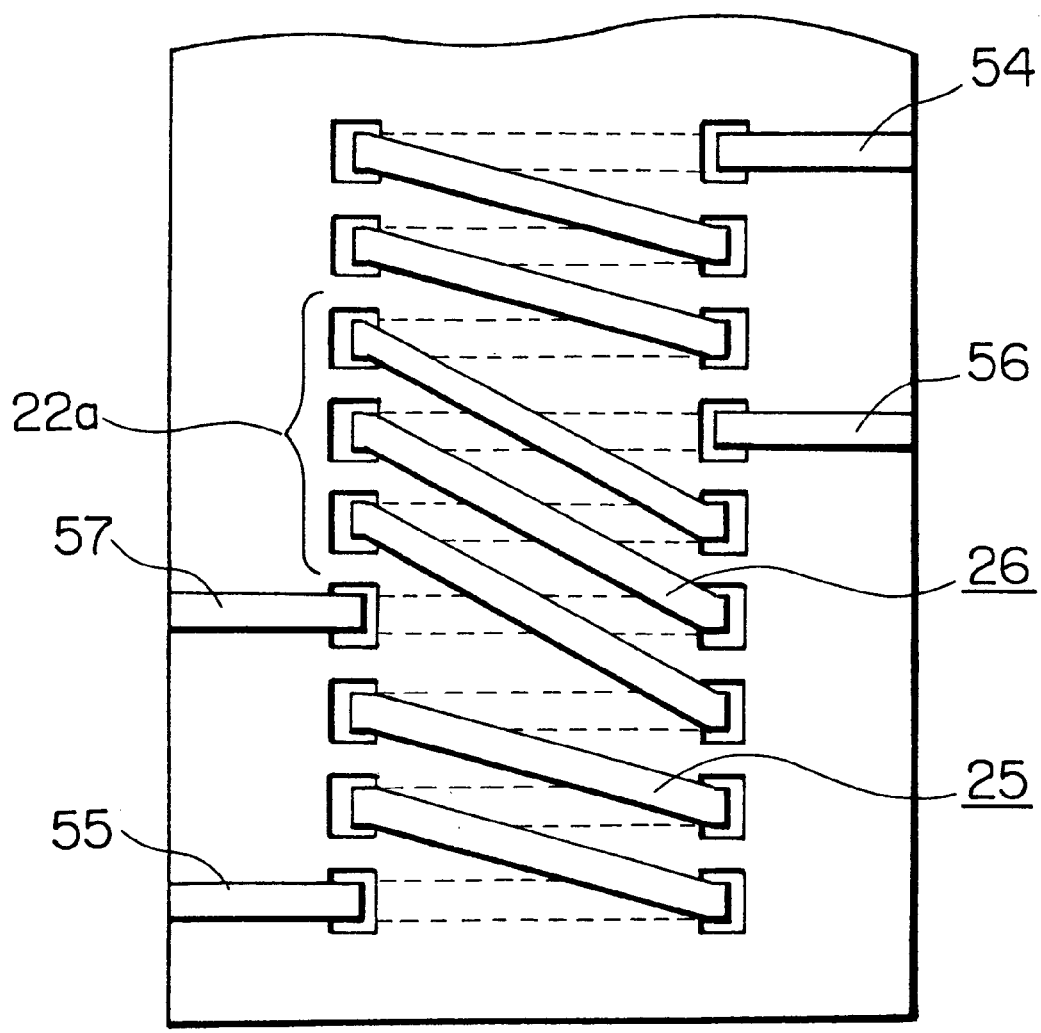
FIG. 5 is a plan view which illustrates the magnetic structure according to the first embodiment.

Since at least a portion 22a of the second conductive passages 22 is so formed, as shown in FIG. 5, that it sequentially connects every other first conductive passage end 21a, the portion 22a of the second conductive passage 22 is formed into a duplex-winding portion. Therefore, a first helical coil 25 (hereinafter abbreviated to "a coil") of a multiplex-winding type and a second coil 56 formed by a relatively small number of turns are formed by the conductive passages 21 and 22. As a result, electric power can be supplied individually to the two coils 25 and 26 such that the power is supplied to the first coil 25 by the conductive passages 54 and 55 and that is supplied to the second coil 26 by the conductive passages 56 and 57. Further, the reproduction signals can be individually taken from the two coils 25 and 26. By enlarging a portion of the first conductive passage 21 that corresponds to the portion 22a of the second conductive passage 22 and the cross sectional area of the portion 22a of the second conductive passage 22, the allowable electric current for the second coil 26 can be enlarged. As a general rule, the reproduction operation requires a coil formed by a larger number of turns as compared with the recording operation, while the recording operation requires a coil comprising a conductive passage that has a larger cross sectional area as compared with the reproducing operation. Therefore, the arrangement of the two coils 25 and 26 to be the reproducing and recording coils respectively enables optimums coils for the reproducing and recording coils to be formed. Further, an operation such that power is supplied to the recording coil at the time of the reproducing operation to generate an AC magnetic field serving as a bias to improve the sensitivity in the reproducing operation can be performed. Further, the formation of the helical coil enables a multiplicity of magnetic structure of a multiplex-winding type can be disposed densely.

Second Embodiment

Another embodiment claimed in claim 2 of the present invention will now be described. The description will be made about only portions different from the first embodiment.

Although the first embodiment is arranged in such a manner that at least the portion 22a of the second conductive passage 22 sequentially connects every other first conductive passage end 21a and at least the portion forms the duplex winding coil, the connection method is not limited to this. For example, if the sequential connection is established at intervals of two first conductive passage ends 21a, three coils having different number of turns can be formed. Therefore, the respective coils can be formed into optimum coils for use to record and reproduce information and to generate a bias magnetic filed.

Figure 6:
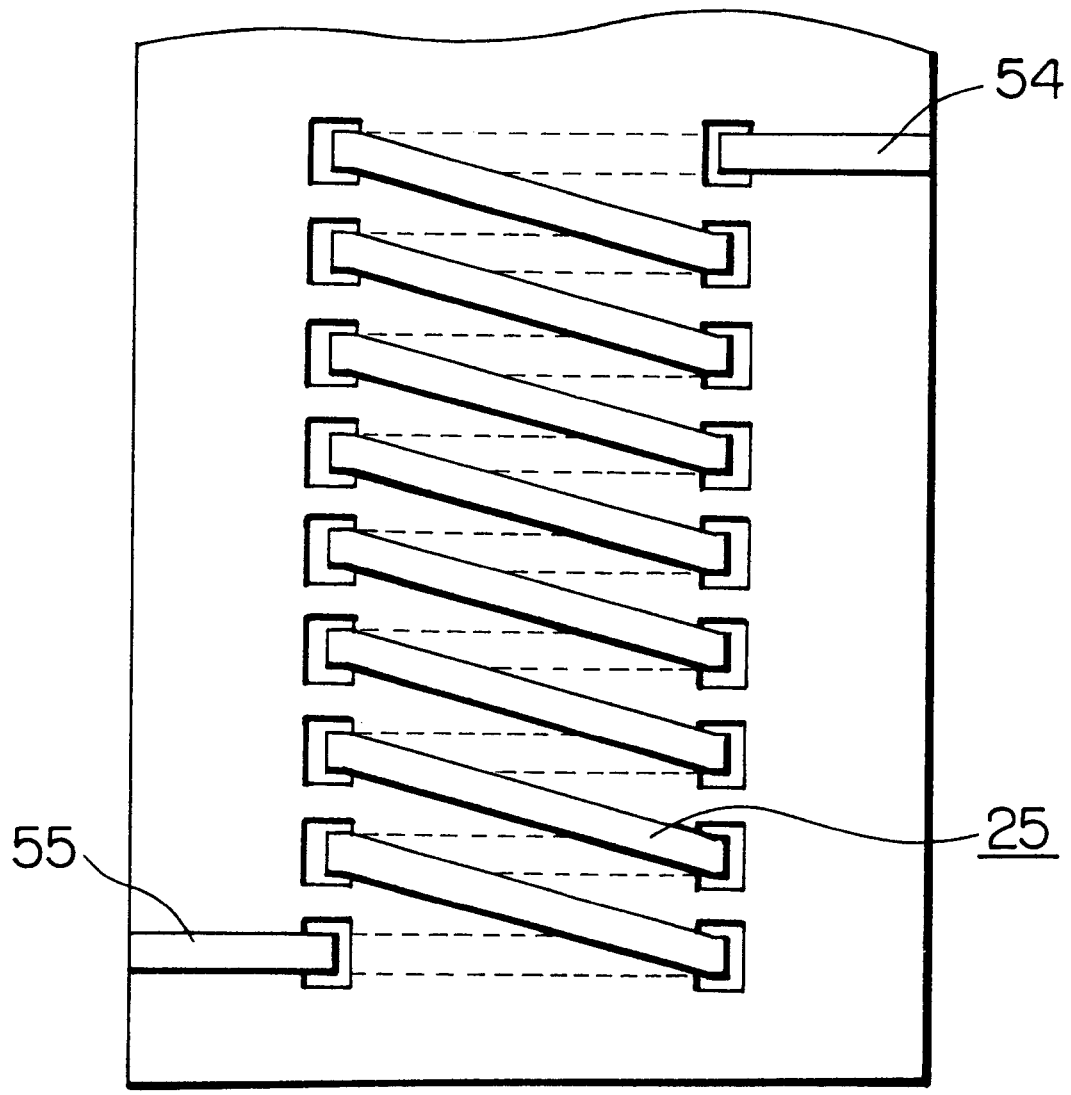
FIG. 6 is a top view which illustrates a magnetic structure according to a second embodiment of the present invention.
Figure 7:
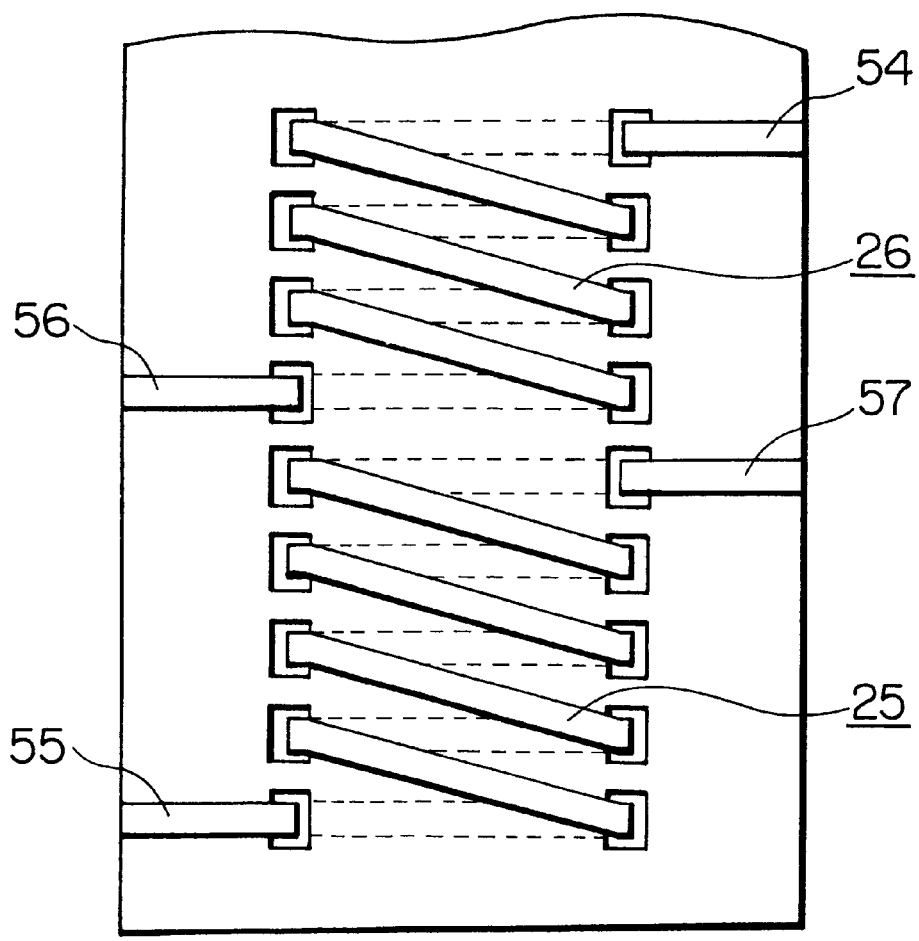
FIG. 7 is a top view which illustrates another example of the magnetic structure according to the second embodiment.

The adjacent first conductive passage ends may be sequentially connected as shown in the top views, FIGS. 6 and 7. FIG. 6 illustrates a case where one coil 25 is formed, while FIG. 7 illustrates a case where two coils 25 and 26 are formed. As a result of the foregoing structure, the coil shown in FIG. 6 may be used as, for example, an inductor device, while that shown in FIG. 7 may be used as, for example, a transformer device.

Third Embodiment

Figure 8:
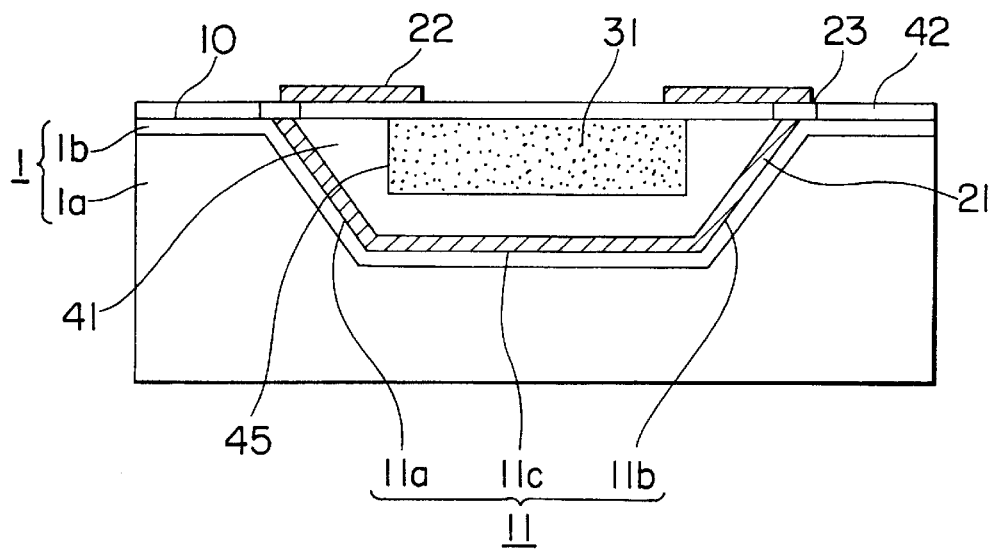
FIG. 8 is a lateral cross sectional view which illustrates a magnetic structure according to a third embodiment of the present invention.

Another embodiment of the magnetic structure claimed in claim 1 of the present invention will now be described. FIG. 8 is a lateral cross sectional view. The description will be made about only different portions from the first embodiment shown in FIG. 2. In this embodiment, the first insulating layer 41 is enclosed to fill the recess 11, and the magnetic core 31 is enclosed in a recess 45 formed in the first insulating layer 41. As a result of the foregoing structure, the insulation from the magnetic core 31 can be assured by the first insulating layer 41. Therefore, the positional and dimensional allowances of the contact holes 23 can be enlarged, causing the yield to be improved. As a result, the manufacturing cost can be reduced.

Fourth Embodiment

Figure 9:
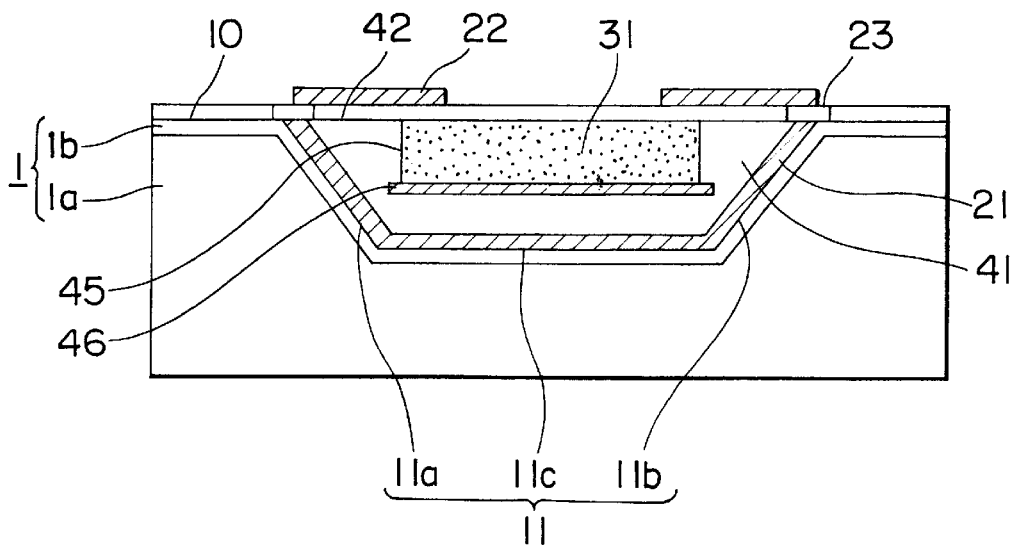
FIG. 9 is a lateral cross sectional view which illustrates a magnetic structure according to a fourth embodiment of the present invention.

Another embodiment of the magnetic structure claimed in claim 1 of the present invention will now be described. FIG. 9 is a lateral cross sectional view. The description will be made about only different portions from the first embodiment. In this embodiment, an etching stoppage layer 46 made of aluminum, gold, copper, nickel or titanium or the like is formed in the first insulating layer 41 enclosed in the recess 11 similarly to the third embodiment. By forming the etching stoppage layer 46 as described above, the recess 45 can be formed accurately by etching.

Fifth Embodiment

Figure 10:
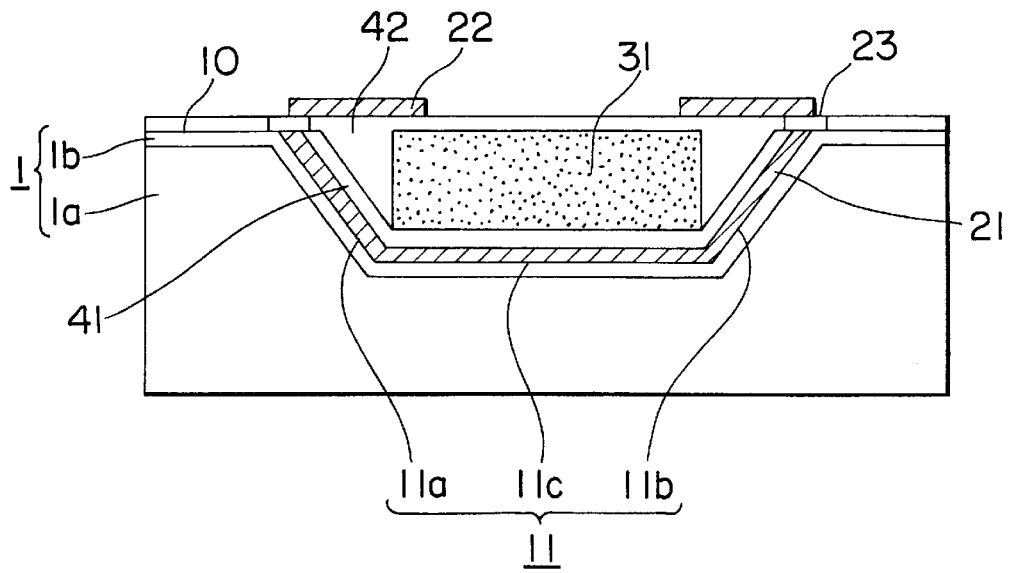
FIG. 10 is a lateral cross sectional view which illustrates a magnetic structure according to a fifth embodiment of the present invention.

Another embodiment of the magnetic structure claimed in claim 1 of the present invention will now be described. FIG. 10 is a lateral cross sectional view. The description will be made about only different portions from the first embodiment. In this embodiment, the first insulating layer 41 is, similarly to the first embodiment shown in FIG. 2, formed into a thin layer on the fist conductive passage 21 and the substrate 1. The magnetic core 31 is formed into a rectangular cross sectional shape in a portion of the recess 11 having a trapezoidal cross sectional shape to have a thickness thinner than the depth of the recess 11. Further, the second insulating layer 42 is, in a manner different from that shown in FIG. 2, formed on the first insulating layer 41 and the magnetic core 31 to fill the recess 11. As a result of the foregoing structure, the allowances of the positional and dimensional errors of the contact holes can be enlarged. Therefore, the manufacturing cost can be reduced.

Sixth Embodiment

Figure 11:
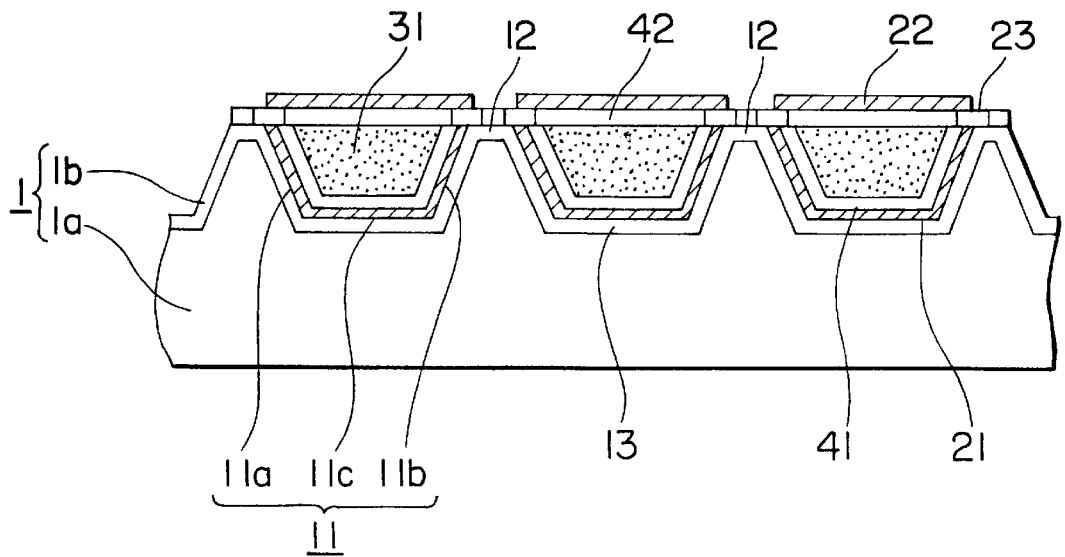
FIG. 11 is a lateral cross sectional view which illustrates a magnetic structure according to a sixth embodiment of the present invention.
Figure 12:
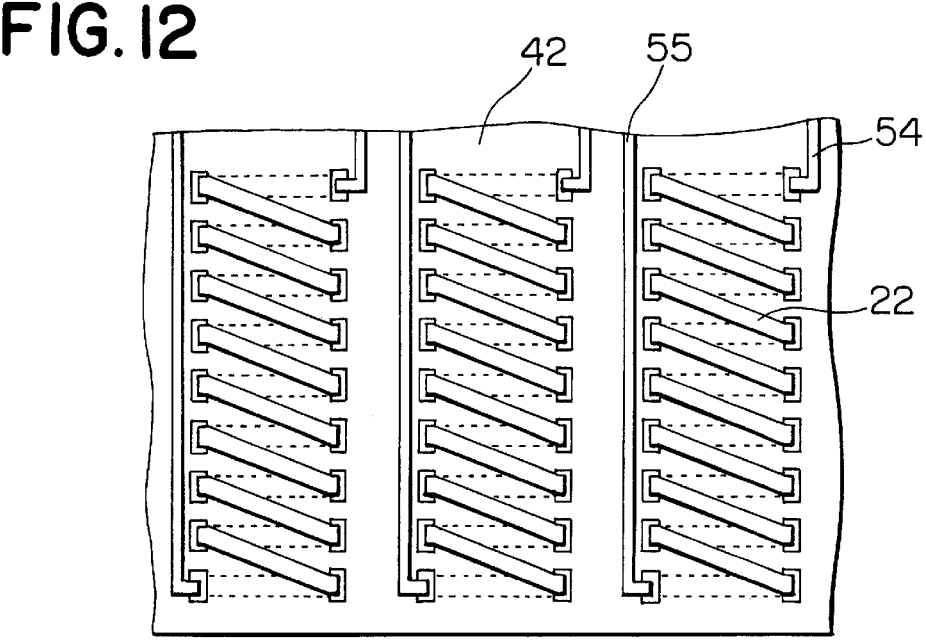
FIG. 12 is a top view which illustrates the magnetic structure according to the sixth embodiment.

An embodiment of a magnetic structure claimed in claim 2 of the present invention will now be described. FIG. 11 is a lateral cross sectional view which illustrates the magnetic structure according to a sixth embodiment, and FIG. 12 is a top view.

The magnetic structure according to this embodiment, as shown in FIG. 11, is formed by integrating a plurality of structures each of which comprises the substrate 1, the first conductive passage 21, the second conductive passage 22, the magnetic core 31, the first insulating layer 41 and the second insulating layer 42, wherein a multiplex-winding helical coil comprising the first conductive passage 21 and the second conductive passage 22 is formed to be wound around the magnetic core 31 while interposing the first insulating layer 41 and the second insulating layer 42.

The substrate 1 is an insulating substrate comprising the single-crystal silicon substrate 1a and the insulating layer 1b made of $SiO_2$ or the like, the substrate 1 having a plurality of ridge-like projections 12 on the surface thereof. The portions between the ridge-like projections 12, that is, the bottom surfaces 11c are formed into flat portions. Further, the two side surfaces 11a and 11b of the ridge-like projection 12 are formed diagonally with respect to the flat portion 11c, the two side surfaces 11a, 11b and the bottom surface 11c forming the recess 11. The first conductive passage 21 formed in the recesses 11 comprises a plurality of parallel and conductive passages formed on the side surfaces 11a, 11b and the bottom surface 11c and made of aluminum or copper or the like. The magnetic core 31 is made of magnetic material, such as Permalloy or Sendust or the like, enclosed in the recess 11 to have a thickness thinner than the height of the projection 12. Since the plural magnetic cores 31 are completely separated from each other by the projections 12, cross-talk can be prevented. Although the structures of the first insulating layers 41, the second insulating layers 42, the contact holes 23, the conductive passages 54 and 55 are the same as those according to the first embodiment, the coils formed by the second conductive passages 22 and the first conductive passage ends 21 are not limited to the multiplex-winding type structure. A single-winding structure formed as shown in FIG. 12 may be employed. The single-winding structure of the foregoing type may be used as, for example, an inductor device, while a winding-structure shown in FIG. 7 may be used as a transformer. A winding structure formed as shown in FIG. 5 may be used as a recording/reproducing magnetic head.

By forming the projections 12 each having the diagonal side surfaces on the substrate 1, the plural magnetic structures can be formed integrally. Further, the adjacent magnetic cores 31 can assuredly be separated from each other. In addition, the helical coil can assuredly be formed even if the magnetic core has a thick thickness, causing a magnetic structure to be provided which is capable of simultaneously satisfying the desire for increasing the number of turns to form the coil, thickening of the magnetic core and dense arrangement.

Seventh Embodiment

Figure 13:
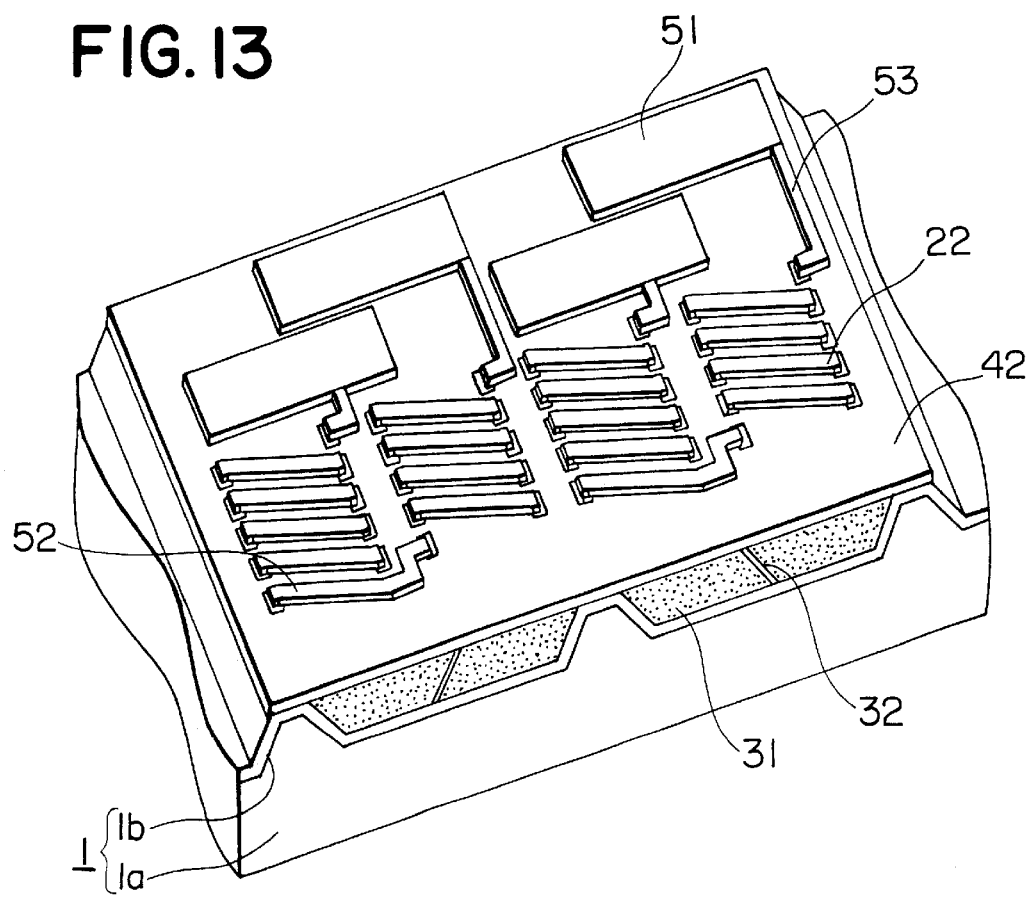
FIG. 13 is a perspective view which illustrates a magnetic head according to a seventh embodiment of the present invention.
Figure 14:
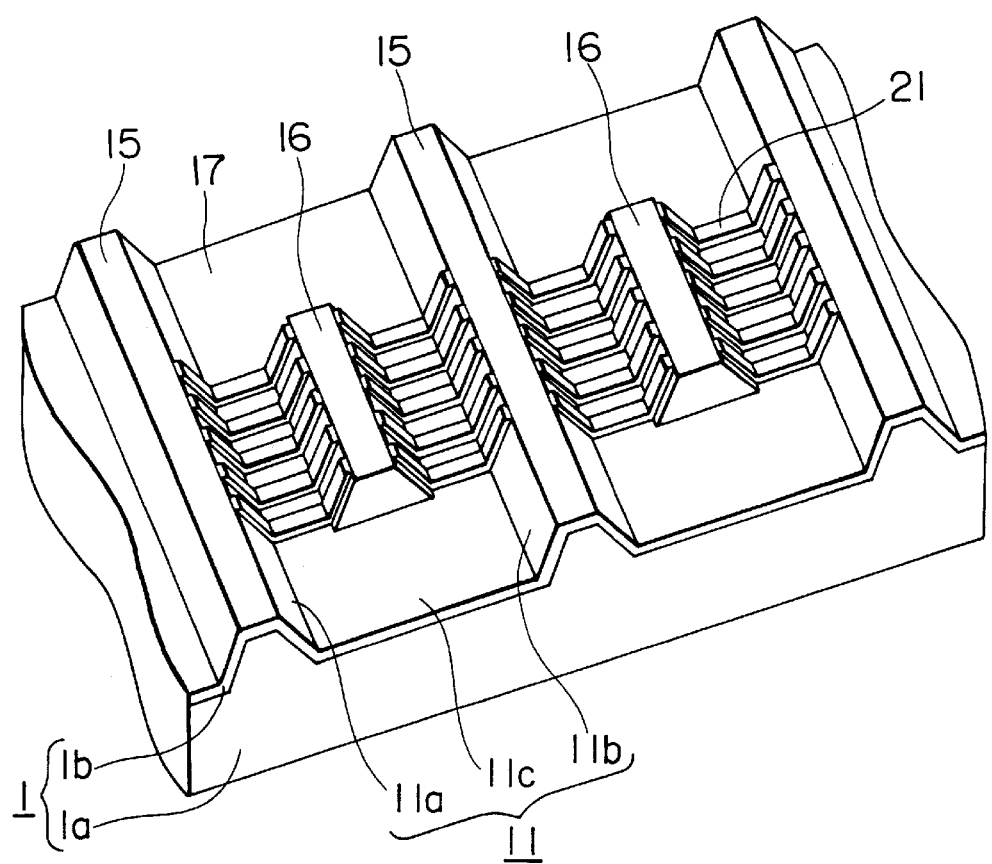
FIG. 14 is a perspective view which illustrates a substrate and a first conductive passage of the magnetic head according to the seventh embodiment.
Figure 15:
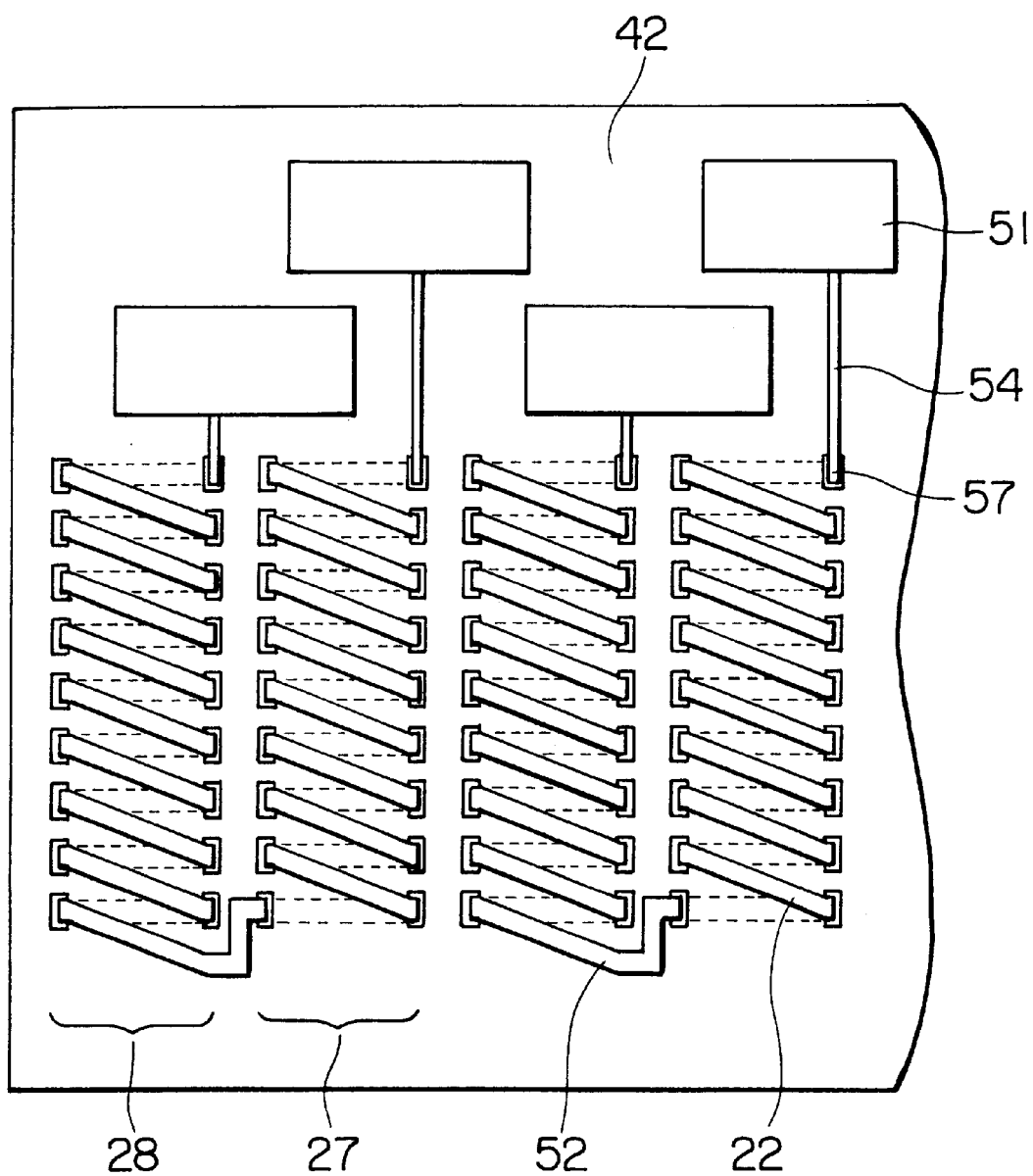
FIG. 15 is a plan view which illustrates the magnetic head according to the seventh embodiment.
Figure 16:
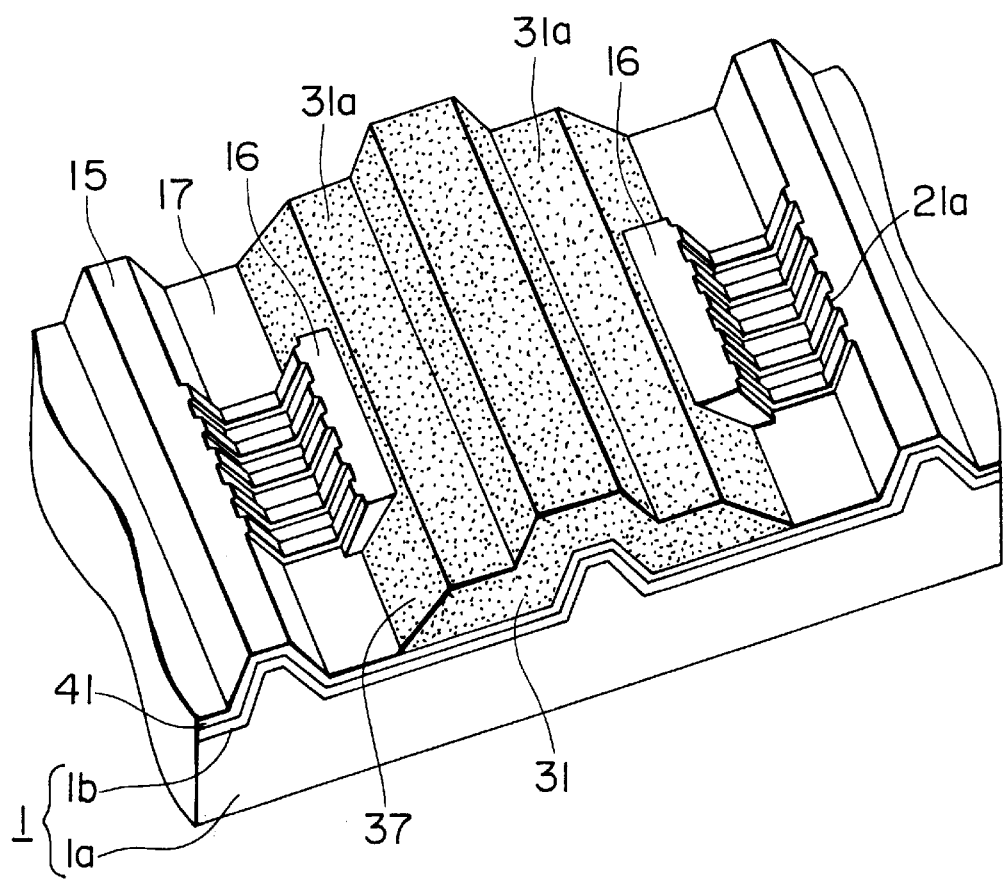
FIG. 16 is a perspective view which illustrates a process of forming a magnetic gap according to the seventh embodiment.

An embodiment of a magnetic head claimed in claim 3 of the present invention will now be described. FIG. 13 is a perspective view which illustrates the magnetic head according to a seventh embodiment. FIG. 14 is a perspective view which illustrates a substrate and a first conductive passage of the magnetic head, FIG. 15 is a top view and FIG. 16 is a perspective view which illustrates the process for forming magnetic gaps.

The magnetic head according to this embodiment, as shown in FIGS. 13 and 14, comprises the substrate 1, the first and second conductive passages 21, 22, the magnetic cores 31 and the first and second insulating layers 41 and 42. Although FIGS. 13 to 16 illustrate the magnetic head for two channels for easy understanding, the structure is not, of course, limited to the two channels.

As shown in FIG. 14, the substrate 1 is an insulating substrate comprising the single-crystal silicon substrate 1a and the insulating layer 1b made of $SiO_2$ or the like, the substrate 1 having a plurality of projections formed on the surface thereof. The projections include long projections 15 and short projections 16 formed alternately. The side surfaces of the long projection 15 and the side surfaces of the short projection 16 are formed diagonally with respect to the flat portion. The side surfaces of the long projections 15, the side surfaces of the short projection 16 and the flat portion 17 form the recess 11. The first conductive passages 21 comprises a plurality of parallel and conductive passages formed on the side surfaces of the long projections 15, the side surfaces of the short projection 16 and the flat portion 17 and made of aluminum or copper or the like, the first conductive passages 21 being divided into two groups formed on the two sides of the short projection 16. The magnetic core 31 is made of magnetic material, such as Permalloy or Sendust, enclosed into the recess 11 having a thickness thinner than the heights of the projections 15 and 16, the magnetic core 31 being formed into a closed magnetic passage on the side opposing a magnetic-recording-medium sliding surface 91. The adjacent magnetic cores 31 are separated from each other by the long projection 15. A magnetic gap 32 made of non-magnetic material, such as $SiO_2$, formed from the magnetic-recording-medium sliding surface 91 to the short projection 16. Two coils 27 and 28 are, as shown in FIG. 15, formed on the two sides of the short projection 16 by the first and second conductive passages 21 and 22, the two coils being connected to each other by a conductive passage 52. By connecting the two coils 27 and 28 as described above, the external inductive magnetic field is canceled by the two coils 27 and 28. Therefore, an influence of an external magnetic field, that generates noise, can be prevented considerably. Electrode pads 51 are connected to the coils by the conductive passages 54 and 57. By enlarging the area of each of the electrode pads 51, connection with an external electric circuit or the like (omitted from illustration) can easily be established.

The magnetic head according to this embodiment prevents lengthening of intervals between the magnetic heads even if the number of turns of the coil is enlarged. Further, the adjacent magnetic core 31 can assuredly be separated from each other by the long projections 15. In addition, the each of the first conductive passages 21 and the second conductive passages 22 can assuredly be connected to each other because the first conductive passage 21 is formed into a slant surface.

An example of a method of manufacturing the magnetic head according to this embodiment will now be described. A (100)-surface oriented silicon wafer is subjected to anisotropic etching to form the projections 15 and 16. Since the side surfaces of the projections 15 and 16 thus-formed correspond to the (111-plane) of silicon single crystal, the side surfaces are slant surfaces making an angle about 55° from the flat portion 17. After the projections 15 and 16 have been formed, the silicon wafer is oxidized or the insulating material, such as $SiO_2$, is deposited so that the insulating substrate 1 is formed. Then, the conductive material, such as aluminum or copper, is deposited on the substrate 1 by a means, for example, plating or evaporation or the like, and then the conductive material is patterned by employing a so-called lithography technology so that the first conductive passage 21 is formed. Since the side surfaces of the projections 15 and 16 are the slant surfaces, application of a photosensitive resist to the side surfaces and exposure of the same are enabled. Then, the insulating material, such as $SiO_2$, is deposited by a method, such as evaporation or application, so that the first insulating layer 41 is formed. Then, the magnetic material, such as Sendust or Permalloy, is deposited to have a thickness thicker than the depth of the recess 11 by a method such as the evaporation as shown in FIG. 16 so that the magnetic cores 31a are formed. Then, etching is performed by making use of irradiation of focused ion beams, such as gallium, or laser-assist etching is performed so that side surfaces 37 of each of the magnetic cores 31a in the portion, in which the magnetic gap 32 is formed, are removed to be flat planes each having a predetermined azimuth angle. Then, the non-magnetic material is deposited on the flat plane thus-formed to have a thickness which is the same of the magnetic gap so that the magnetic gaps 32 are formed. Then, the magnetic material, such as Sendust or Permalloy, is deposited in the portion in which the magnetic core 31a is not formed, to have a thickness thicker than the depth of the recess 11 by a method, such as plating or evaporation. Then, the surface of the magnetic material is ground by using a means, such as mechanical machining, to have a thickness which is the same or thinner than the depth of the recess 11 so that the magnetic cores 31 are formed. As a result, the adjacent magnetic cores 31 are assuredly separated from each other by the long projections 15, and the end surfaces 21a of the first conductive passages 21 are allowed to appear outside. Then, the second insulating layers 42 are deposited on the entire surface, that has been ground to be a flat surface, and then the contact holes 23 are formed in the insulating layers 42 above the first conductive passage end surfaces 21a by, for example, the lithography technology. Then, the conductive material, such as aluminum or copper, is deposited on the second insulating layers 42 and in the contact holes 23 by a means such as plating or evaporation so that the conductive film is formed. The conductive film is then patterned by making use of a so-called lithography technology so that the second conductive passages 22, the conductive passages 52, 54, 57 and the electrode pads 51 are formed.

Although the electrode pads 51 shown in FIG. 13 are disposed in the zigzag shape, the disposition method is not limited to the zigzag configuration. If each of the magnetic cores 31 is formed into a laminated structure composed of the magnetic material and the non-magnetic material, the eddy current loss can be reduced, and therefore, the magnetic permeability can be improved.

Eighth Embodiment

Figure 17:
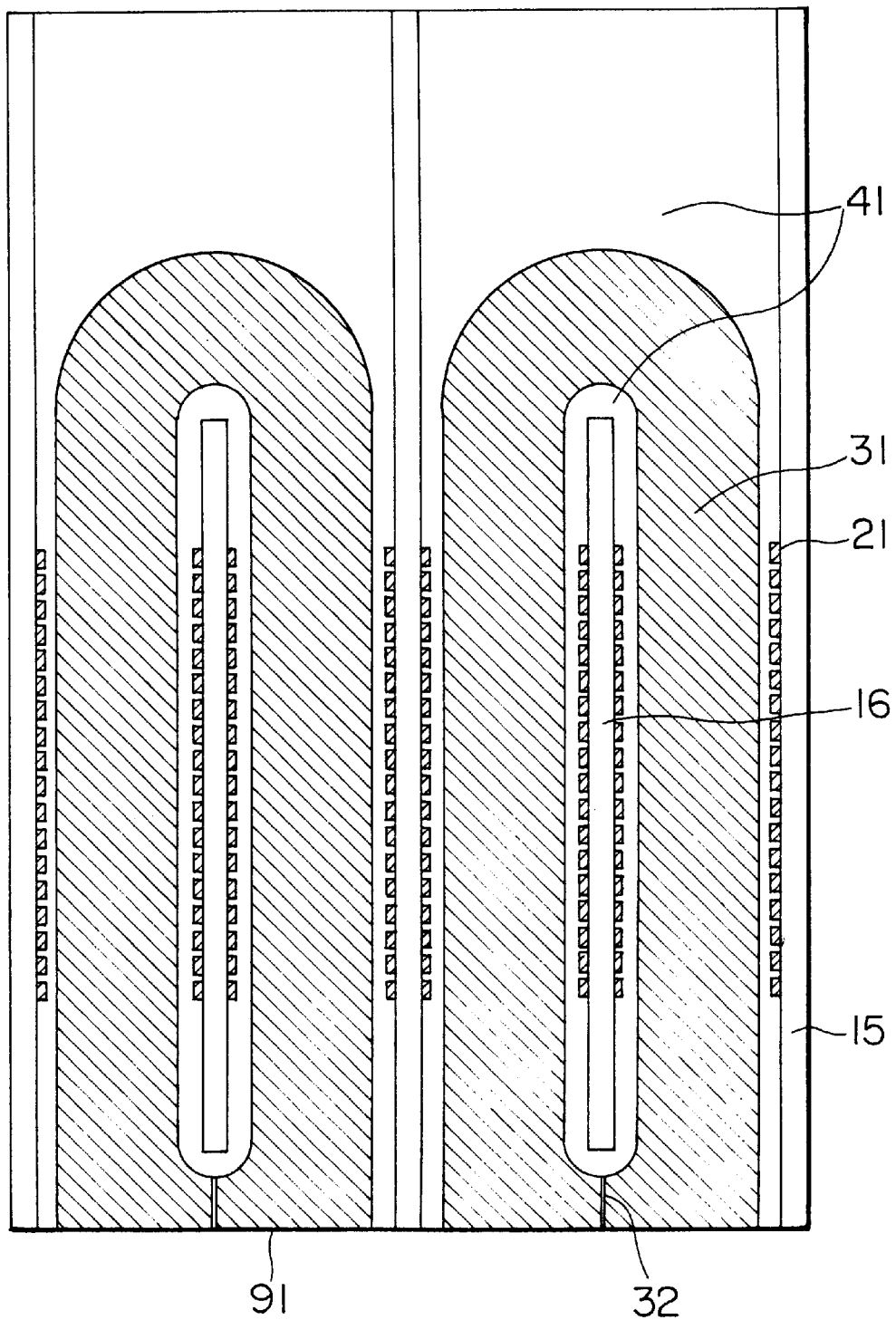
FIG. 17 is a partially-broken horizontal cross sectional view which illustrates a magnetic head according to an eighth embodiment of the present invention.
Figure 18:
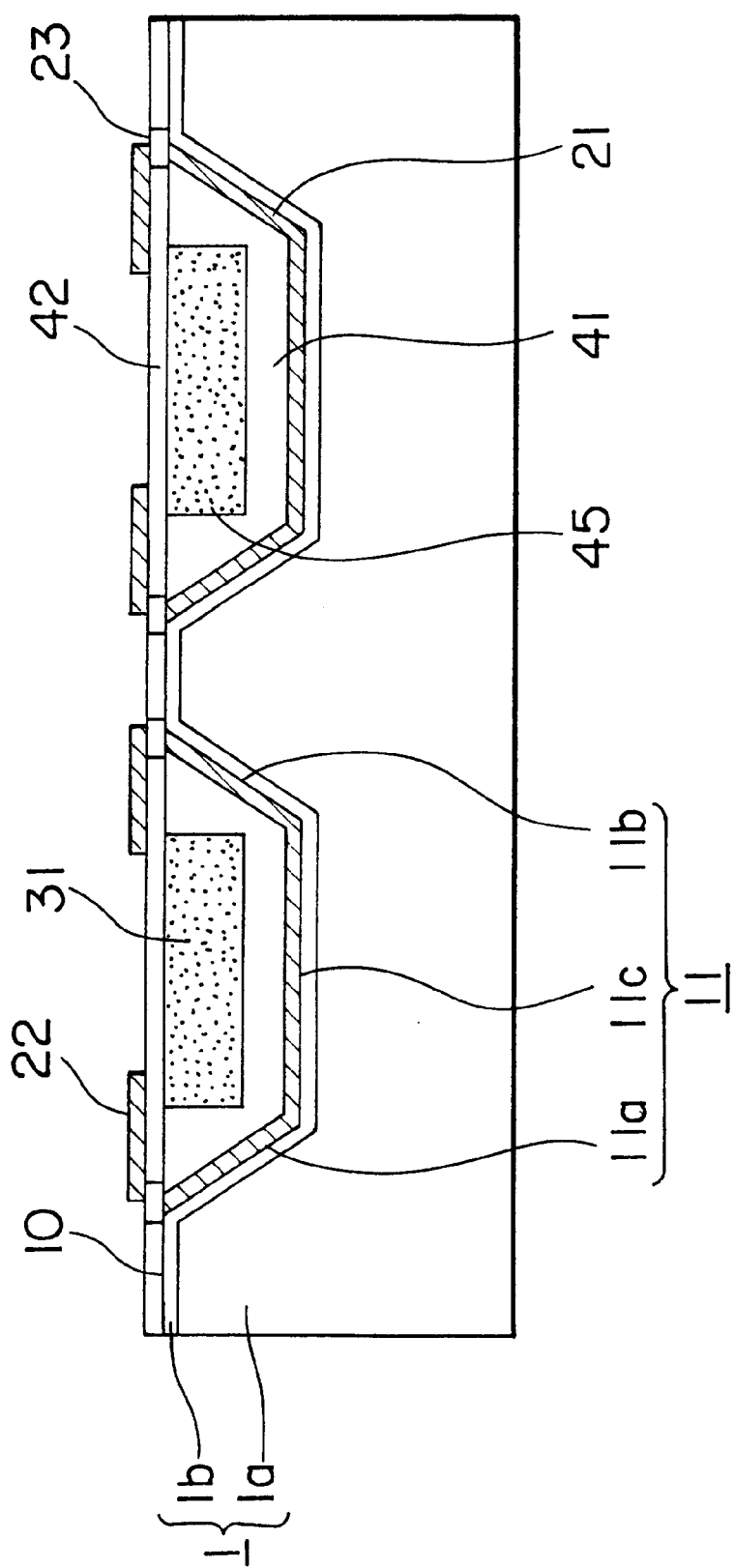
FIG. 18 is a lateral cross sectional view which illustrates, the magnetic head according to the eighth embodiment of the present invention.

Another embodiment of the magnetic head claimed in claim 3 of the present invention will now be described. The description will be made about only different portions from the seventh embodiment. FIG. 17 is a horizontal cross sectional view which illustrates a magnetic head having two channels according to the eighth embodiment. FIG. 18 is a lateral cross sectional view. As shown in FIG. 18, each recess 45 having the rectangular cross sectional shape is formed in the first insulating layer 41 enclosed in the recess 11 having the trapezoidal cross sectional shape. The magnetic core 31 is made of the magnetic material, such as Permalloy or Sendust, and enclosed in the recess 45 having the rectangular cross sectional shape to have a thickness thinner than the depth of the recess 11. As a result of the foregoing structure, the allowances of the positional and the dimensional errors of the contact holes 23 can be enlarged, and accordingly, the manufacturing cost can be reduced. Further, the magnetic cores of the adjacent channels can assuredly be separated from each other, and therefore, the cross talk can be decreased.

Ninth Embodiment

Figure 19:
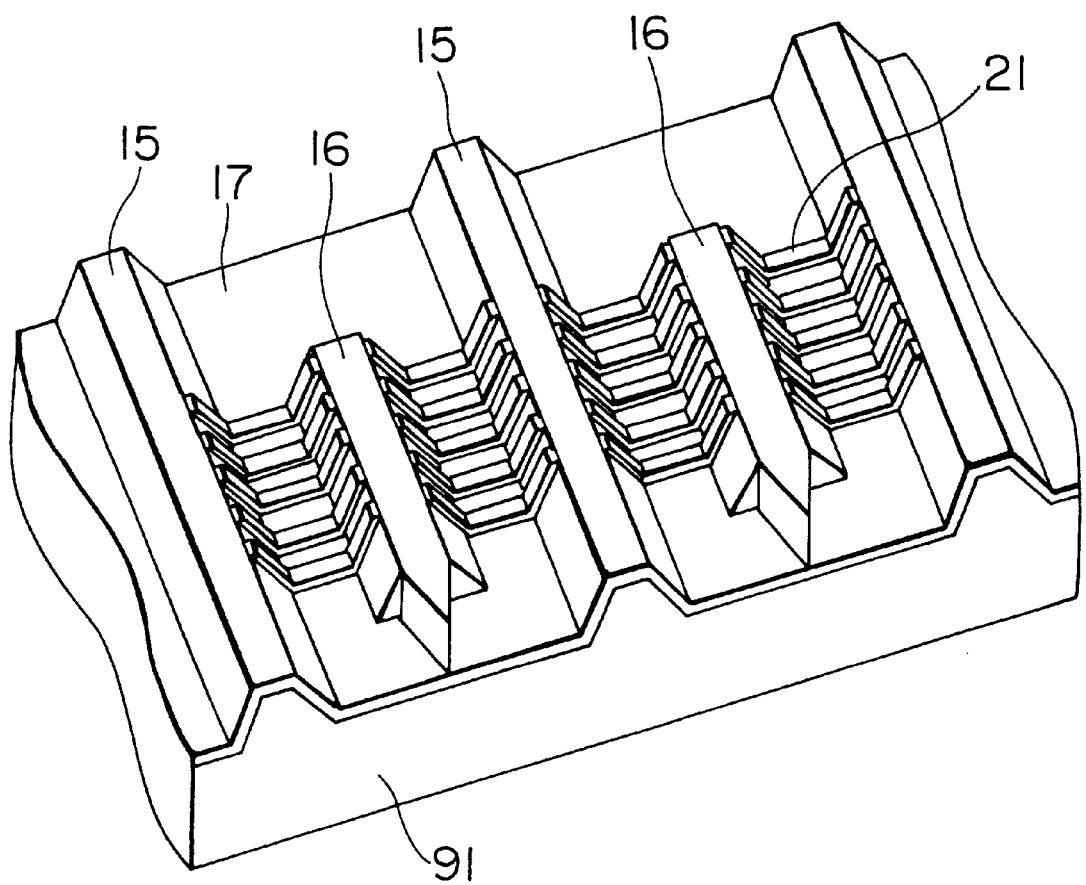
FIG. 19 is a perspective view which illustrates a substrate and a first conductive passage of the magnetic head according to a ninth embodiment of the present invention.

Another embodiment of the magnetic head claimed in claim 3 of the present invention will now be described. With reference to FIG. 19, the description will be made about only different portions from the seventh embodiment. The foregoing seventh embodiment is so arranged as shown in FIGS. 14 and 16 that the magnetic gap 32 is formed by the non-magnetic materials that form the magnetic core 31. This embodiment is arranged in such a manner that each of the end surfaces of the short projections 16 is formed into a wedge shape extending to cover the overall length of the magnetic-recording-medium sliding surface 91 so that the magnetic gap 32 is formed. The method of forming the end surface of the short projection 16 into the wedge shape is exemplified by mechanical machining or etching. By employing of this method, the magnetic gap 32 can be formed at the time of machining the substrate 1. Therefore, manufacturing can easily be performed.

Tenth Embodiment

Figure 20A:
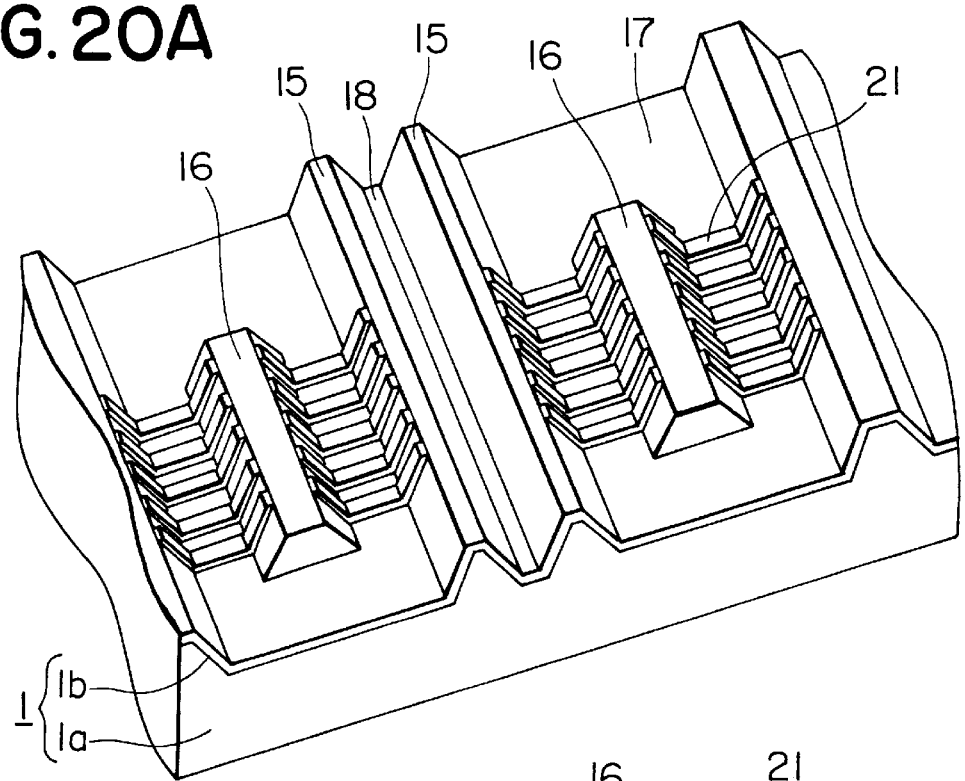
FIGS. 20A and 20B respectively illustrate a magnetic head according to a tenth embodiment of the present invention, where
Figure 20B:
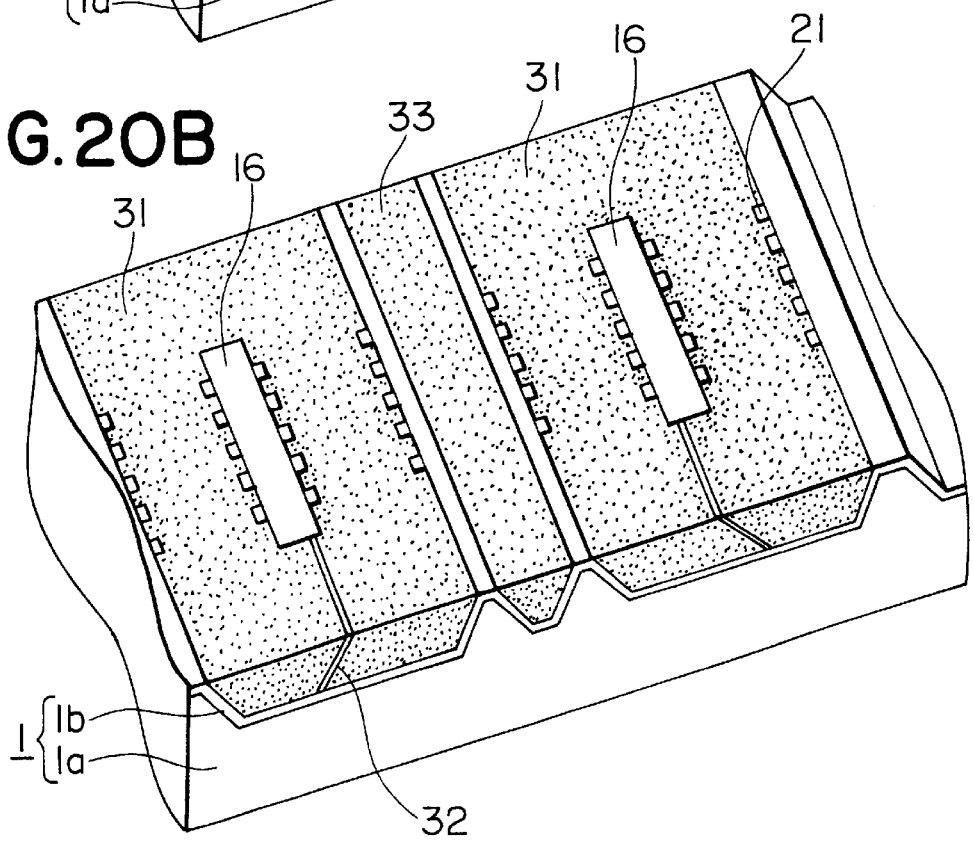

Another embodiment of the magnetic head claimed in claim 3 of the present invention will now be described. With reference to FIGS. 15, 20A and 20B, the description will be made about only different portions from the seventh embodiment.

Although the seventh embodiment is arranged in such a manner that the long projections 15 and the short projections 16 are alternately formed on the surface of the substrate 1, the configuration is not limited to this. The necessity lies only in that the long projections 15 are disposed on the two sides of the short projection 16. For example, the embodiment shown in FIGS. 20A and 20B is arranged in such a manner that two continuous long projections 15 are formed on the surface of the substrate 1 at a position between the short projections 16. The recess formed by the slant surfaces of the adjacent long projections 15 and the flat portion 18 disposed between the long projections 15 is filled with the magnetic material, such as Permalloy or Sendust, to have a thickness thinner than the height of the projection 15 so that the magnetic layer 33 is formed. The structure arranged described above is able to separate the adjacent magnetic cores 31 from each other by the projection 15. Further, the magnetic layer 33 serves as a magnetic shield. Therefore, a magnetic head in which the cross talk can be reduced can be formed.

The width of the long projection 15 and that of the short projection 16, of course, do not need to be the same. If the width of the short projection 16 is wide, the distance between the coils 27 and 28 on the two sides of the short projection 16 shown in FIG. 15 is lengthened. In this case, the mutual influence of the coils can be eliminated considerably.

Eleventh Embodiment

Figure 21:
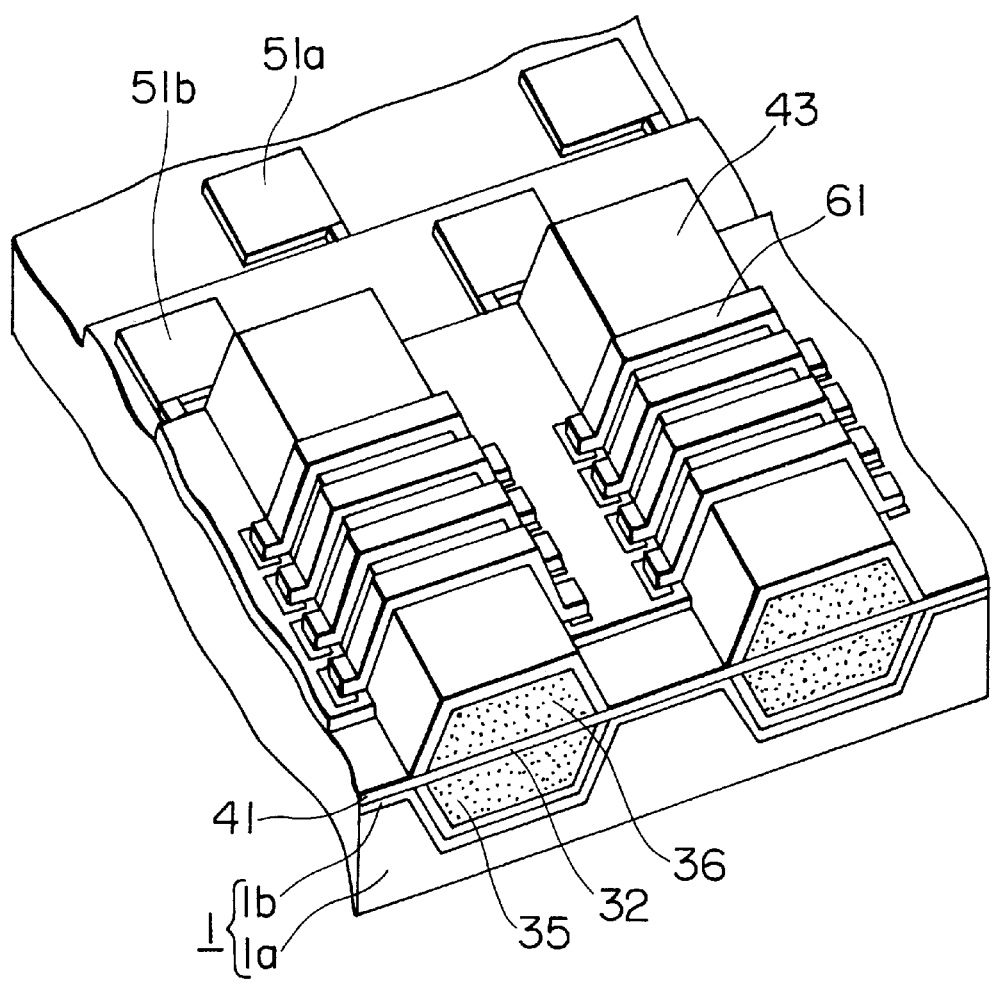
FIG. 21 is a perspective view which illustrates a magnetic head according to an eleventh embodiment of the present invention.
Figure 22:
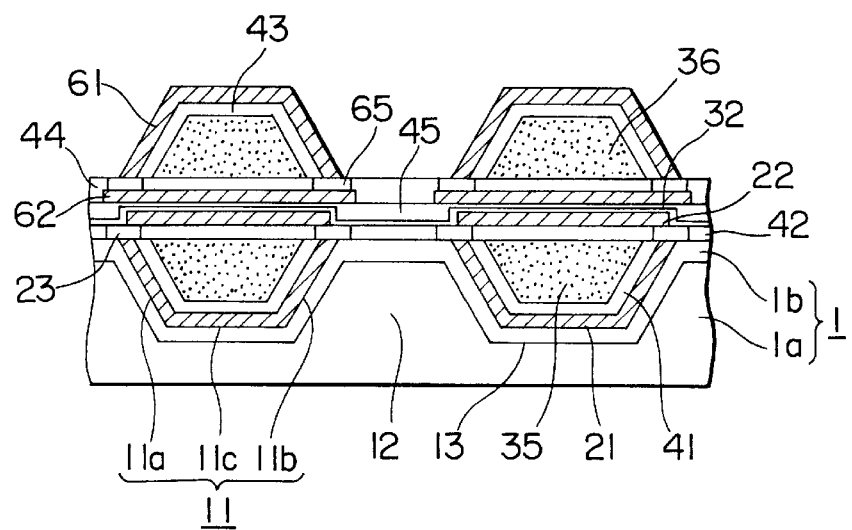
FIG. 22 is a lateral cross sectional view which illustrates the magnetic head according to the eleventh embodiment.
Figure 23:
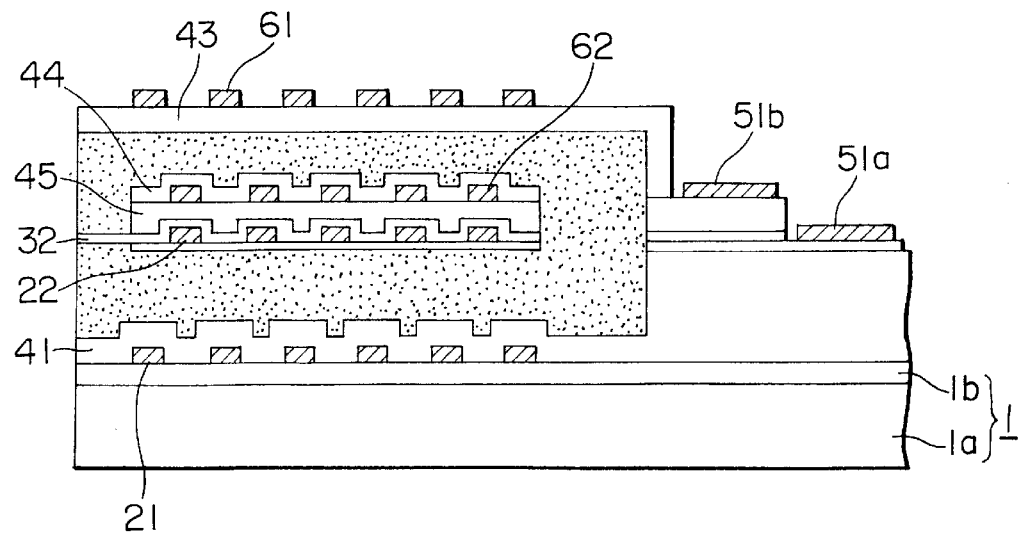
FIG. 23 is a vertical cross sectional view which illustrates the magnetic head according to the eleventh embodiment.
Figure 24:
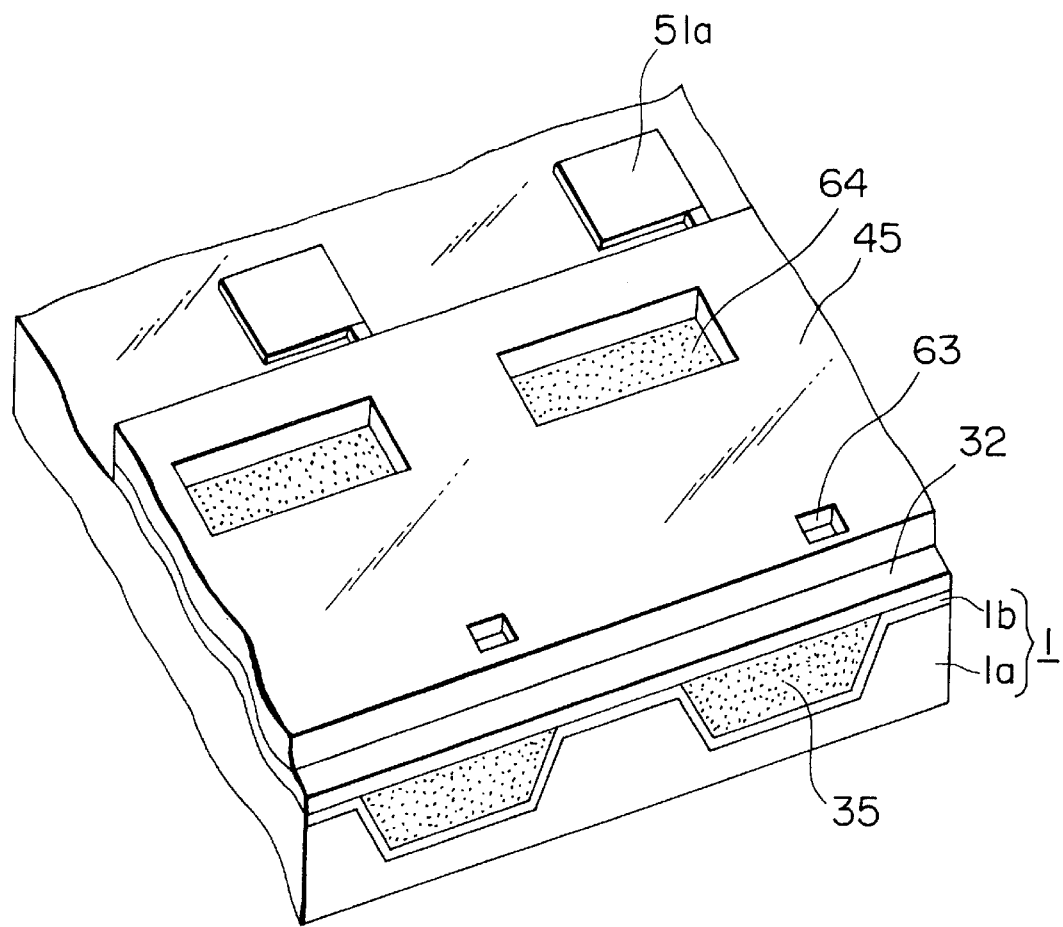
FIG. 24 is a perspective view which illustrates contact holes for connecting a magnetic core of the magnetic head according to the eleventh embodiment.

An embodiment of a magnetic head claimed in claim 4 of the present invention will now be described. FIG. 21 is a perspective view which illustrates the magnetic head according to an eleventh embodiment. FIG. 22 is a lateral cross sectional view and FIG. 23 is a vertical cross sectional view. FIG. 24 is a perspective view which illustrates contact holes for connecting the magnetic cores of the magnetic head.

The magnetic head according to this embodiment, as shown in FIGS. 21 and 22, comprises the substrate 1, the first conductive passage 21, the second conductive passage 22, the first magnetic cores 35, a third conductive passage 61, a fourth conductive passages 62, a second magnetic core 36, the magnetic gap 32, the first insulating layer 41, the second insulating layer 42, the third insulating layer, the fourth insulating layer 44 and the electrode pads 51. Although FIGS. 21 to 24 illustrate the structure of the magnetic head for two channels for easy understanding, this embodiment, of course, relates to a multi-channel magnetic head.

The substrate 1 is the insulating substrate comprising the single crystal silicon substrate 1a and the insulating layer 1b made of, for example, $SiO_2$, the substrate 1 having a plurality of projections 12 formed on the surface thereof. The spaces between the projections 12 are formed into flat portions 13. The two side surfaces 11a and 11b of the projection 12 are formed into slant surfaces with respect to the flat portion 13, the side surfaces 11a, 11b and the flat portion 13 form the recess 11. The first conductive passage 21 comprises a plurality of parallel and conductive passages formed on the side surfaces 11a, 11b and the bottom surface 13 and made of aluminum or copper. The first magnetic core 35 is made of magnetic materials, such as Permalloy or Sendust, enclosed in the recess 11 to have a thickness thinner than the height of the projection 12. Since the plural first magnetic cores 35 are completely separated from each other by the projections 12, cross talk can be prevented. The second conductive passage 22 comprises a plurality of parallel and conductive passages formed on the second insulating layer 42 and made of aluminum or copper, the second conductive passage 22 being sequentially connected to the ends of the first conductive passages 21 by the contact holes 23. The first conductive passages 21 and the second conductive passages 22 are formed into a plurality of integrated first coils that are wound around the first magnetic core 35. The power supply and receipt of the reproduction signal to and from the first coil is performed by the electrode pad 51*a*. The magnetic gap 32 is formed on the second conductive passage 22, the conductive passage 24 and the first magnetic core 35. The magnetic gap 32 is made of non-magnetic materials formed between the first magnetic core 35 and the second magnetic core 36.

As shown in FIG. 24, a contact hole 63 for establishing the connection between the second conductive passage 22 and the fourth conductive passage 62 and a contact hole 64 for establishing the connection between the first magnetic core 35 and the second magnetic core 36 are formed in the layer, which is made of the non-magnetic material for forming the magnetic gap 32, and the fifth insulating layer. The fourth conductive passage 62 comprises a plurality of parallel conductive passages made of aluminum or copper, the fourth conductive passage 62 being sequentially connected to the ends of the third conductive passages 61 by the contact holes 65 formed in the fourth insulating layer 44. The second magnetic core 36 is made of the magnetic material, such as Permalloy or Sendust, and having slant side surfaces, the second magnetic core 36 being formed not to reach the end of the fourth conductive passage 62. A third insulating layer 43 is formed on, at least, the side surfaces and the top surface of the second magnetic core 36. The third conductive passage 61 comprises a plurality of parallel and conductive passages formed on the side surfaces and the top surface of the second magnetic core 36 while interposing the third insulating layer 43. Each of a plurality of second coils is integrally formed by the third conductive passage 61 and the fourth conductive passage 62 to be wound around the second magnetic core 36. The power supply and the receipt of the reproduction signal to and from the second coil is performed by the electrode pad 51*b*. Since the first coil and the second coils are connected to each other in series by the contact hole 63, the power supply and the receipt of the reproduction signal can be performed by the electrode pads 51*a* and 51*b*. The first magnetic core 35 and the second magnetic core 36 are, by the magnetic gap 32, separated from each other adjacent to the magnetic recording medium sliding surface, while they are connected to each other by the contact hole on the side opposing the magnetic recording medium sliding surface. As a result of the structure thus-arranged, a magnetic head can be formed in which multiplex-winding can easily be realized, the disposition intervals can be considerably shortened, and the accuracy of the magnetic gap length and the relative position can be improved.

Twelfth Embodiment

Another embodiment of the magnetic head claimed in claim 4 of the present invention will now be described. The description will, with reference to FIG. 24, be made about only different portions from the eleventh embodiment.

The foregoing eleventh embodiment has the arrangement that the fifth insulating layer 45 has the contact hole 63 for establishing the connection between the second conductive passage 22 and the fourth conductive passage 62 and the contact hole 64 for establishing the connection between the first magnetic core 35 and the second magnetic core 36. This embodiment has the arrangement that the fifth insulating layer 45 has not the contact hole 63 for establishing connection between the second conductive passage 22 and the fourth conductive passage 62, and therefore the fist coil and the second coil are not connected to each other while interposing the fifth insulating layer 45. As an alternative to this, electrode pads are further disposed on the second insulating layer 42 and the fifth insulating layer 45 to be made the first and second coils, respectively. Since the connection of the first coil and the second coil by means of the contact hole 63 does not need to be established, the reliability can be improved.

Thirteenth Embodiment

Figure 25:
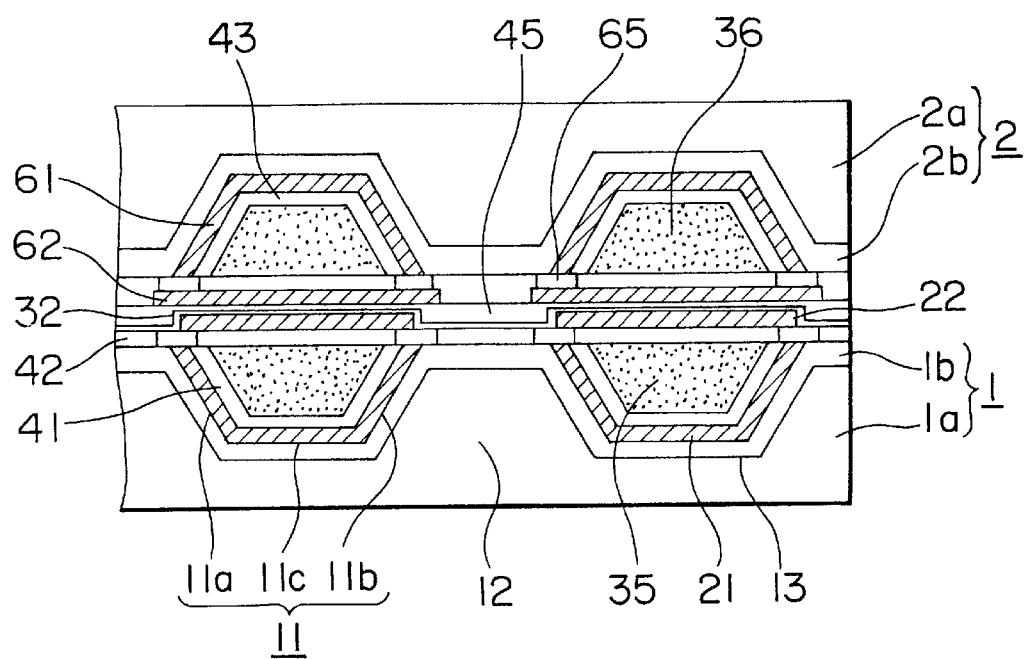
FIG. 25 is a lateral cross sectional view which illustrates a magnetic head according to a thirteenth embodiment of the present invention.

Another embodiment of the magnetic head claimed in claim 4 of the present invention will now be described. The description will, with reference to FIG. 25, be made about only different portions from the eleventh embodiment.

In this embodiment, a second substrate 2 is further provided for the magnetic head according to the eleventh embodiment. The second substrate 2 is formed by, for example, superposing an insulating layer 2*b* made of insulating material, such as $SiO_2$, on a single crystal silicon substrate 2*a* similarly to the first substrate. The second substrate 2 enables the adjacent second magnetic cores 36 to be separated assuredly from each other so that the cross talk can be prevented. Further, the second magnetic cores 36 and the third conductive passage 61 can be protected.

Fourteenth Embodiment

Figure 26:
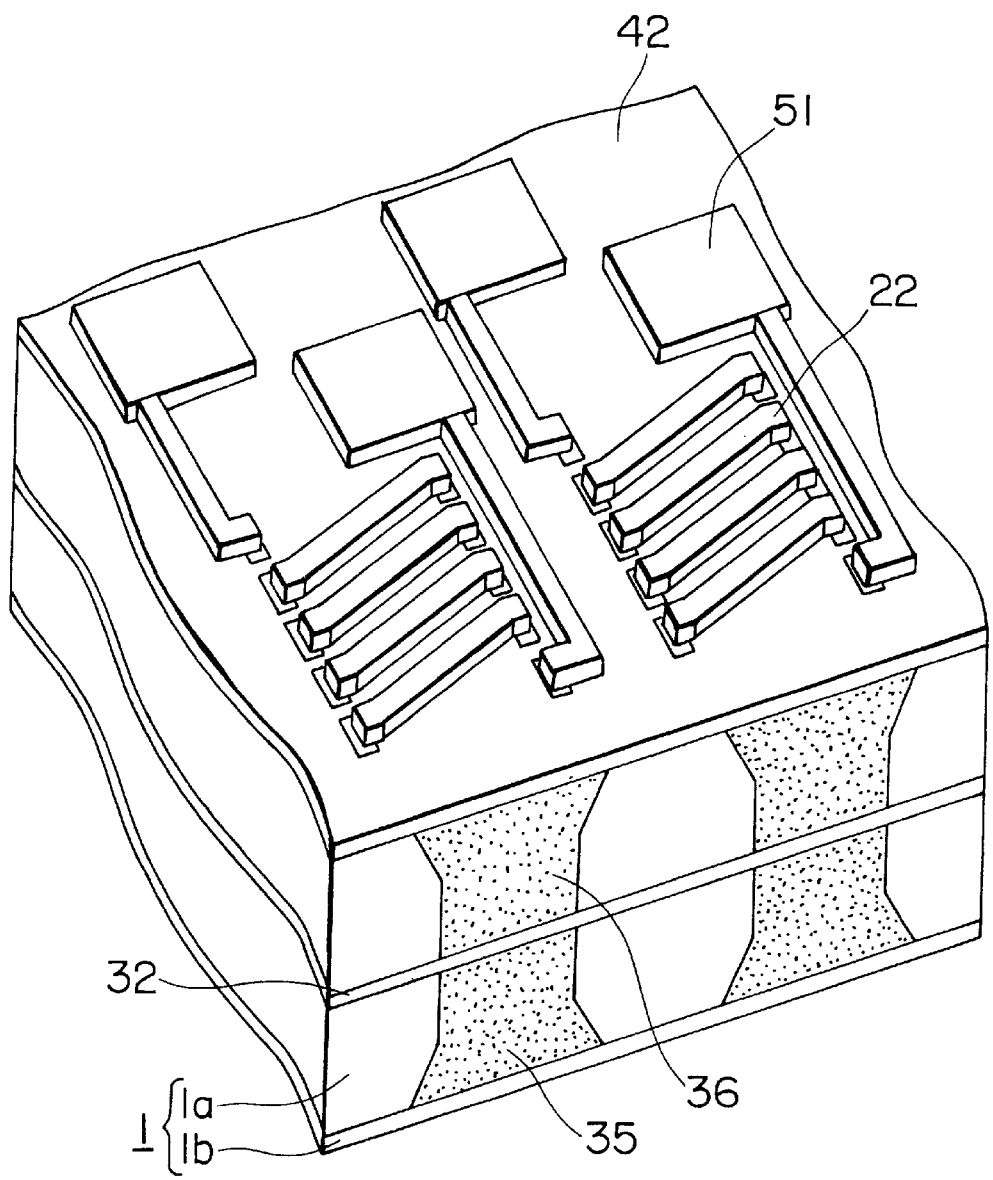
FIG. 26 is a perspective view which illustrates a magnetic head according to a fourteenth embodiment of the present invention.

An embodiment claimed in claim 5 of the present invention will now be described. FIG. 26 is a perspective view which illustrates a magnetic head according to a fourteenth embodiment, FIG. 27 is a perspective view which illustrates a substrate of the magnetic head according to this embodiment, FIG. 28 is a lateral cross sectional view of the magnetic head and FIG. 29 is a vertical cross sectional view.

Figure 27:
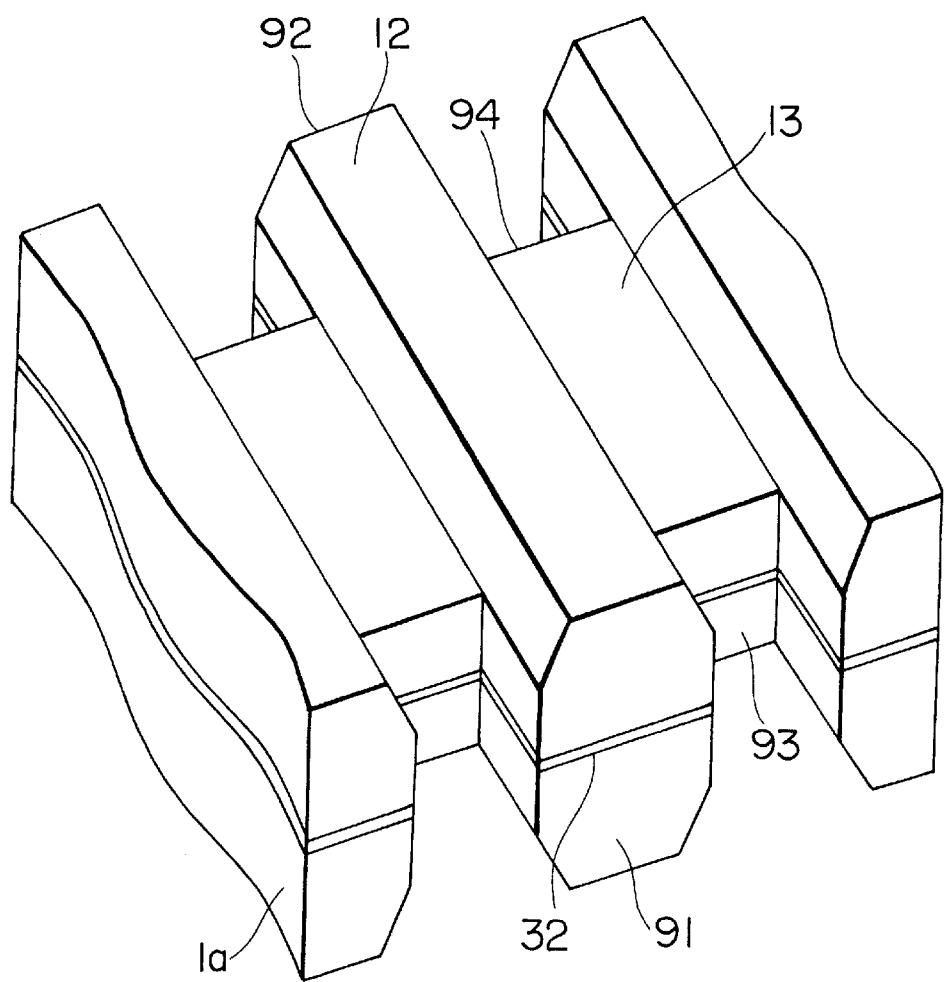
FIG. 27 is a perspective view which illustrates a substrate for the magnetic head according to the fourteenth embodiment.
Figure 28:
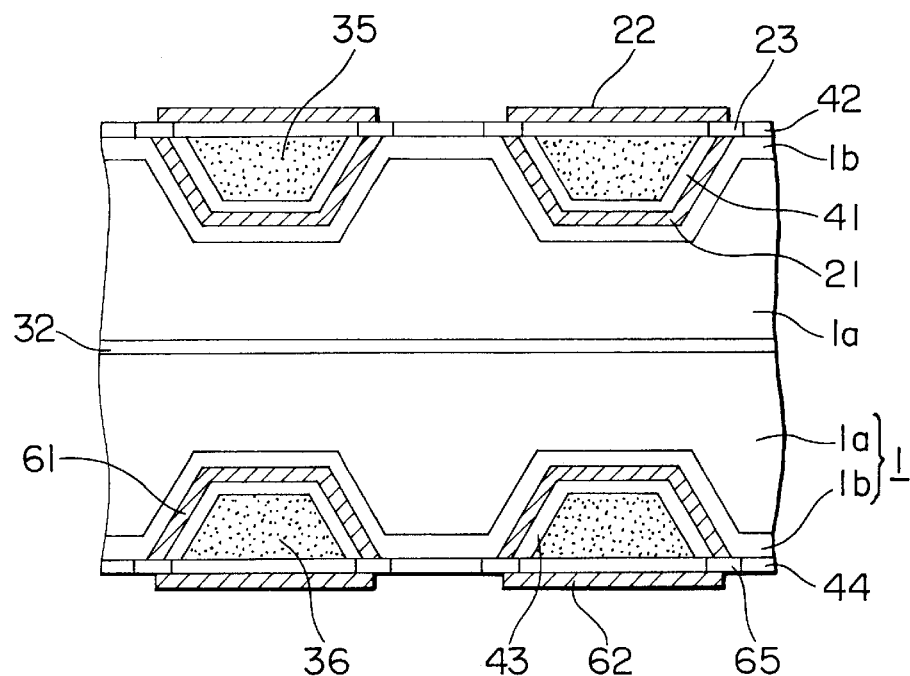
FIG. 28 is a lateral cross sectional view which illustrate the magnetic head according to the fourteenth embodiment.
Figure 29:
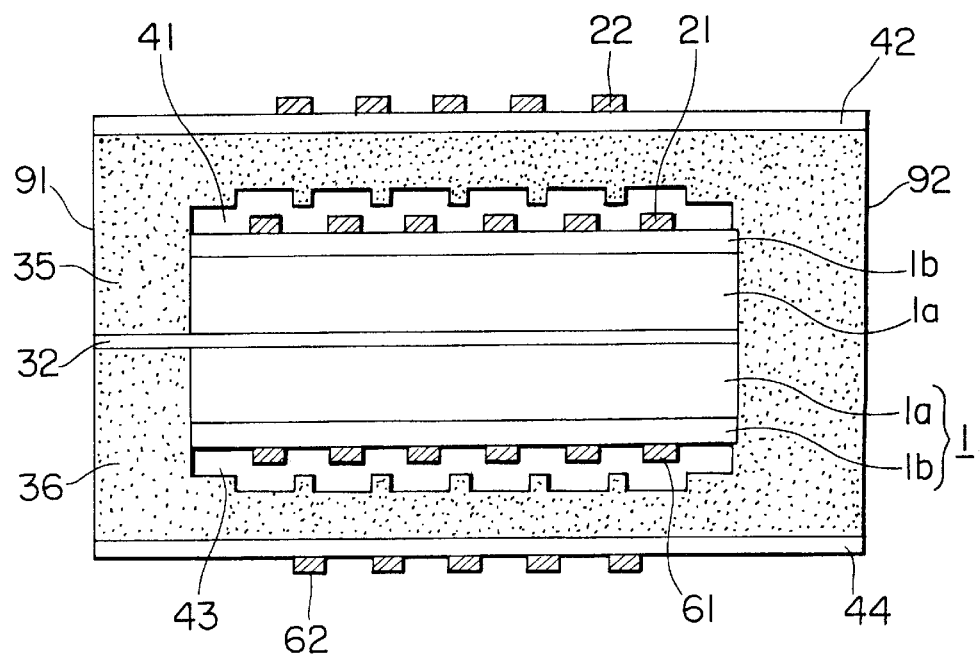
FIG. 29 is a vertical cross sectional view which illustrates the magnetic head according to the fourteenth embodiment.

The magnetic head according to this embodiment, as shown in FIG. 28, comprises the substrate 1, the first conductive passage 21, the second conductive passage 22, the first magnetic core 35, the third conductive passage 61, the fourth conductive passage 62, the second magnetic core 36, the magnetic gap 32, the first insulating layer 41, the second insulating layer 42, the third insulating layer 43 and the fourth insulating layer 44. Although FIGS. 26 to 29 illustrate the magnetic head for two channels for easy understanding, the structure, of course, relates to a multi-channel magnetic head.

As shown in FIG. 27, the substrate 1 is an insulating substrate comprising the single crystal silicon substrate 1*a* and insulating layers 1*b* and 1*c* made of $SiO_2$, the substrate 1 having a plurality of ridge-like projections 12 on the two vertical surfaces thereof at corresponding positions. The space between the ridge-like projections is formed into the flat portion 13. The two side surfaces of the ridge-like projection 12 are formed into slant surfaces with respect to the flat portion 13. The two side surfaces of the ridge-like projection 12 and the flat portion 13 form the recess. The length of the flat portion 13 is shorter than that of the ridge-like projection 12. Further, a front end surface 93 and a rear end surface 94 are positioned in the rear of projection end surfaces 91 and 92. As shown in FIG. 28, a plurality of parallel and conductive passages formed on the two side surfaces of the ridge-like projections 12 and bottom surfaces 13 and made of aluminum or copper form the first conductive passage 21 on the top surface of the substrate 1. Further, a third conductive passage 61 is formed in the lower surface of the substrate 1. The first magnetic core 35 formed on the top surface of the substrate 1 and the second magnetic core 36 formed on the lower surface of the same are made of magnetic material, such as Permalloy or Sendust, enclosed to have a thickness thinner than the height of the projection 12. As shown in FIG. 29, the first magnetic core 35 and the second magnetic core 36 are, adjacent to the magnetic recording medium sliding surface 91, separated from each other by the magnetic gap 32, while they are connected to each other on a side 92 opposing the magnetic recording medium sliding surface 91. The magnetic gap 32 is made of the non-magnetic material and formed between the first magnetic core 35 adjacent to the magnetic recording medium sliding surface 91 and the second magnetic core 36. Since the plural first magnetic cores 35 and the second magnetic cores 36 are completely separated from each other by the projections 12, the cross talk can be prevented. The contact hole 23 is formed in the second insulating layer 42 to establish the connection between an end of the first conductive passage 21 and the second conductive passage 22. The contact hole 65 is formed in the fourth insulating layer 44 to establish the connection between the end of the third conductive passage 1 and the fourth conductive passage 62. The second conductive passage 22 and the fourth conductive passage 62 are parallel and conductive passages made of aluminum or copper, the second conductive passage 22 being sequentially connected to the ends of the first conductive passages 21 via the contact holes 23. The fourth conductive passage 62 are sequentially connected to the ends of the third conductive passages 61 via the contact holes 65. The first conductive passages 21 and the second conductive passages 22 form a plurality of integrated first coils to be wound around the first magnetic core 35. The third conductive passages 61 and the fourth conductive passages 62 form a plurality of integrated second coil to be wound around the second magnetic core 36. As a result of the foregoing structure, the distance from the first coil and the second coil can be lengthened. Therefore, the mutual influence of the coils can be eliminated considerably. Further, a magnetic head can be formed in which multiplex-winding can easily be realized, the disposition intervals can be considerably shortened, and the accuracy of the magnetic gap length and the relative position can be improved.

Fifteenth Embodiment

Figure 30:
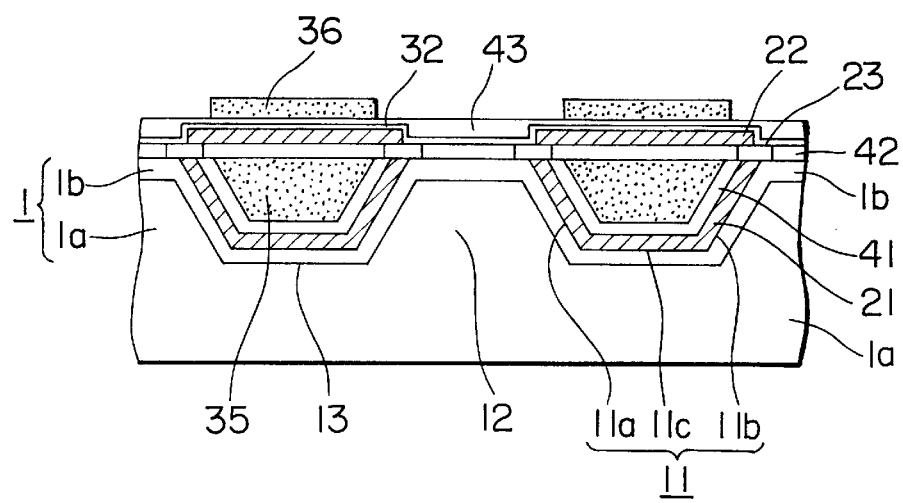
FIG. 30 is a lateral cross sectional view which illustrates a magnetic head according to a fifteenth embodiment of the present invention.
Figure 31:
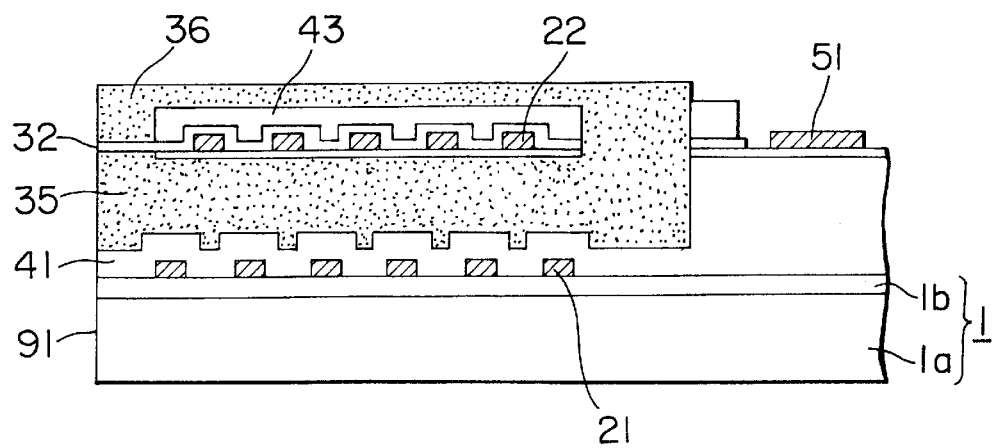
FIG. 31 is a vertical cross sectional view which illustrates the magnetic head according to the fifteenth embodiment.

An embodiment of a magnetic head claimed in claim 6 of the present invention will now be described. FIG. 30 is a lateral cross sectional view which illustrates the magnetic head according to a fifteenth embodiment, and FIG. 31 is a vertical cross sectional view.

The magnetic head according to this embodiment comprises the substrate 1, the first conductive passage 21, the second conductive passage 22, the first magnetic core 35, the second magnetic core 36, the magnetic gap 32, the first insulating layer 41, the second insulating layer 42 and the third insulating layer 43. Although FIGS. 30 and 31 illustrate the structure of the magnetic head for two channels for easy understanding, this embodiment, of course, relates to a multi-channel magnetic head.

The substrate 1 is the insulating substrate comprising the single crystal silicon substrate 1a and the insulating layer 1b made of SiO$_2$ or the like, the substrate 1 having a plurality of projections 12 formed on the surface thereof. The space between the projections 12 is formed into the flat portion 13. The two side surfaces of the projection 12 are formed into slant surfaces with respect to the flat portion 13, the two side surfaces of the projections 12 and the flat portion 13 forming the recess 11. The first conductive passage 21 comprises a plurality of parallel and conductive passages formed on the two side surfaces of the projections 12 and the bottom surfaces 13 and made of aluminum or copper. The first magnetic core 35 is made of magnetic material, such as Permalloy or Sendust, enclosed in the recess 11 to have a thickness thinner than the height of the projection 12. Since the plural first magnetic cores 35 are completely separated from each other by the projections 12, the cross talk can be prevented. The contact hole 23 is formed in the second insulating layer 42 for establishing the connection between the end of the first conductive passage 21 and the second conductive passage 22. The second conductive passage 22 comprises a plurality of parallel and conductive passages formed on the second conductive passage 42 and made of aluminum or copper, the second conductive passage 22 being sequentially connected to the ends of the first conductive passages 21 by the contact holes 23. The first conductive passages 21 and the second conductive passages 22 form a plurality of integrated coils to be wound around the first magnetic core 35. The second magnetic core 36 is made of magnetic material, such as Permalloy or Sendust. The magnetic gap 32 made of the non-magnetic material is formed between the first magnetic core 35 and the second magnetic core 36 at a position adjacent to the magnetic recording medium sliding surface 91. The second magnetic core 36 is connected to the first magnetic core 31 by the magnetic material on the side opposing the magnetic recording medium sliding surface 91. The third insulating layer 43 is formed between the conductive passage, such as the second conductive passage 22, and the second magnetic core so that occurrence of short circuit in the conductive passage, such as the second conductive passage 22 is prevented and heat radiation from the same is enhanced. As a result of the structure thus-arranged, a magnetic head can be formed in which multiplex-winding can easily be realized, the disposition intervals can be considerably shortened, and the accuracy of the magnetic gap length and the relative position can be improved.

Sixteenth Embodiment

Figure 32:
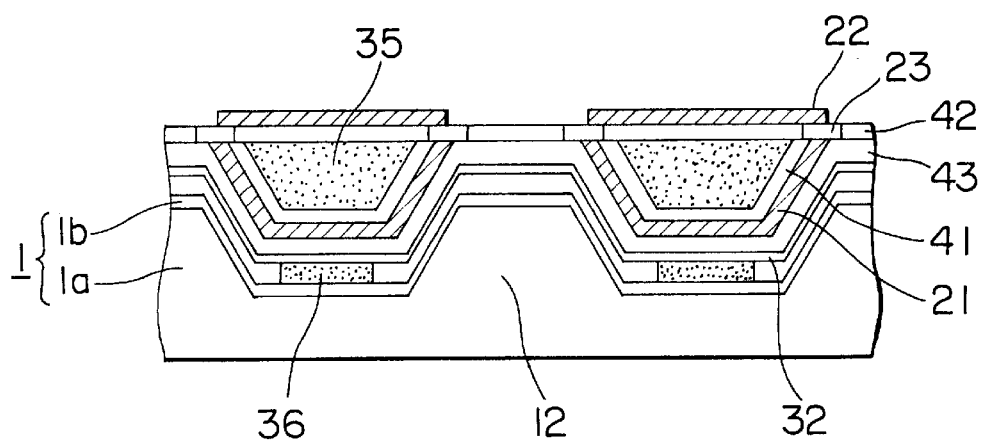
FIG. 32 is a lateral cross sectional view which illustrates a magnetic head according to a sixteenth embodiment of the present invention.
Figure 33:
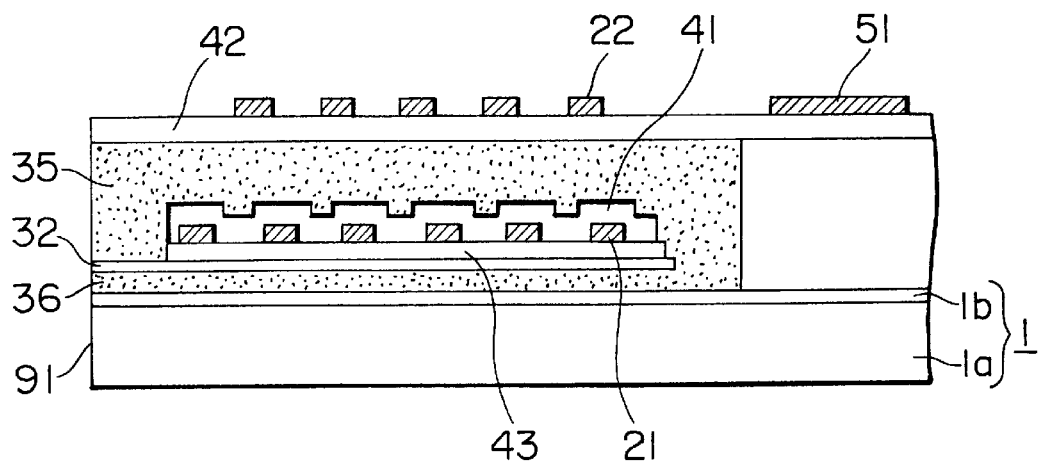
FIG. 33 is a vertical cross sectional view which illustrates the magnetic head according to t he sixteenth embodiment.

Another embodiment of the magnetic head claimed in claim 6 of the present invention will now be described. FIG. 32 is a lateral cross sectional view which illustrates the magnetic head according to a sixteenth embodiment, and FIG. 33 is a vertical cross sectional view.

The magnetic head according to this embodiment comprises the substrate 1, the first conductive passage 21, the second conductive passage 22, the first magnetic core 35, the second magnetic core 36, the magnetic gap 32, the first insulating layer 41, the second insulating layer 42 and the third insulating layer 43. Although FIG. 32 illustrates the structure of the magnetic head for two channels for easy understanding, this embodiment, of course, relates to a multi-channel magnetic head.

The substrate 1 is the insulating substrate comprising the single crystal silicon substrate 1a and the insulating layer 1b made of SiO$_2$ or the like, the substrate 1 having a plurality of projections 12 formed on the surface thereof. The space between the projections 12 is formed into the flat portion 13. The two side surfaces of the projection 12 are formed into slant surfaces with respect to the flat portion 13, the two side surfaces of the projections 12 and the flat portion 13 forming the recess 11. The bottom surface 13 of the recess 11 has, thereon, the second magnetic core 36 made of magnetic material, such as Permalloy or Sendust. The first conductive passage 21 comprises a plurality of parallel and conductive passages formed on the two side surfaces of the projection 12 and the third insulating layer 43 and made of aluminum or copper. The first magnetic core 35 is made of magnetic material, such as Permalloy or Sendust, enclosed in the recess 11 to have a thickness thinner than the height of the projection 12. Since the plural first magnetic cores 35 are completely separated from each other by the projections 12, the cross talk can be prevented. The second conductive passage 22 comprises a plurality of parallel and conductive passages formed on the second insulating layer 41 and made of aluminum or copper, the second conductive passage 22 being sequentially connected to the ends of the first conductive passages 21. The first conductive passages 21 and the second conductive passages 22 form a coil to be wound around the first magnetic core 35. The magnetic gap 32 made of the non-magnetic material is formed between the first magnetic core 35 and the second magnetic core 36 at a position adjacent to the magnetic recording medium sliding surface 91. The second magnetic core 36 is connected to the first magnetic core 31 by the magnetic material on the side opposing the magnetic recording medium sliding surface 91. As a result of the structure thus-arranged, a magnetic head can be formed in which multiplex-winding can easily be realized, the disposition intervals can be considerably shortened, and the accuracy of the magnetic gap length and the relative position can be improved.

Seventeenth Embodiment

Another embodiment claimed in claims 1 to 6 of the present invention will now be described with reference to FIG. 1.

Although the each of the foregoing embodiments is arranged in such a manner that the substrate 1 is the insulating substrate comprising the single crystal silicon substrate 1a and the insulating layer 1b made of $SiO_2$ or the like, the substrate 1a may be made of material, such as metal, glass or resin. The material of the insulating layer 1b is not limited to $SiO_2$.

The substrate 1 may be made of insulating material, such as sapphire, glass, ceramic or a metal oxide. In this case, the insulating layer 1b can be omitted and the insulation between the substrate and the second conductive passage 22 can always be maintained. Further, excellent heat conductivity can be obtained, resulting in an excellent heat radiation effect. Further, the elimination of the necessity of forming the insulating layer 1b enables the manufacturing process to be simplified, causing the manufacturing cost to be reduced.

Eighteenth Embodiment

Figure 34:
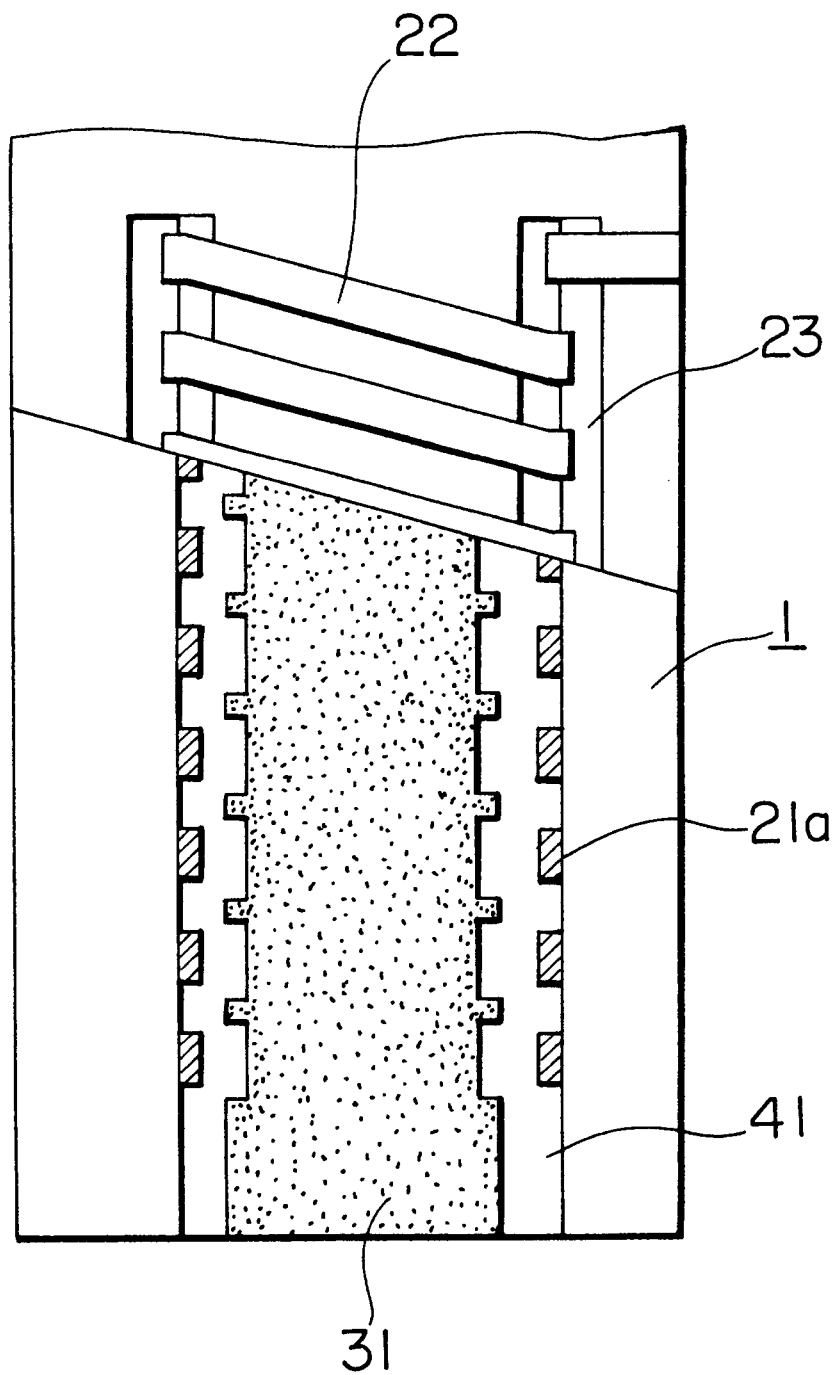
FIG. 34 is a partially-broken top view which illustrates a magnetic head according to an eighteenth embodiment of the present invention.

Another embodiment claimed in claims 1 to 6 of the present invention will now be described with reference to FIG. 34.

In each of the foregoing embodiments, the contact holes, each of which is formed in the second insulating layer for establishing the connection between the end surface 21a of the first conductive passage 21 and the second conductive passage 22, are respectively formed in the connection portions between the first conductive passage end surfaces 21a and the second conductive passage ends 22. In this embodiment, one contact hole 23 establishes the connections of the connection portions disposed in the same line. As a result of the foregoing structure, the allowances of the position and dimensional errors of the contact hole 23 can be enlarged at the time of forming the contact hole 23. Therefore, the connection between the first conductive passage 21 and the second conductive passage 22 can assuredly be established and the manufacturing cost can be reduced.

Nineteenth Embodiment

Figure 35A:
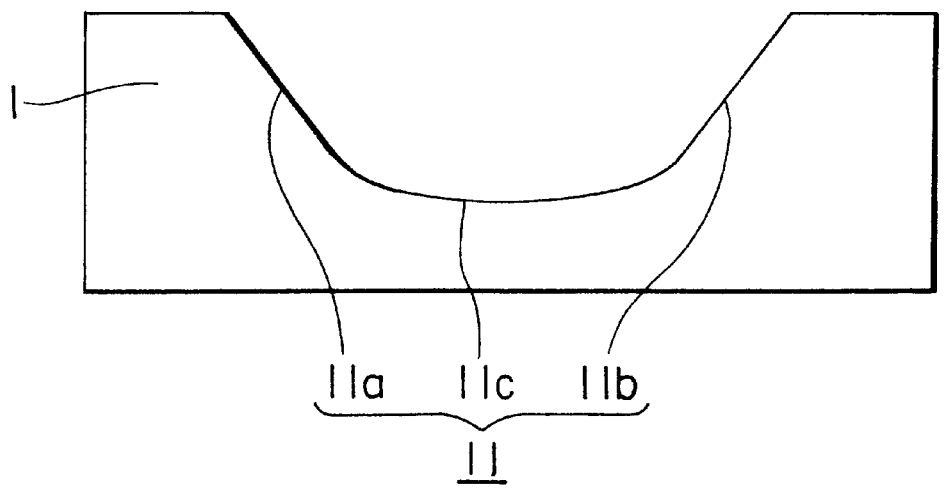
FIGS. 35A and 35B are lateral cross sectional views which illustrate an essential portion of a magnetic structure according to a nineteenth embodiment of the present invention.
Figure 35B:
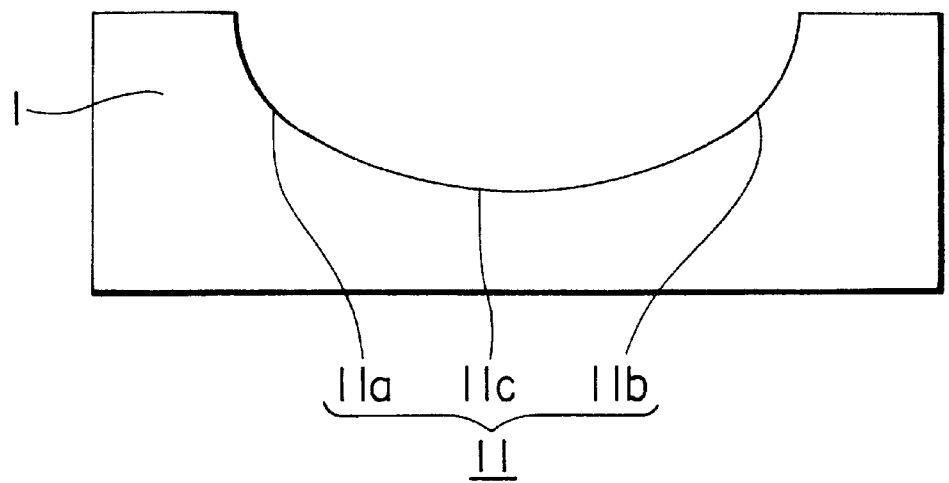

Another embodiment claimed in claims 1 to 6 of the present invention will now be described with reference to FIGS. 35A and 35B.

The projections 12, 15, 16 and the bottom surface of the recess 11 formed on the substrate are not limited to the flat surfaces as formed in each of the foregoing embodiments. For example, curved surfaces having slant surfaces arranged as shown in FIG. 35A may be employed to obtain a similar effect. Another structure as shown in FIG. 35B may be employed in which all of the side surfaces 11a, 11b, the bottom surfaces 11c and 13c are curved surfaces. In this case, it is preferable that the substrate 1 be made of non-crystal material such as glass or resin as described in the seventeenth embodiment.

Twentieth Embodiment

Another embodiment claimed in claims 1 to 6 of the present invention will now be described.

In each of the foregoing embodiments, the thickness of the first insulating layer 41 or that of the third insulating layer 43 is made to be thicker than the thickness of the first conductive passage 21 and that of the third conductive passage 62. The thickness may be thinner than that of the first conductive passage 21 and that of the third conductive passage 62 to provide the magnetic structure and the magnetic head enabling a similar effect to that of each of the foregoing embodiments to be obtained.

Twenty First Embodiment

Figure 36:
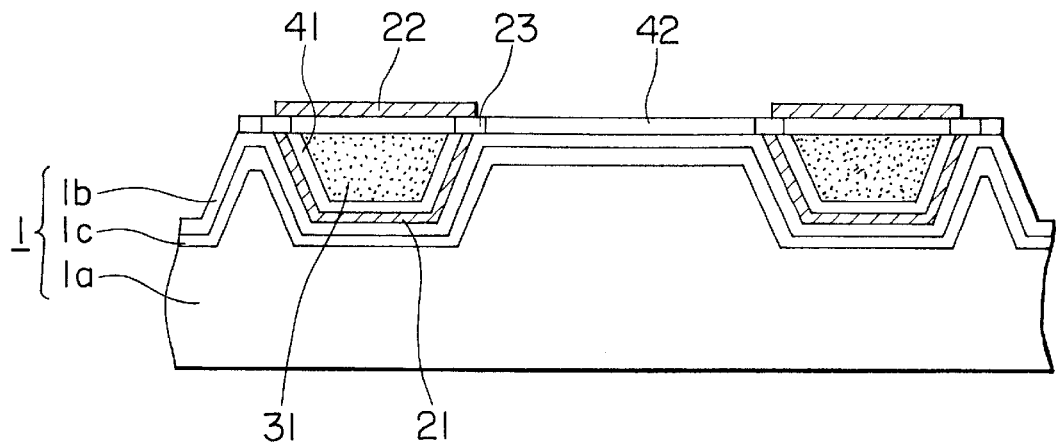
FIG. 36 is a lateral cross sectional view which illustrates a magnetic structure according to a twenty first embodiment of the present invention.

Another embodiment claimed in claims 1 to 6 of the present invention will now be described with reference to FIG. 36.

The magnetic layer 1c made of magnetic material, such as Permalloy or Sendust, is formed below the insulating layer 1b of the substrate 1. Since the magnetic layer 1c serves as a magnetic shield, the cross talk between the channels can be prevented.

Twenty Second Embodiment

Another embodiment claimed in claims 1 to 3, 5 and 6 of the present invention will now be described.

For example, a protection layer made of insulating material, such as glass or resin, is formed on the second conductive passage 22 or the fourth conductive passage 62. The protection layer protects the surface of the magnetic head from the ambience, and therefore, the reliability can be improved.

Twenty Third Embodiment

Figure 37:
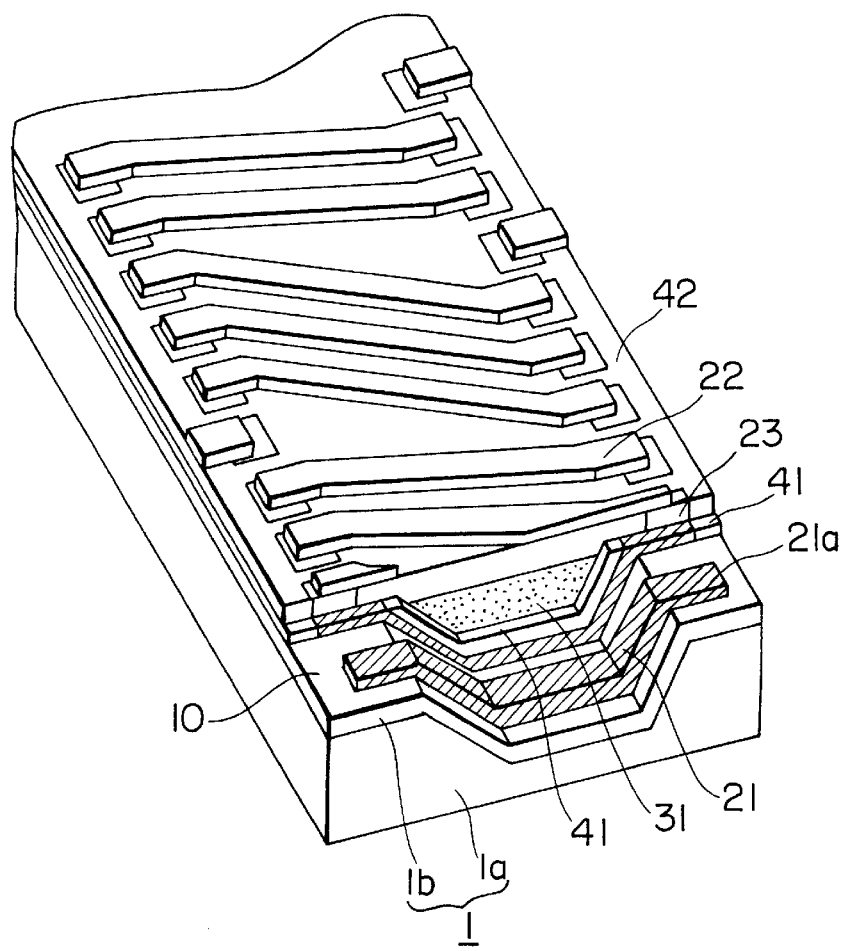
FIG. 37 is a partially-broken perspective view which illustrates a magnetic structure according to a twenty third embodiment of the present invention.

An embodiment of a magnetic structure claimed in claim 7 of the present invention will now be described. The description will be made about only the different portion from the first embodiment shown in FIGS. 1 and 2. FIG. 37 is a broken perspective view which illustrates the magnetic structure according to a twenty third embodiment, and FIG. 38 is a lateral cross sectional view.

Figure 38:
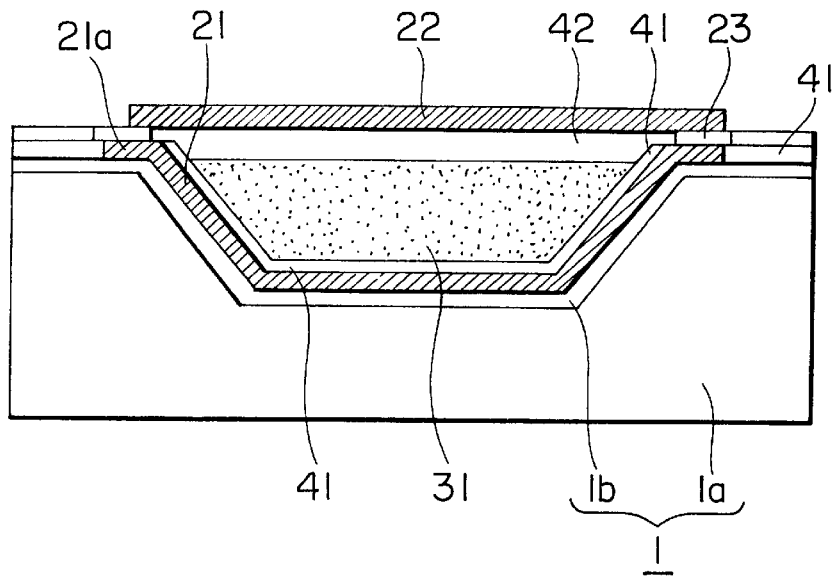
FIG. 38 is a lateral cross sectional view which illustrates the magnetic structure according to the twenty third embodiment.

As contrasted with the first embodiment in which the first conductive passage 21 is, as shown in FIG. 1, formed by the two side surfaces of the substrate recess 11 and the bottom surface, this embodiment is, as shown in FIGS. 37 and 38, arranged in such a manner that the first conductive passage 21a reaching the top surface 10 of the substrate 1 is formed. Further, the second conductive passage 22 is connected to the first conductive passage 21a formed on the top surface 10 of the substrate 1. As a result, the position of the contact hole on the second insulating layer 42 can be made on the substrate top surface 10. By positioning the contact hole 23 on the substrate top surface 10, the insulation of the first conductive passage 21 and the second conductive passage 22 from the magnetic core 31 can be made assuredly. Further, the allowances of the positional and dimensional errors of the contact hole 23 can be enlarged, causing the manufacturing cost to be reduced.

Although the twenty third embodiment is so arranged that the structure according to claim 7 is adapted to the one magnetic structure claimed in claim 1, the structure may, of course, be adapted to the magnetic structure claimed in claim 2, in which a plurality of structures are integrated on the same substrate, or adapted to the magnetic head claimed in claims 3 to 6 to obtain a similar effect.

Twenty Fourth Embodiment

Figure 39:
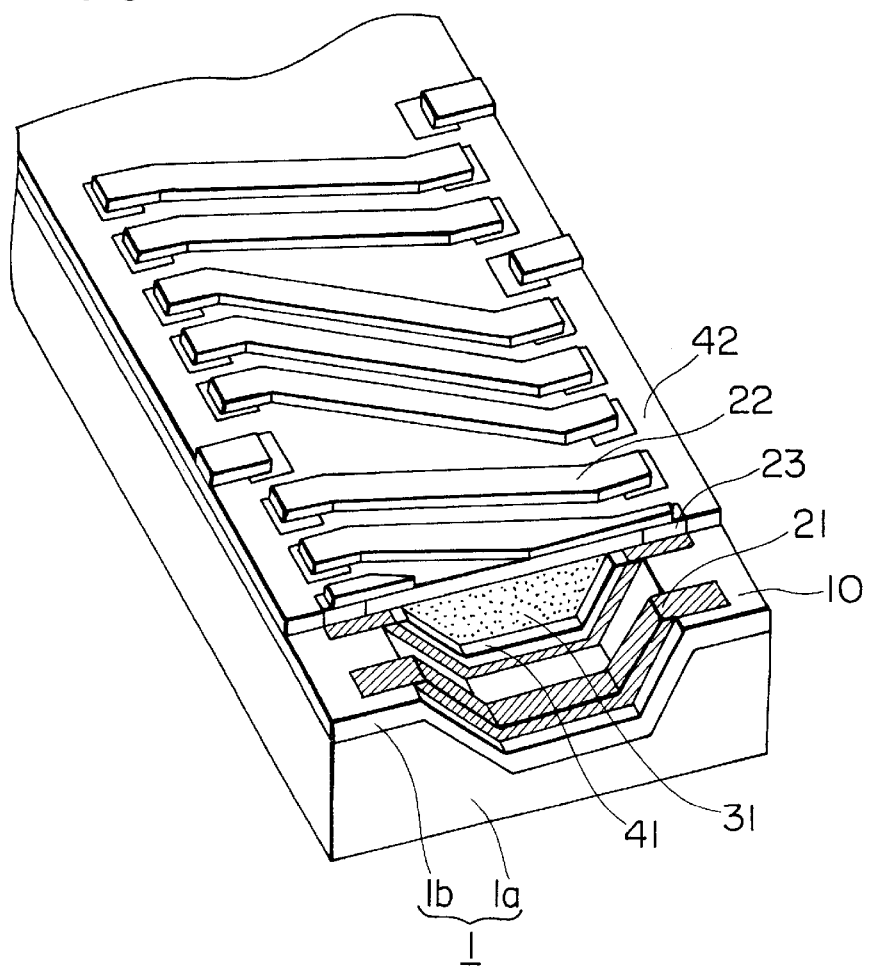
FIG. 39 is a partially-broken perspective view which illustrates a magnetic structure according to a twenty fourth embodiment of the present invention.
Figure 40:
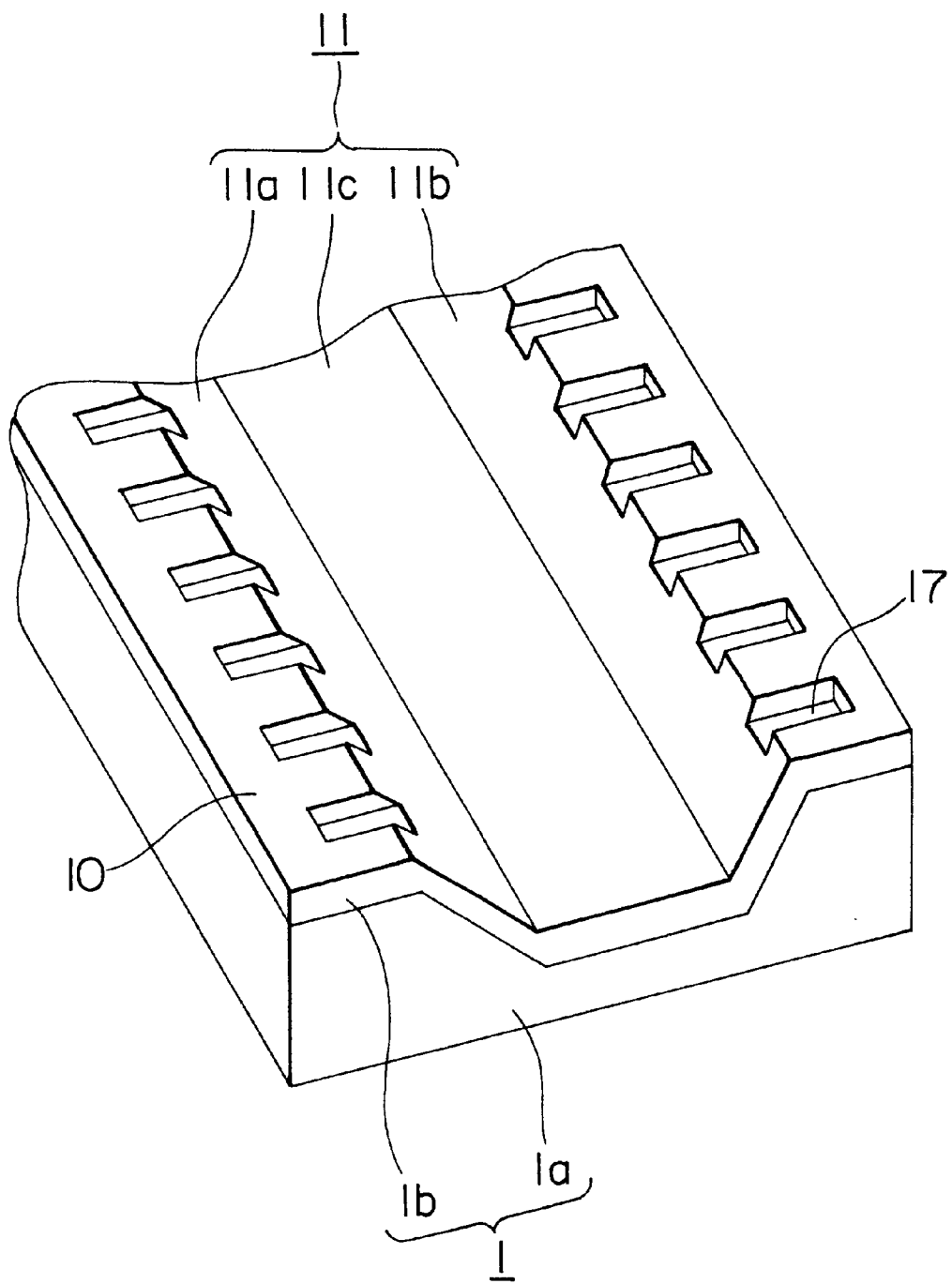
FIG. 40 is a perspective view which illustrates a substrate for the magnetic structure according to the twenty fourth embodiment.
Figure 41:
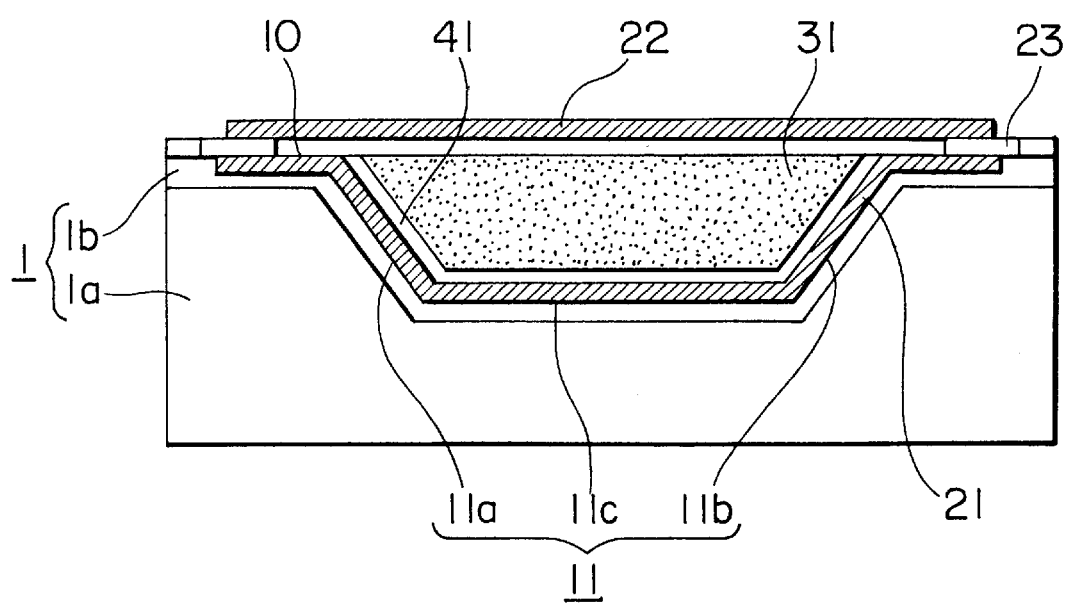
FIG. 41 is a lateral cross sectional view which illustrates the magnetic structure according to the twenty fourth embodiment.
Figure 42:
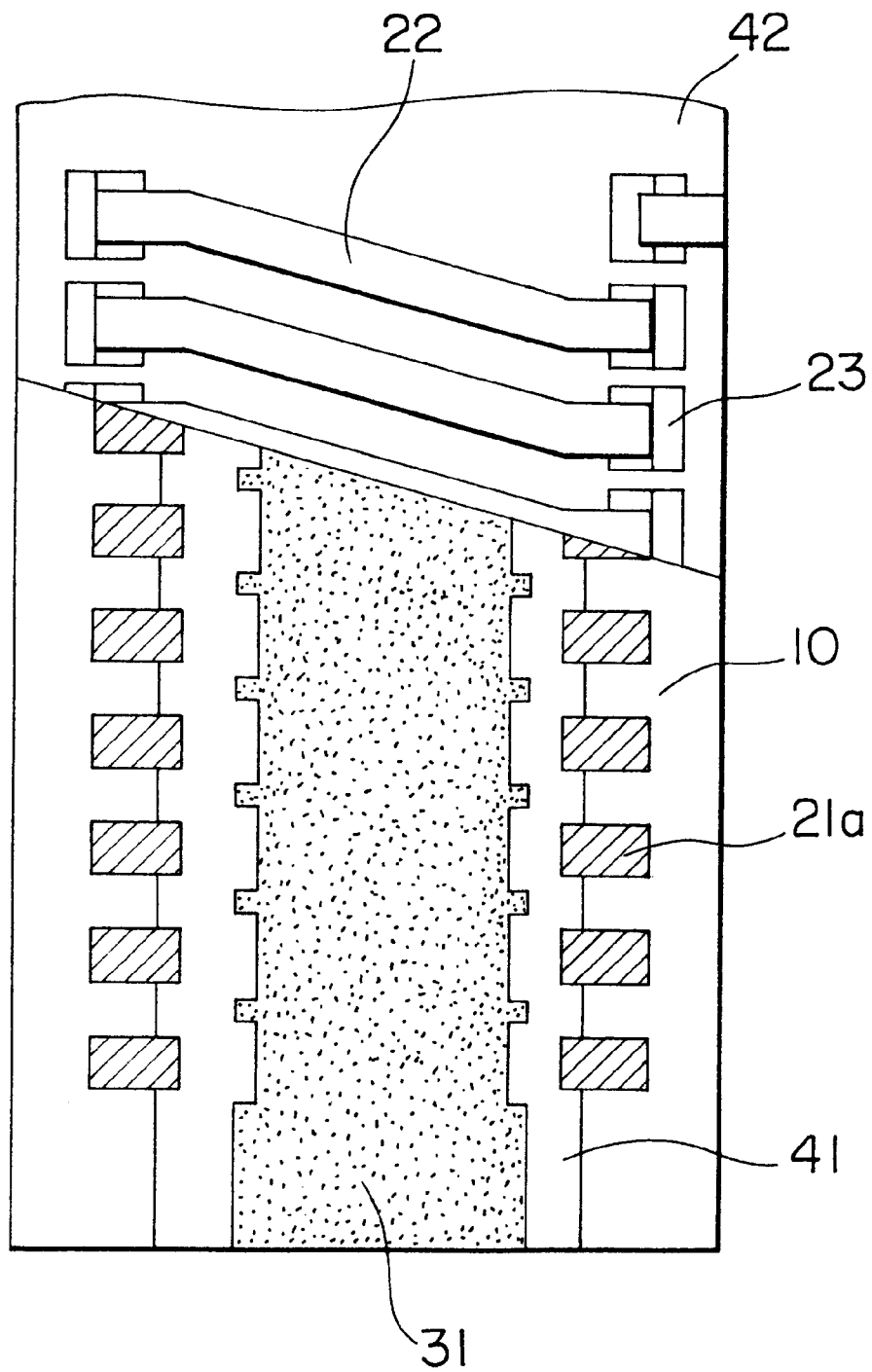
FIG. 42 is a horizontal cross sectional view which illustrates the magnetic structure according to the twenty fourth embodiment.

An embodiment of a magnetic structure claimed in claim 8 of the present invention will now be described. The description will be made about only different portions from the first embodiment. FIG. 39 is a perspective view which illustrates the magnetic structure according to a twenty fourth embodiment in a partially broken manner, and FIG. 40 is a perspective view which illustrates a substrate for the magnetic structure according to the twent fourth embodiment. FIG. 41 is a lateral cross sectional view which illustrates the magnetic structure, and FIG. 42 is a horizontal cross sectional view.

In the twenty fourth embodiment, a recess, that is a groove portion 17, is formed in the top surface 10 of the substrate 1. A plurality of the groove portions 17 are formed to run parallel at positions adjacent to the slant surface of the substrate recesses 11 of the substrate top surface 10.

Although the first embodiment is arranged in such a manner that the first conductive passage 21 is formed in only the side surfaces and the bottom surface of the recess 11, the twenty fourth embodiment is arranged in such a manner that the first conductive passage 21 is formed to cover the groove portion 17 in the substrate top surface, the two side surfaces and the bottom surface of the recess 11. The first conductive passage 21 and the second conductive passage 22 are connected to each other by the contact hole 23 in the second insulating layer 42 formed on the groove portion 17. As a result of the foregoing structure, the first conductive passage 21 and the second conductive passage 22 can assuredly be insulated from the magnetic core 31. Further, the allowances of the positional and dimensional errors of the contact hole can be enlarged, and therefore, the manufacturing cost can be reduced. Further, the plural first conductive passages 21 formed on the substrate top surface 10 can assuredly be insulated from each other by the grooves 17.

Although the twenty fourth embodiment is arranged in such a manner that the structure claimed in claim 8 is adapted to one magnetic structure claimed in claim 1, the structure may, of course, be adapted to the magnetic structure claimed in claim 2, in which a plurality of structures are integrated on the same substrate, or adapted to the magnetic head claimed in claims 3 to 6 to obtain a similar effect.

Twenty Fifth Embodiment

Figure 43:
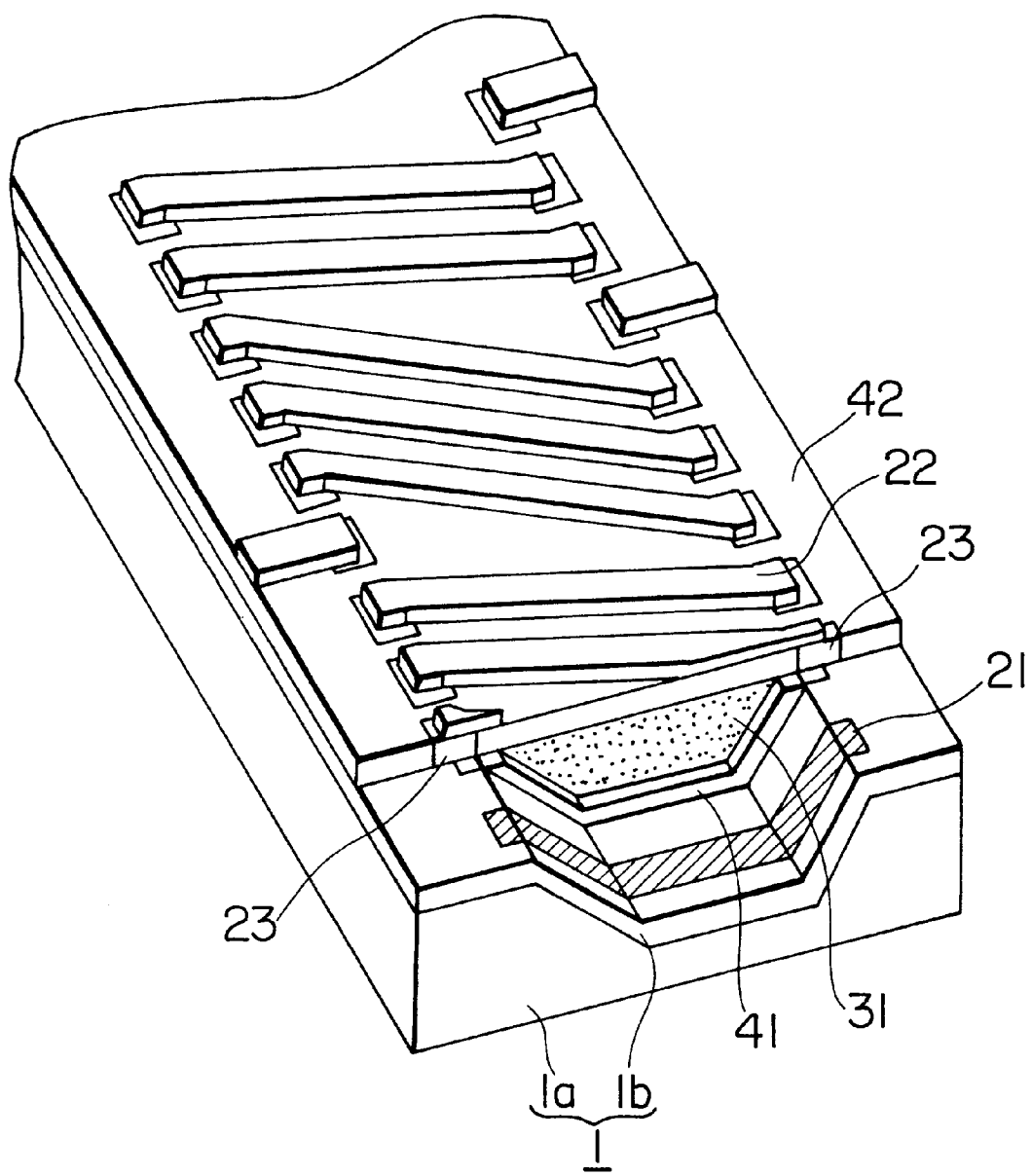
FIG. 43 is a partially-broken perspective view which illustrates a magnetic structure according to a twenty fifth embodiment of the present invention.

An embodiment of a magnetic structure claimed in claim 9 of the present invention will now be described. The description will be made about only different portions from the first embodiment. FIG. 43 is a perspective view which illustrates a magnetic structure according to a twenty fifth embodiment in a partial broken manner, and FIG. 44 is a perspective view which illustrates a substrate for the magnetic structure according to the twenty fifth embodiment.

Figure 44:
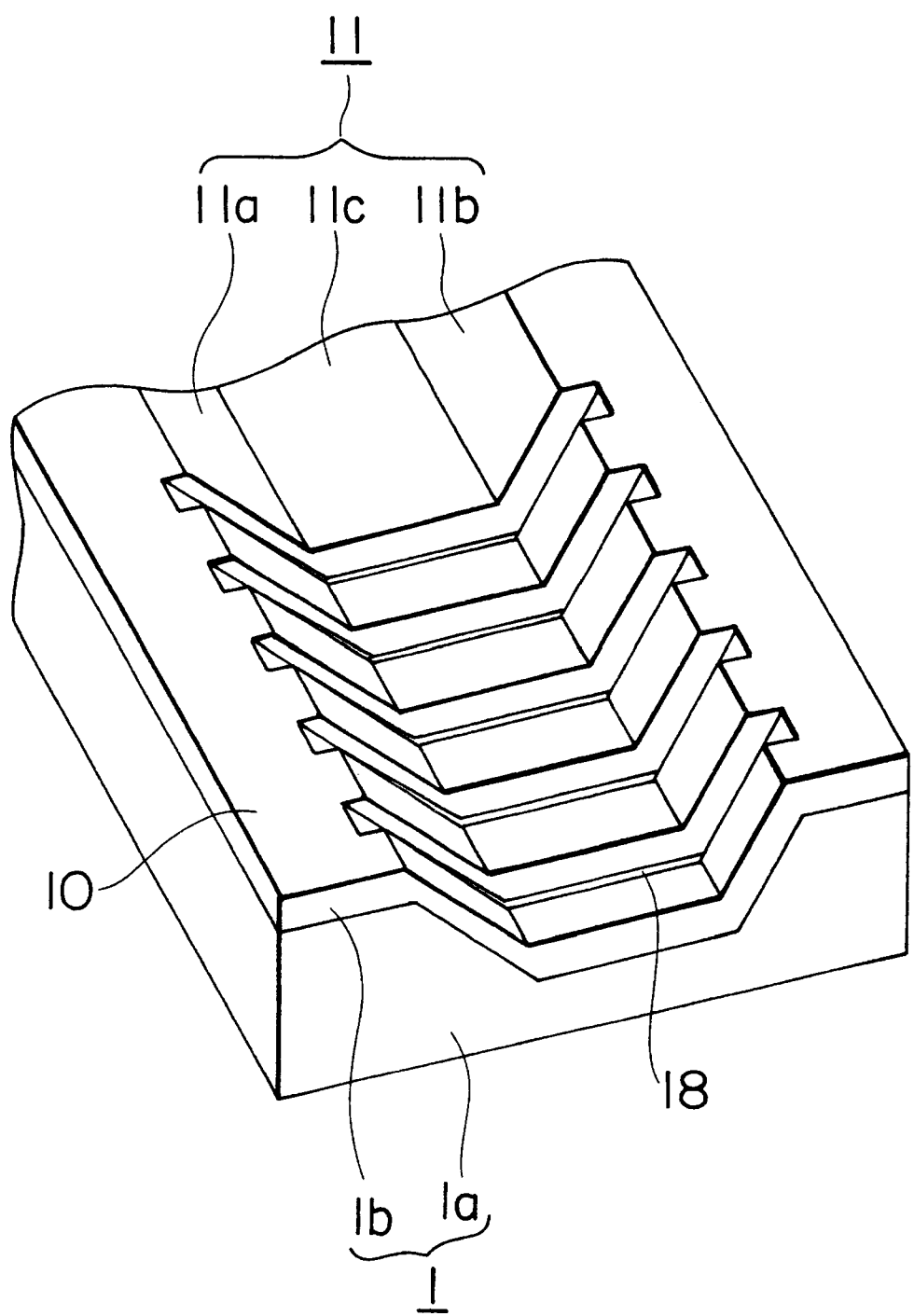
FIG. 44 is a perspective view which illustrates a substrate for the magnetic structure according to the twenty fifth embodiment.

The twenty fifth embodiment is, as shown in FIG. 44, arranged in such a manner that the groove portion 18 is formed by the two sides surfaces and the bottom surface of the recess 1. A plurality of the groove portions 18 are formed in parallel in the lengthwise direction of the recess 11. In the twenty fifth embodiment, the first conductive passage 21 is formed in the groove portion 18 as shown in FIG. 43. Therefore, the first conductive passages can assuredly be insulated from each other. The thickness of the first conductive passage 21 is made to be substantially the same as the depth of the groove portion 18. As a result, the bottom surface and the two side surfaces of the recess 11 are formed into flat surfaces after the first conductive passage 21 has been formed, causing the projections and pits as involved in the first embodiment to be eliminated. As a result, the first insulating layer 41 formed in the recess 11 and the surfaces of the magnetic core 31 facing the substrate recess are formed into flat surfaces after the first conductive passage 21 has been formed. As a result of the foregoing structure, the projections and pits as involved in the first embodiment can be eliminated from the magnetic core 31. Therefore, the loss of the magnetic flux passing through the magnetic core can be reduced, causing a magnetic core exhibiting an excellent magnetic flux efficiency to be obtained.

Although the twenty fifth embodiment is arranged in such a manner that the structure claimed in claim 9 is adapted to one magnetic structure claimed in claim 1, the structure may, of course, be adapted to the magnetic structure claimed in claim 2, in which a plurality of structures are integrated on the same substrate, or adapted to the magnetic head claimed in claims 3 to 6 to obtain a similar effect.

Although the twenty fifth embodiment is arranged in such a manner that the groove portion 18 is, as shown in FIG. 44, formed from the bottom surface 11c to the two sides surfaces 11a and 11b, it may, of course, be formed on the top surface.

Twenty Sixth Embodiment

Figure 45:
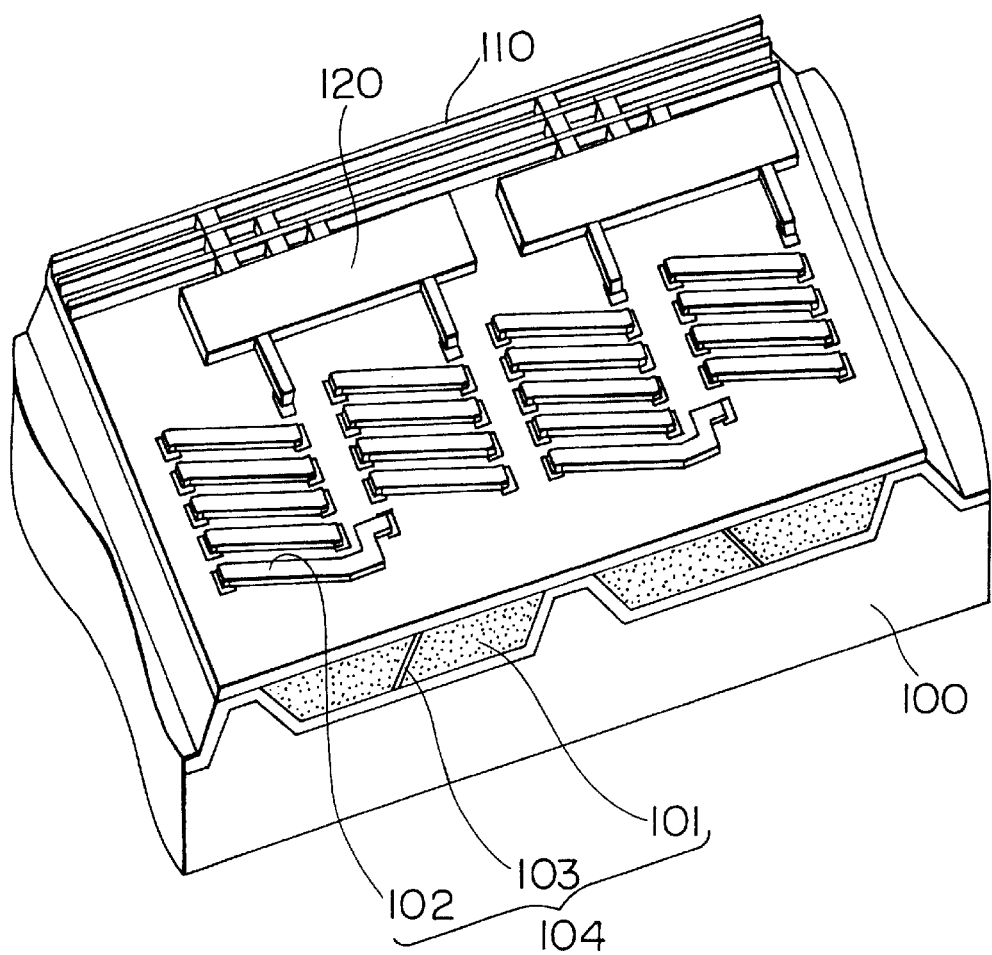
FIG. 45 is a perspective view which illustrates a magnetic head according to a twenty sixth embodiment of the present invention.

An embodiment of a magnetic head claimed in claim 10 of the present invention will now be described. FIG. 45 is a perspective view which illustrates the magnetic head according to a twenty sixth embodiment, and FIG. 46 is an explanatory view which illustrates a switching circuit for use in the twenty sixth embodiment.

A plurality of magnetic head chips 104 each of which is composed of a magnetic core 101, a coil 102 and a magnetic gap 103 are integrally formed on a substrate 100. Further, the substrate 100 has a power supply line 110 comprising a ground line, a positive line and a negative line and switching circuits 120, the power supply line 110 and the switching circuit 120 being integrally formed to correspond to the respective magnetic head chips 104. The switching circuit 120, as shown in FIG. 46, comprises an electrical turning on/off means with respect to the coil 102, signal lines 122 and 123 for transmitting/receiving signals to and from the adjacent switching circuit and a signal processing means 124 for controlling the foregoing electrical turning operation. The signal processing means 124 causes the electrical turning on/off means 121 to be operated in response to a specific signal supplied from an adjacent switching circuit through the signal line 122, and also transmits a specific signal to another adjacent switching circuit. By integrally forming the foregoing circuits on the substrate 100, the number of connection lines needed to establish the connection between the magnetic head and an external electric circuit can be decreased even if a large number of, for example, tens or more magnetic head chips 104 are formed. Further, the electrode pad can be omitted from the structure, and therefore, the intervals between magnetic head chips 104 can be shortened.

Figure 46:
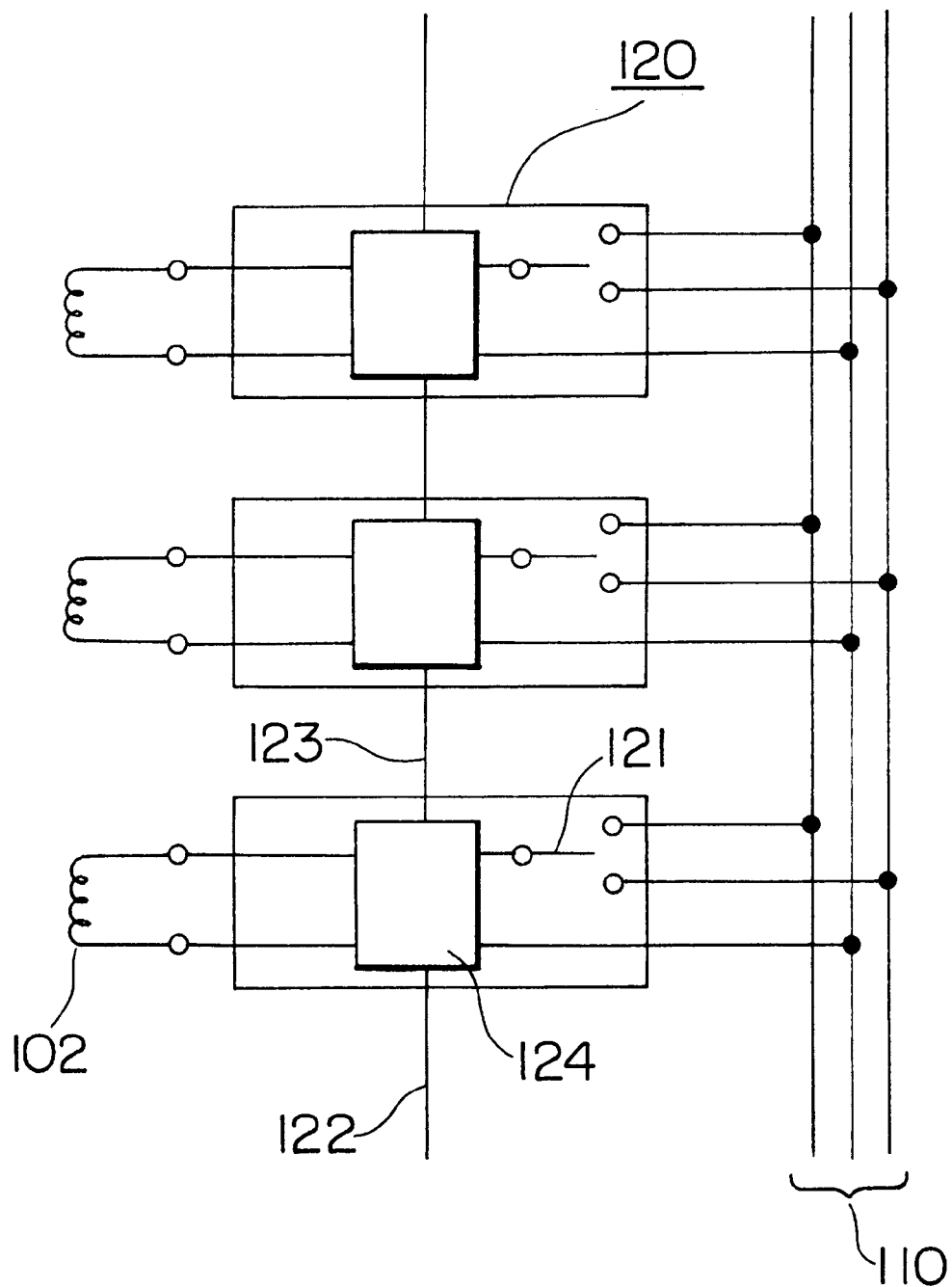
FIG. 46 is an explanatory view which illustrates a switching circuit according to the twenty sixth embodiment.

The power supply line 110 formed on the substrate 100 is not limited to the structure shown in FIG. 46 in which it comprises three lines including the grounding line. For example, a structure may be employed in which the electric turning on/off means is operated by a switching circuit in response to an output from the power supply portion and which comprises the power supply line composed of two lines including the ground line to obtain a similar effect to that obtainable from the twentieth embodiment.

Twenty Seventh Embodiment

Figure 47:
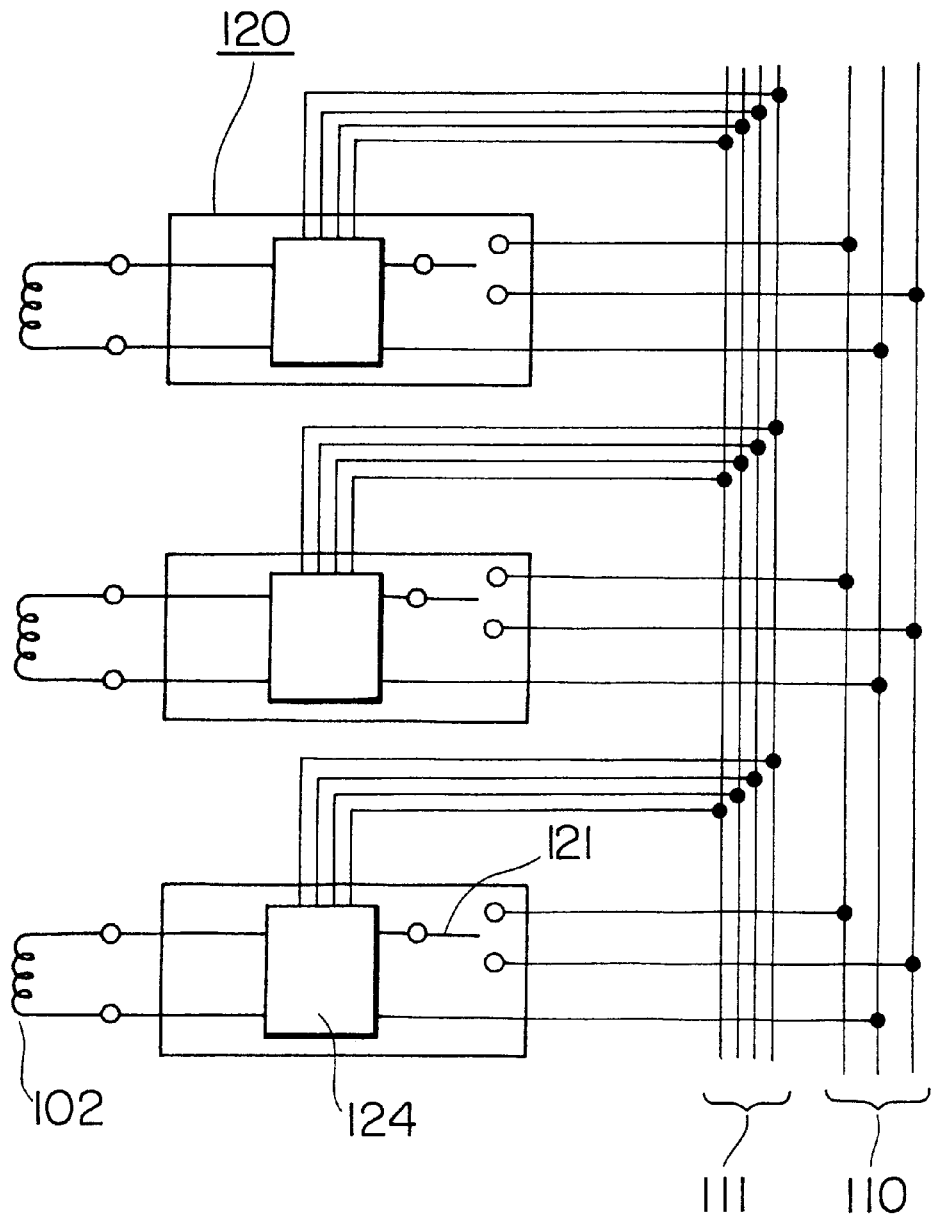
FIG. 47 is an explanatory view which illustrates a switching circuit according to a twenty seventh embodiment of the present invention.

Another embodiment of the magnetic head claimed in claim 10 of the present invention will now be described. FIG. 47 is an explanatory view which illustrates a switching circuit for use in a twenty seventh embodiment.

A plurality of magnetic head chips 104 each of which is composed of the magnetic core 101, the coil 102 and the magnetic gap 103 are integrally formed on the substrate 100. Further, the substrate 100 has the power supply line 110, an address line 111 and the switching circuit 120 formed integrally to correspond to the magnetic head chips 104. The switching circuit 120, as shown in FIG. 47, comprises the electric turning on/off means 121 and the signal processing means 124. The signal processing circuit 124 decodes a signal on the address line 111 to operate the electric turning on/off means 121 if the decoded result is the same as a predetermined address. By integrally forming the foregoing circuits on the substrate 100, the number of connection lines needed to establish the connection between the magnetic head and an external electric circuit (omitted from illustration) can be decreased even if a large number of, for example, tens or more magnetic head chips 104 are formed. Further, the electrode pad can be omitted from the structure, and therefore, the intervals between magnetic head chips 104 can be shortened.

The switching circuits 120 formed on the substrate 100 are not limited to those respectively formed on the magnetic head chips 104. Another structure may be employed in which a plurality of electric turning on/off means are provided for one switching circuit and the number of the switching circuits is decreased to be smaller than that of the magnetic head chips. Also in this case, a similar effect to that obtainable from the foregoing embodiments 26 and 27 can be obtained.

Twenty Eighth Embodiment

Figure 48:
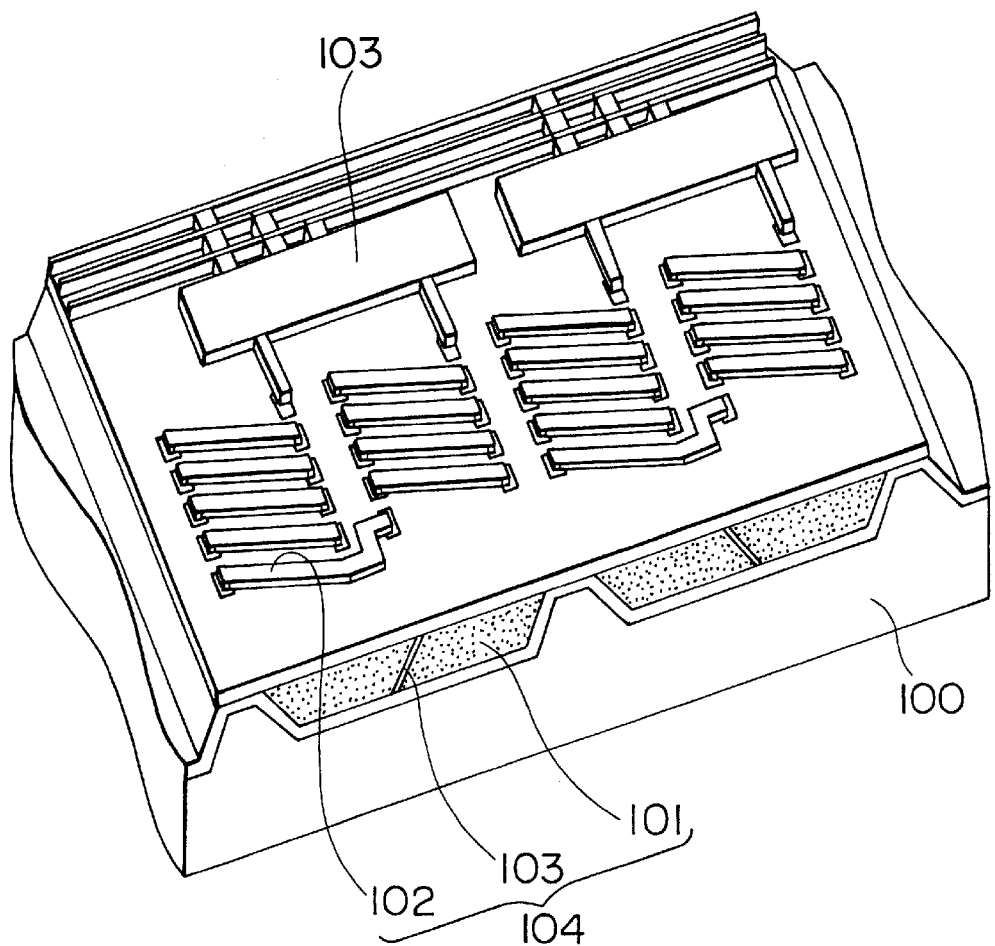
FIG. 48 is a perspective view which illustrates a magnetic head according to a twenty eighth embodiment of the present invention.

An embodiment of a magnetic head of the present invention will now be described. FIG. 48 is a perspective view which illustrates the magnetic head according to a twenty eighth embodiment.

A plurality of magnetic head chips 104 each comprising the magnetic core 101, the coil 102 and the magnetic gap 103 are integrally formed on a common substrate 100. Further, the substrate 100 has, thereon, amplifying circuits 130 formed integrally to correspond to the magnetic head chips 104. The amplifying circuit 130 amplifies a reproduction signal generated in the coil 102. By integrally forming the amplifying circuit with the magnetic head chip, the length of the signal line can be shortened. Therefore, the S/N ratio of the reproduction signal can be improved. If the frequency band region of the signals reproduced by the respective magnetic head chips 104 are considerably varied, for example, if one magnetic head 105 reproduces a video signal, an audio signal and a control track signal or the like, one magnetic head 105 is able to reproduce all of the foregoing signals by changing the frequency characteristics of the amplifying circuit of each magnetic head chip to correspond to the reproduction signal.

The method of disposing the amplifying circuits 130 formed on the substrate are not limited to the foregoing method in which the amplifying circuit 130 are respectively provided for the magnetic head chips 104. For example, the following structure may be employed in which: the switching circuit and the like according to the twenty eighth embodiment is provided for each magnetic head chip; the magnetic head chip group is divided into units respectively adapted to reproduce the video signal, the audio signal and the control track signal; and an amplifying circuit is provided to correspond to each of the frequency band regions of the signals reproduced by the respective units. In this case, a similar effect to that obtainable from the twenty eighth embodiment can be obtained even if the number of the amplifying circuits is decreased. Therefore, the manufacturing cost can be reduced.

Twenty Ninth Embodiment

Another embodiment of the magnetic head claimed in claim 10 of the present invention will now be described.

As contrasted with the twenty sixth to twenty eighth embodiments in which either of the consisting of the power supply line and the switching circuits or the group consisting of the signal amplifying circuits is formed integrally with the plural magnetic head chips, the method of integrally forming the group is not limited to this. For example, all of the power supply line, the switching circuits and the signal amplifying circuits may be collectively formed on the respective magnetic head chips to obtain a similar effect. In this case, each of the magnetic head chips is able to possess both recording and reproducing functions by selecting the power supply line and the switching circuits at the time of the recording operation and by selecting the signal amplifying circuits at the time of the reproducing operation. By providing the electric turning on/off means, the number of the signal amplifying circuits and that of the signal amplifying circuits can, of course, be decreased to be smaller than that of the magnetic head chips.

Thirtieth Embodiment

Figure 49:
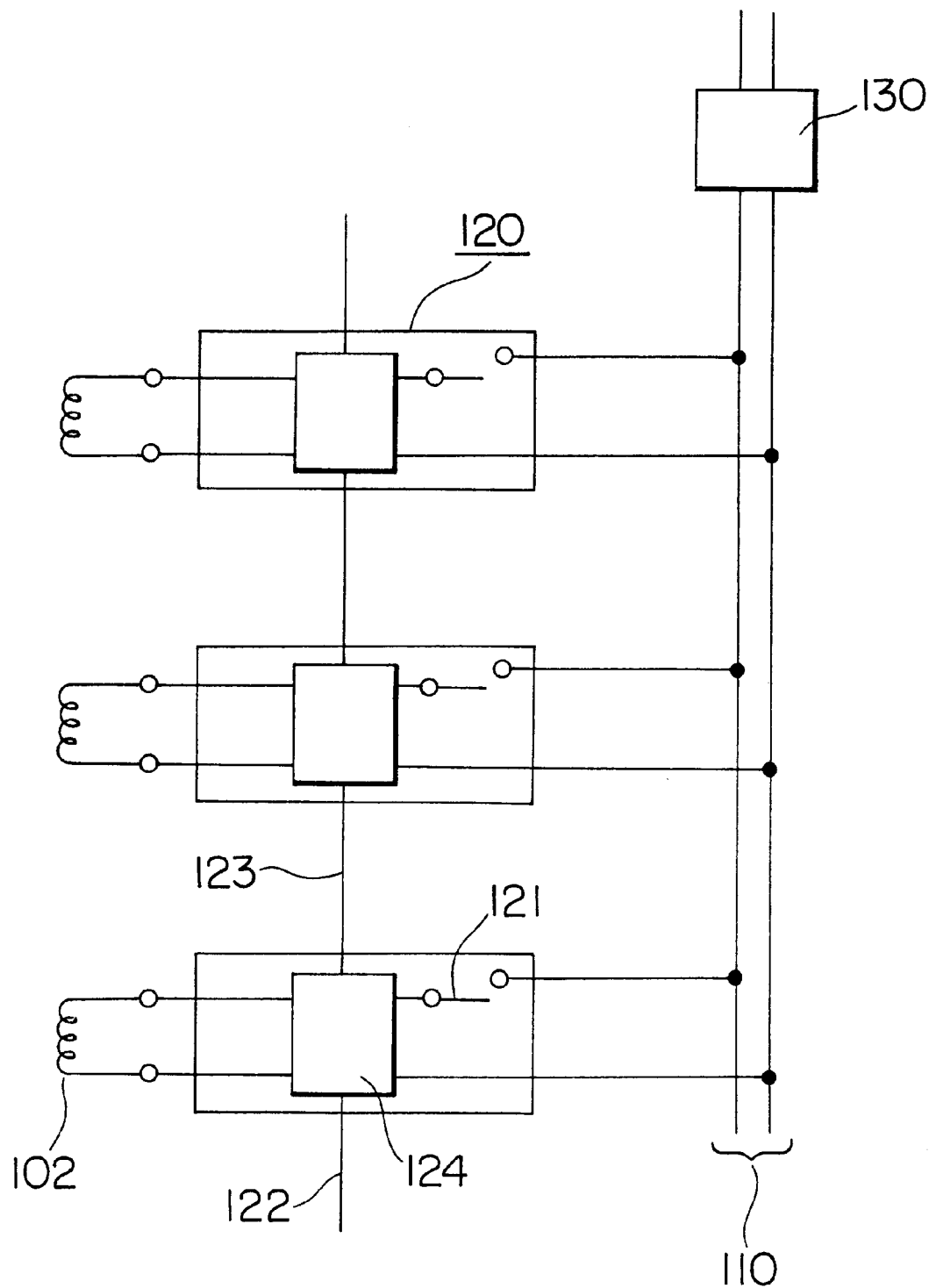
FIG. 49 is an explanatory view which illustrates a switching circuit according to a thirtieth embodiment of the present invention.

Another embodiment of a magnetic head of the present invention will now be described. FIG. 49 is an explanatory view which illustrates a switching circuit according to a thirtieth embodiment.

A plurality of magnetic head chips 104 each comprising the magnetic core 101, the coil 102 and the magnetic gap 103 are integrally formed on a common substrate 100. Further, the substrate 100 has, thereon, amplifying circuits 130, the switching circuits 120 corresponding to the respective magnetic head chips 104 and signal lines for establishing the connections between the amplifying circuits 130 and the switching circuits 120 are integrally formed.

The amplifying circuit 130 amplifies a reproduction signal generated in the coil 102. The switching circuit 120, as shown in FIG. 49, comprises the electric turning on/off means 121, signal lines 122 and 123 for transmitting/receiving signals to and from the adjacent switching circuits, and a signal processing means 124. The signal processing circuit 124 causes the electric turning on/off means to be operated in response to a specific signal supplied from either of the adjacent switching circuits and transmits a specific signal to another adjacent switching circuit. By integrally forming the foregoing circuits on the substrate 100, the length of the signal line can be shortened and the S/N ratio of the reproduction signal can be improved. Since the reproduction signals from the respective coils 102 are amplified by one amplifying circuit 130, stable amplifying characteristics can be obtained as compared with a case in which they are amplified by the plural amplifying circuits. Therefore, the manufacturing cost can be reduced.

Thirty First Embodiment

Figure 50:
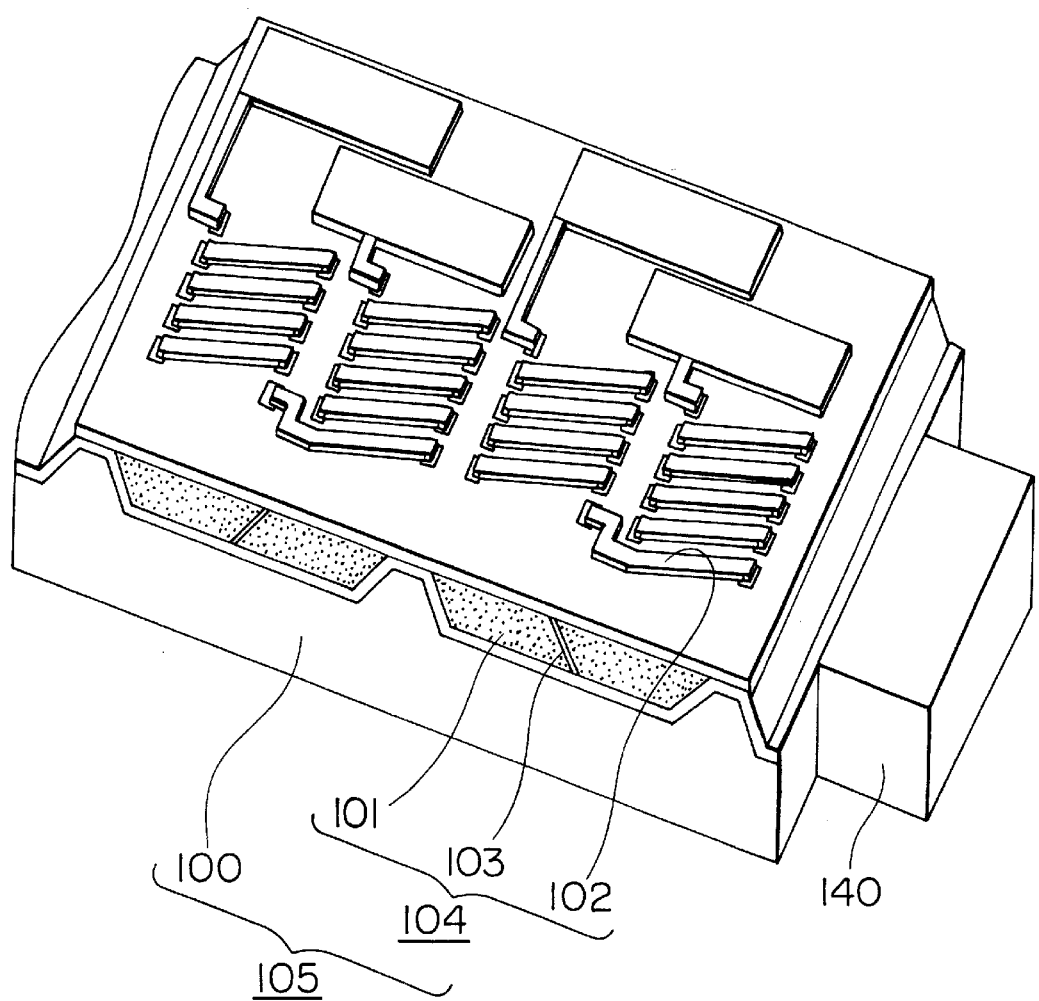
FIG. 50 is a perspective view which illustrates a magnetic head according to a thirty first embodiment of the present invention.
Figure 51A:
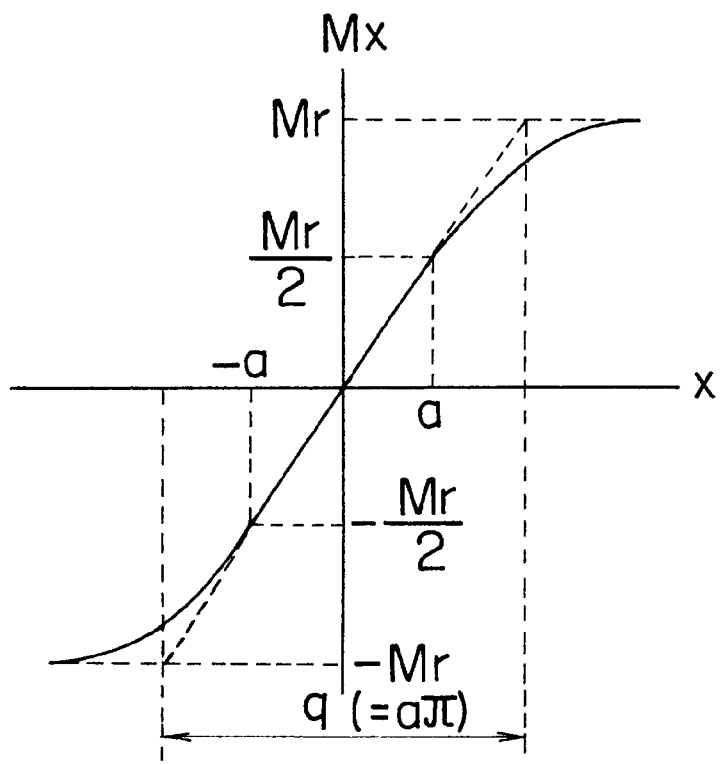
FIGS. 51A and 51B are explanatory views which illustrate the operation of the magnetic head according to the thirty first embodiment.
Figure 51B:
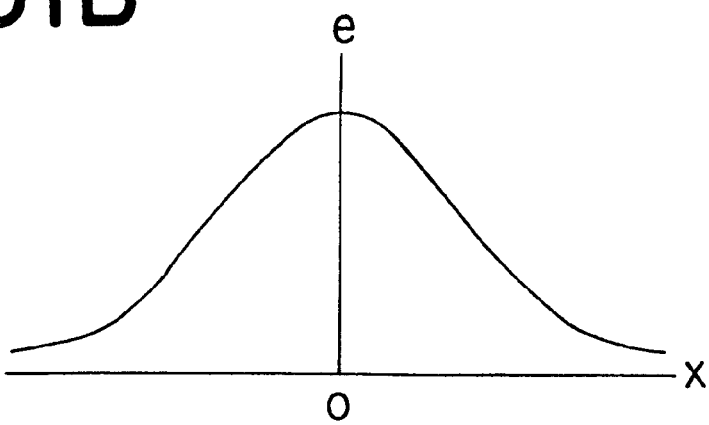

An embodiment of a magnetic head of the present invention will now be described. FIG. 50 is a perspective view which illustrates the magnetic head according to a thirty first embodiment. FIGS. 51A and 51B are explanatory views which illustrate the operation of the magnetic head.

A plurality of magnetic heads 104 each comprising the magnetic core 101, the coil 102 and the magnetic gap 103 are integrally formed on the common substrate 100. Further, an actuator 140 making use of a piezoelectric effect is provided for the substrate 100, either of the actuator 100 being fixed to a fixed portion (omitted from illustration). Another end of the actuator 140 is fixed to the substrate 100. The actuator 140 enables the magnetic heads 105 to be reciprocated in the direction in which the head chips are disposed. The magnetic recording medium has, thereon, a recorded magnetic signal in the form of, for example, as shown in FIG. 51A. By the operation of the coil 102, a reproduction signal as shown in FIG. 51B can be obtained. Since reproduction voltage e is a differentiated value of time, it is in proportion to the relative speed between the magnetic recording medium and the magnetic head. Therefore, a high speed reciprocating motion of the magnetic head 105 in the direction in which the head chips are disposed will raise the reproduction voltage e although modulation is effected due to the reciprocating motion. Although the amplitude of the reciprocating motion may be about magnetization reversal width q, it is, as a general rule, difficult to specify the magnetization reversal width. Therefore, the amplitude is determined to be shorter than the shortest recording wavelength of the magnetic signal. A magnetic head of the foregoing type is able to reproducing a signal exhibiting a high reproduction signal voltage level and a high S/N ratio. It should be noted that x shown in FIG. 51A is the direction of the track, $M_x$ is magnetization of the medium in the direction of the track, $M_r$ is a residual magnetization and a is distance for which the residual magnetization of the medium is halved.

The means for reciprocating the substrate 100 is not limited to the actuator making use of the piezoelectric effect as employed in the thirty first embodiment. For example, a magnetostriction actuator or a voice coil actuator may be employed to obtain a similar effect. Further, the positional relationship between the substrate and the actuator is not limited to the way employed in the thirty first embodiment.

Thirty Second Embodiment

Another embodiment of the magnetic head of the present invention will now be described.

If the magnetic head chip 104 formed on the substrate 100 has a magnetic resistance effect or a hole effect, a similar effect obtainable from the foregoing seventeenth embodiment can be obtained.

Thirty Third Embodiment

Figure 52:
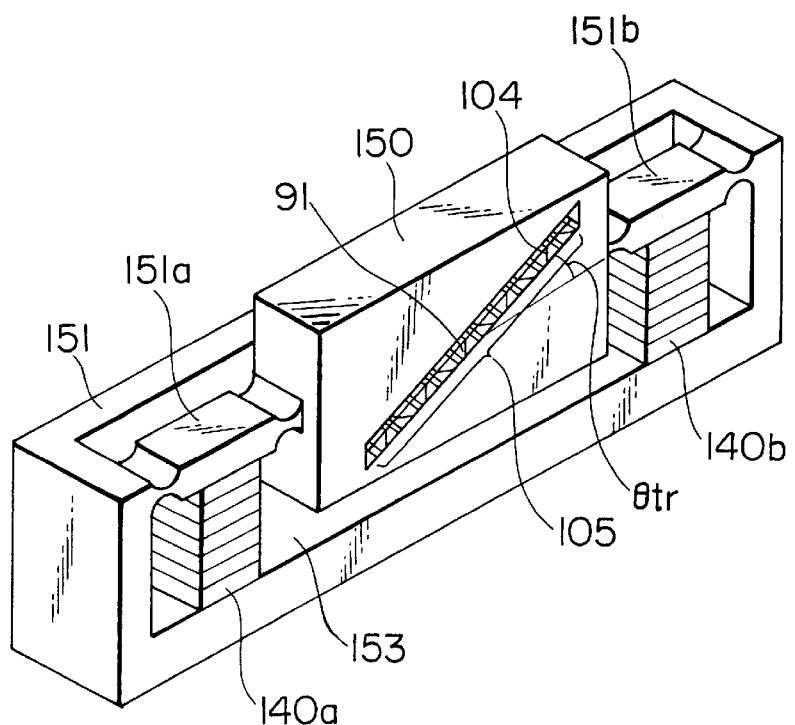
FIG. 52 is a perspective view which illustrates a magnetic head according to a thirty third embodiment of the present invention when viewed from the front side.
Figure 53:
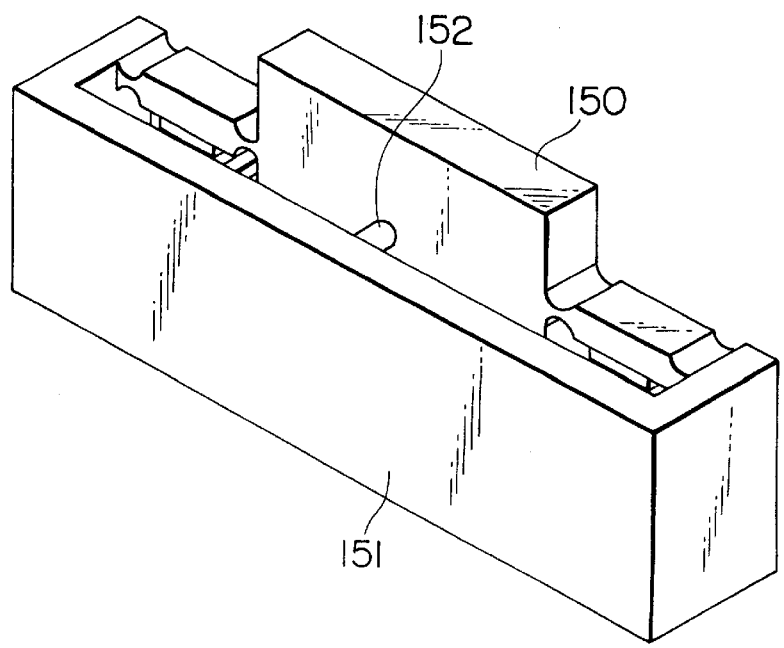
FIG. 53 is a perspective view which illustrates the magnetic head according to the thirty third embodiment when viewed from the reverse side.
Figure 54:
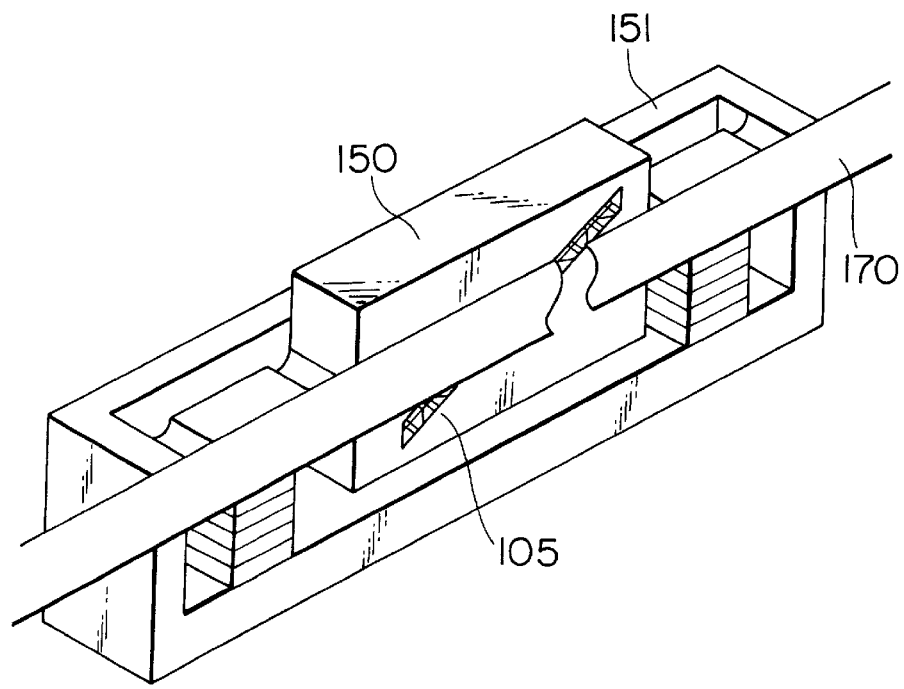
FIG. 54 is a perspective view which illustrates the relationship between the magnetic head according to the thirty third embodiment and a magnetic recording medium.
Figure 55:
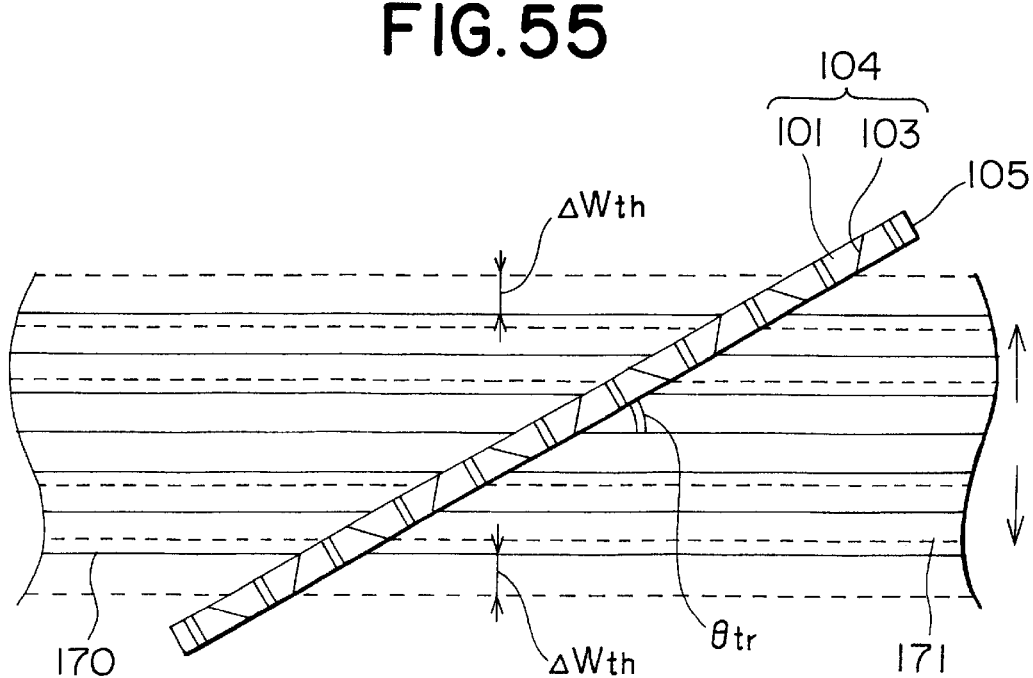
FIG. 55 is an explanatory view which illustrates the operation of the magnetic head according to the thirty third embodiment.
Figure 56:
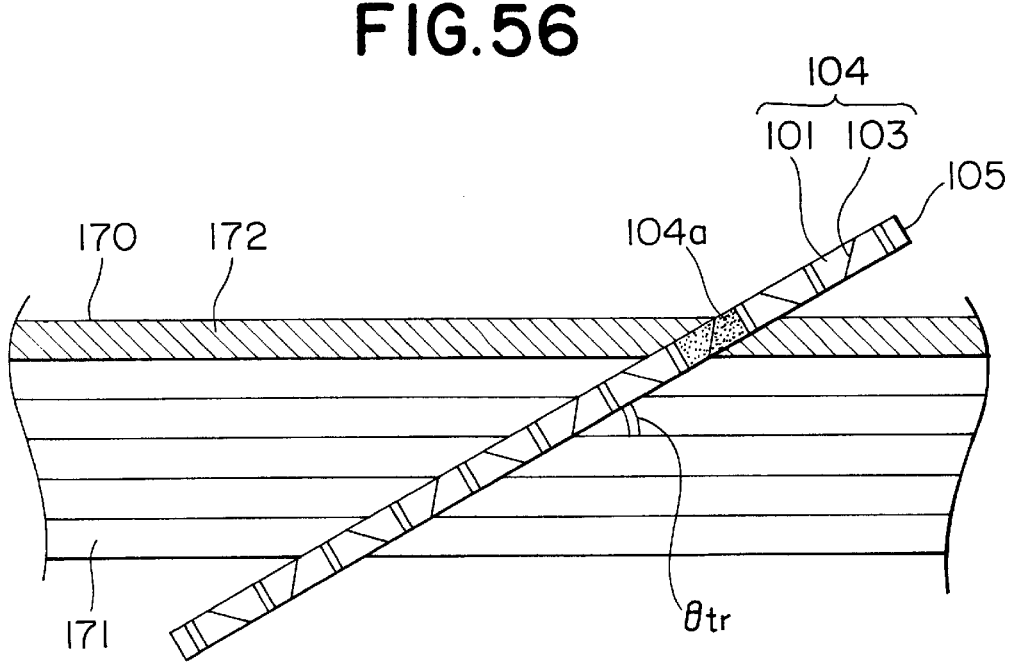
FIG. 56 is an explanatory view which illustrates the operation of the magnetic head according to the thirty third embodiment.

An embodiment of a magnetic head of the present invention will now be described. FIGS. 52 and 53 respectively are perspective views which illustrate the magnetic head according to a thirty third embodiment when viewed from the right side and the reverse side. FIG. 54 is a perspective view which illustrates the relationship between the magnetic head and the magnetic recording medium. FIGS. 55 and 56 are explanatory views which illustrate the operation. In order to cause the structure to be understood easily, a magnetic head having 10 channels is illustrated in each drawing, the number of the channels is not limited to ten.

The substrate has a plurality of magnetic head chips 104 each comprising the magnetic core, the coil and the magnetic gap and formed integrally so that the magnetic head 105 is formed. The magnetic heads 105 is fixed to a magnetic head frame 150 in such a manner that the magnetic head chips 104 are disposed to make angle $\theta_{tr}$ with respect to the direction in which the magnetic recording medium is moved. Further, the magnetic head frame 150 is elastically supported by a support frame 151 by means of cut plates 151a, 151b and a fixed shaft 152. The fixed shaft 152 serves as the center of rotation of the magnetic head 105, the fixed shaft 152 having a central axis that coincides with the center of the magnetic recording medium sliding surface 91 of the magnetic head 105. Rotating actuators 140a and 140b each making use of the piezoelectric effect are connected between the cut plates 151a, 151b and the inner bottom surface 153 of the support frame. Further, the bottom surface of the support frame 151 is fixed to a fixed portion (omitted from illustration). It should be noted that a magnetic recording medium 170 and the magnetic head 105 hold a relationship as shown in FIG. 54.

When reverse-phase voltages are respectively applied to the rotating actuators 140a and 140b of the foregoing structure, the cut plates 151a and 151b are elastically deformed. As a result, the magnetic head 105 is, together with the magnetic head frame 150, clockwise/counterclockwise rotated around the fixed shaft 152.

Then, the relationship between the track and the magnetic head will now be described, and then the operation will be described. First, the relationship between the track and the magnetic head will now be described with reference to FIG. 55. It should be noted that the term "track" means the trace drawn on the recording medium by the magnetic head gap 103 at the time of the recording operation, and a term "track width" means the length of the track in the direction of the width of the magnetic recording medium (hereinafter applied to ensuing embodiments). In FIG. 55, a track 171 is, in an imaginary manner, shown by thin lines having the intervals corresponding to the track width, and other elements of portions except for the magnetic head are omitted from illustration. Continuous lines show a state where an excellent reproduction signal can be obtained, in which the magnetic gap 103 of each magnetic head chip 104 traces the center of each track. However, if the room temperature or the like is changed from that at the time of the recording operation, heat expansion/contraction $2\Delta W_{th}$ takes place in the direction of the width of the magnetic recording medium 170. As a result, the track width undesirably changes as designated by dashed lines (FIG. 55 illustrates a case where the width is lengthened). Therefore, a portion of the head chip 104 is inevitably positioned on a different track or positioned to cover two tracks. In this case, a satisfactory reproduction signal cannot be obtained. In this embodiment, the foregoing structure is used to rotate the magnetic head 105 to vary the position of each magnetic gap 103 in the direction of the width of the recording medium so that a predetermined track is traced by the magnetic gap 103 of each magnetic head chip 104.

The specific operation will now be described. The reproduction signal is used to calculate rotation control quantity $\Delta\theta_{tr}$ of the magnetic head. In accordance with the result of the calculation, voltage is applied to the rotating actuator 140 to rotate the magnetic head 150 around the fixed shaft 152.

Figure 57:
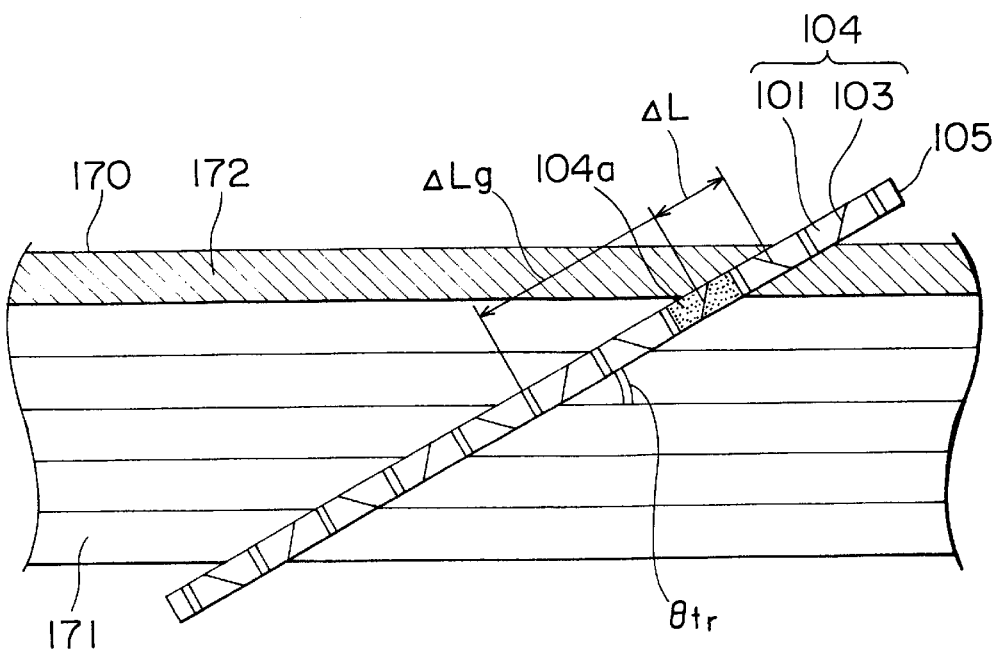
FIG. 57 is an explanatory view which illustrates the operation of the magnetic head according to the thirty third embodiment.

The calculation of the rotation control quantity $\Delta\theta_{tr}$ of the magnetic head is performed by, for example, a control track 172 recorded at an end of the magnetic recording medium 170. The control track 172 has a control signal having a frequency of f1 recorded thereon. One of the plural magnetic head chips 104 formed on the substrate 100 is assigned as a control track reproducing magnetic head chip 104a. If the position of each magnetic gap 103 coincides with the position of the track as shown in FIG. 56, a control signal of a regulated signal level and having the frequency f1 can be obtained from the control track reproducing magnetic head chip 104a. If the track width has been changed due to heat expansion/contraction occurring in the width of the magnetic recording medium, the control track 172, as shown in FIG. 57, is deviated in the direction of the width from the position of the control track reproducing magnetic head chip 104a, the control track 172 being undesirably reproduced by another magnetic head. In this embodiment, the position of the magnetic head chip which is reproducing the control track 172 and the angle $\theta_{tr}$ made by the magnetic head 105 and the track are used to calculate the rotation control quantity $\Delta\theta_{tr}$ of the magnetic head. The position of the magnetic head chip which is reproducing the control track 172 can be obtained by electrically identifying the position of the magnetic head from which a reproduction signal is obtained which has the frequency f1 recorded on the control track.

Assuming that the distance between the magnetic head chip, which is reproducing the control track 172, and the control track reproducing magnetic head chip 104a in the direction, in which the magnetic head chips are disposed, is ΔL, the rotation control quantity Δθ$_{tr}$ of the magnetic head 105 can be obtained geometrically from FIG. 57 as follows: (where the counterclockwise rotation facing the drawing sheet is considered here the positive direction)

$$\Delta\theta_{tr}=\text{Arc }\sin\{[(Lg+\Delta L)/Lg]\cdot\sin\theta_{tr}\}-\theta_{tr}$$

where θ$_{tr}$ is an angle made by the direction, in which the magnetic head chips are disposed, with respect to the lengthwise direction of the track before the magnetic head is rotated, and Lg is the distance from the center of the magnetic head 105 to the control track reproducing magnetic head chip 104a.

Although the thirty third embodiment is described while taking the case of the change of the track angle occurring due to the heat expansion/contraction, the foregoing method will enable a similar effect to be obtained if the track angle has been changed relatively to the magnetic head due to slight and rigid rotation of the magnetic recording medium.

The number of the magnetic head 105 according to the thirty third embodiment and to be secured to the magnetic head frame 150 is not limited to one. If a plurality of magnetic heads 105 are disposed in the direction in which the magnetic recording medium is moved, a similar effect can be obtained by storing the reproduction signal on a memory or the like.

Thirty Fourth Embodiment

Another embodiment of the magnetic head of the present invention will now be described. The description will be made about different portions from the thirty third embodiment with reference to FIG. 58.

Figure 58:
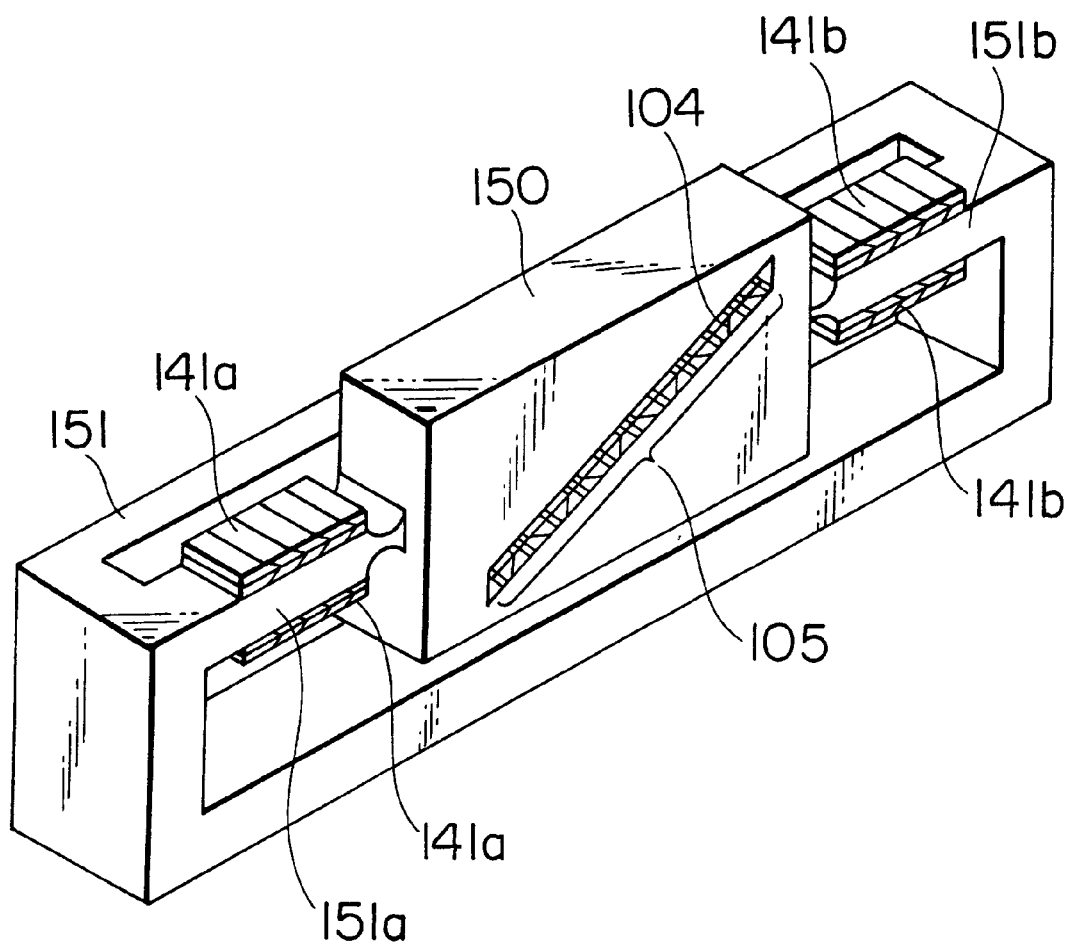
FIG. 58 is a perspective view which illustrates a magnetic head according to a thirty fourth embodiment of the present invention.

The positional relationship between the support frame of the magnetic head frame 150 and the actuator is not limited to the way employed in the thirty third embodiment. For example, actuators 141a and 141b making use of a piezoelectric effect of a Bimorph structure may be employed as shown in FIG. 58 to obtain a similar effect.

Thirty Fifth Embodiment

Figure 59:
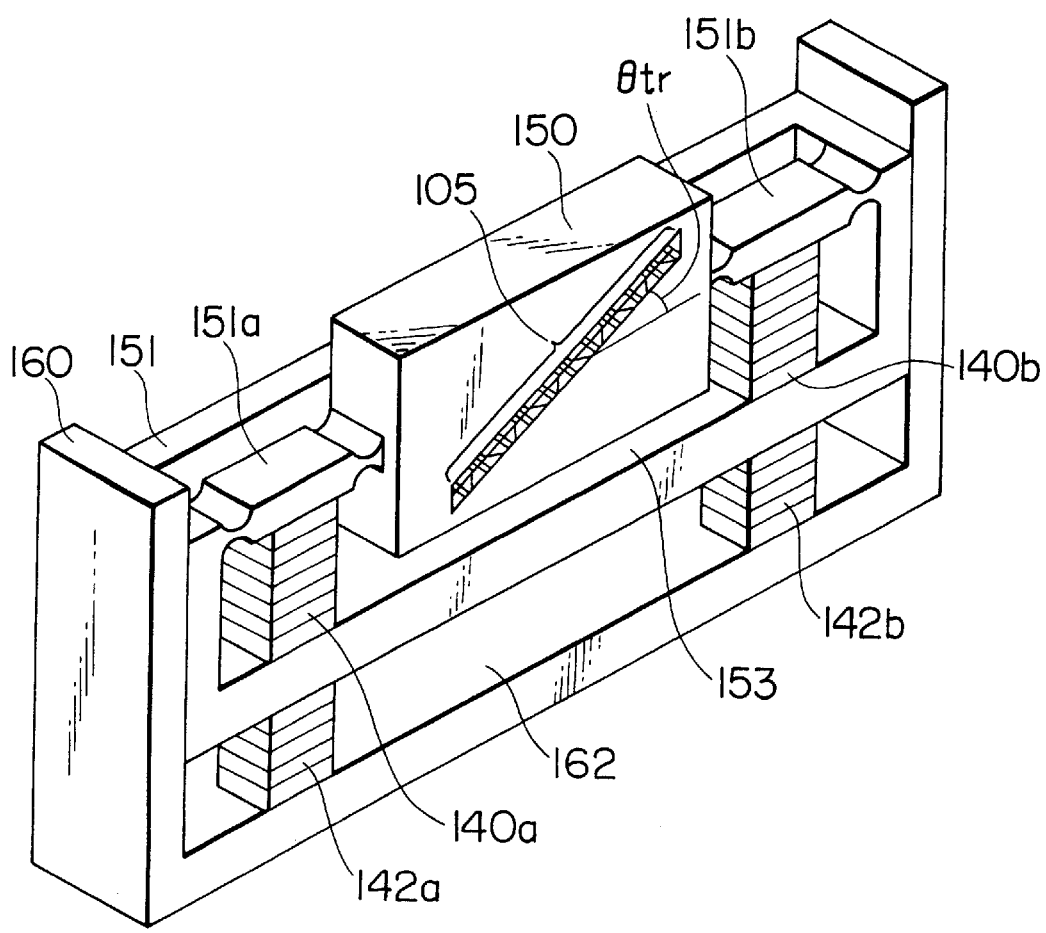
FIG. 59 is a perspective view which illustrates a magnetic head according to a thirty fifth embodiment of the present invention.
Figure 60:
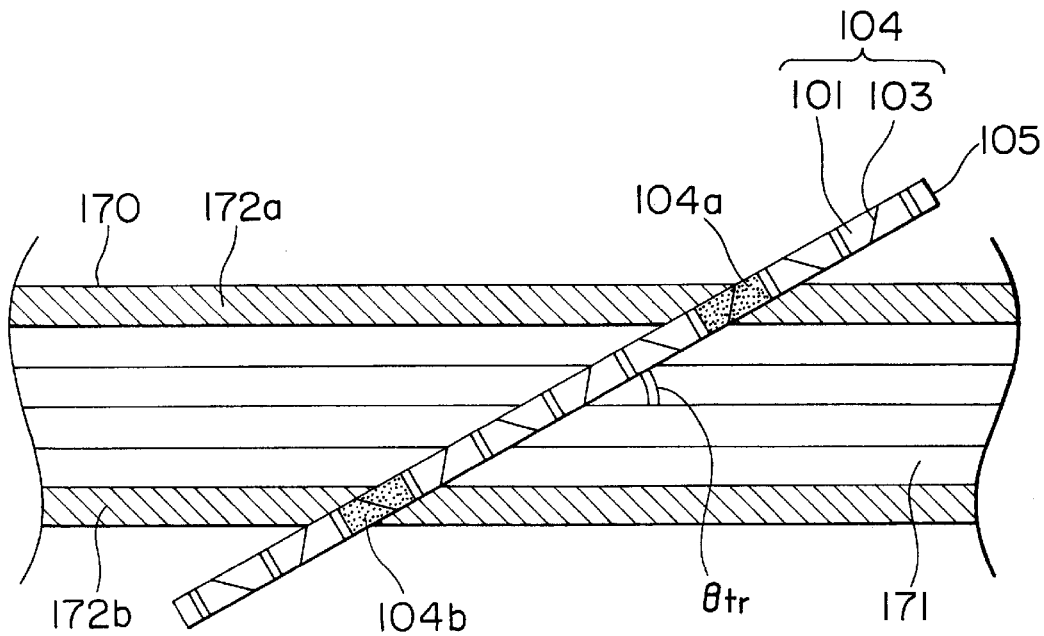
FIG. 60 is an explanatory view which illustrates the operation of the magnetic head according to the thirty fifth embodiment.
Figure 61:
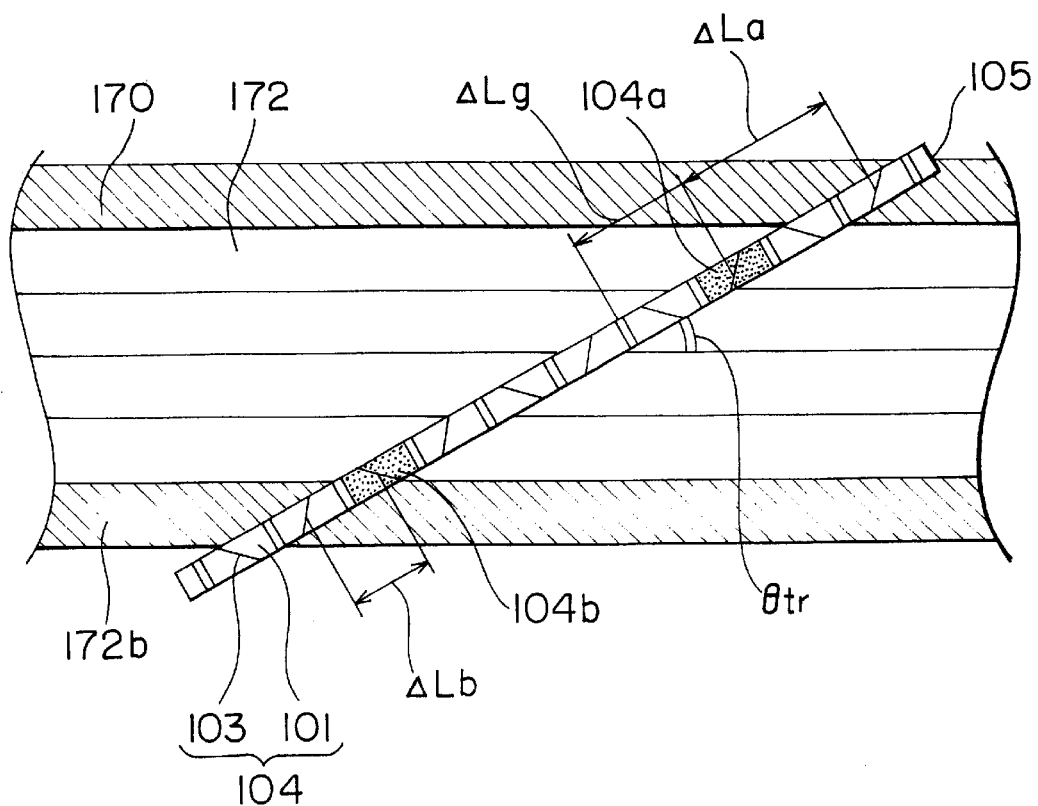
FIG. 61 is an explanatory view which illustrates the operation of the magnetic head according to the thirty fifth embodiment.

An embodiment of a magnetic head of the present invention will now be described. FIG. 59 is a perspective view which illustrates the magnetic head according to a thirty fifth embodiment. FIGS. 60 and 61 respectively are explanatory views which illustrate the operation of the magnetic head according to the thirty fifth embodiment. This embodiment relates to tracking to be performed if the relative positional deviation between the magnetic head and the track is relatively small, such that it is about tens of mm to hundreds of mm.

First, the structure will now be described. A plurality of magnetic head chips each comprising a magnetic core, a coil and a magnetic gap, are integrally formed with substrate so that the magnetic head 105 is formed. The magnetic heads 105 is fixed to a magnetic head frame 150 in such a manner that the magnetic head chips are disposed to make angle θ$_{tr}$ with respect to the direction in which the magnetic recording medium is moved. Further, the magnetic head frame 150 is elastically supported by a support frame 151 by means of cut plates 151a, 151b and a fixed shaft 152 (similar to that shown in FIG. 53 but it is omitted here). The fixed shaft 152 serves as the center of rotation of the magnetic head 105, the fixed shaft 152 having a central axis that coincides with the center of the magnetic recording medium sliding surface 91 of the magnetic head 105. Rotating actuators 140a and 140b each making use of the piezoelectric effect are connected between the cut plates 151a, 151b and the inner bottom surface 153 of the support frame. Further, the support frame 151 is disposed in a linear guide 160. Fine-movement linear actuators 142a and 142b making use of the piezoelectric effects are connected between the inner bottom surface of the liner guide 160 and the bottom surface of the support frame 151. When voltages having reverse phases are respectively applied to the rotating actuators 140a and 140b, the magnetic head 150 can be, together with the magnetic head frame 150, rotated clockwise/counterclockwise around the fixed shaft 152. When voltages having the same phase are applied to the fine-movement linear actuators 142a and 142b, the magnetic head 105 can be translated together with the support frame 151 in the direction of the width of the magnetic recording medium.

The operation performed by the foregoing structure will now be described. The thirty fourth embodiment is so arranged that the translation deviation of the recording medium in the direction of the width thereof is first modified. The translation deviation takes place due to the fact that the magnetic recording medium rigidly deviated in the direction of the width thereof. In order to modify the translation deviation, the translation control quantity is calculated from the reproduction signal of the magnetic recording medium. In accordance with the calculated translation control quantity, the same phase voltages are applied to the fine-movement linear actuators 142a and 142b to translate the magnetic head 105 in the direction of the width of the magnetic recording medium to modify the translation deviation. Then, the rotation control quantity for modifying the deviation between the position of each magnetic gap 103 and the position of each track is calculated from the reproduction signal. The deviation occurs due to the change of the track width caused by the heat expansion/contraction of the magnetic recording medium. In accordance with the calculated rotation control quantity, voltages having reverse phases are respectively applied to the rotating actuators 140a and 140b to rotate the magnetic head 105 around the fixed shaft 152. As a result, each magnetic gap is caused to coincide with each track. As a result of the foregoing operation, the tracking error can be modified so that a satisfactory reproduction signal is obtained.

The translation control quantity and the rotation control quantity are calculated by using control tracks 172a and 172b disposed at the two ends of the magnetic recording medium as shown in FIG. 60. The control tracks 172a and 172b have recorded control signals, the frequency of each of which is f1. Among the plural magnetic head chips 104 formed on the substrate, two magnetic head chips 104 are assigned to the control track reproducing magnetic head chips. If no translation deviation takes place and if each magnetic gap 103 and each track coincide with each other, control signals of a regulated signal level and having the frequency of f1 can be obtained from the control track reproducing magnetic head chips 172a and 172b. If the translation deviation and the change of the track width take place as shown in FIG. 61, the control tracks 172a and 172 are reproduced by the magnetic head chip 104 except for the control track reproducing magnetic head chips 172a and 172b. In this embodiment, the difference between the position of the magnetic head chip which has reproduced the control tracks 172a and 172b and the positions of the control track reproducing magnetic head chips 172a and 172b is used to calculate the translation control quantity and the rotation control quantity. The position of the magnetic head chip which is reproducing the control track 172 can be obtained by electrically identifying the position of the magnetic head from which a reproduction signal is obtained which has the frequency f1 recorded on the control track.

Assuming that the distances from the magnetic head chip, which has reproduced each control track 172a and 172b, to the nearest control track reproducing magnetic head chips are ΔLa and ΔLb, the translation control quantity ΔWer can be calculated from the following equation (where the counterclockwise rotation facing the drawing sheet is considered here the positive direction):

$$\Delta Wer = (\Delta La + \Delta Lb)/2$$

After the translation deviation has been modified, the rotation control quantity $\Delta\theta_{tr}$ can be calculated from the distance ΔLa' from the magnetic head chip, which has reproduced the control track 172a, to the nearest control track reproducing magnetic head chip:

$$\Delta\theta_{tr} = \text{Arc sin}\{[(Lg + \Delta La')/Lg]\cdot\sin\theta_{tr}\} - \theta_{tr}$$

where $\theta_{tr}$ is an angle made by the direction, in which the magnetic head chips are disposed, with respect to the lengthwise direction of the track before the magnetic head is rotated, and Lg is the distance from the center of the magnetic head 105 to the control track reproducing magnetic head chip 104a.

Thirty Sixth Embodiment

Figure 62:
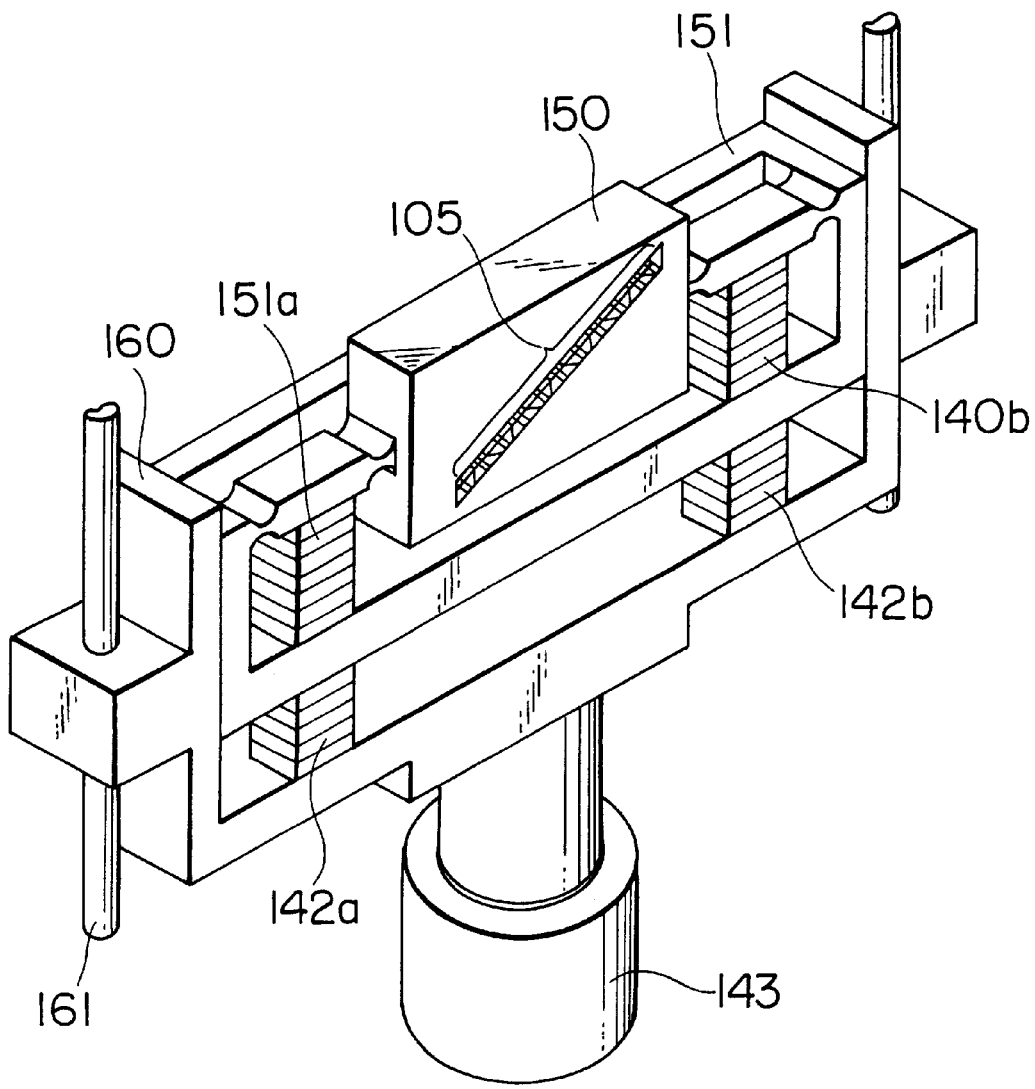
FIG. 62 is a perspective view which illustrates a magnetic head according to a thirty sixth embodiment of the present invention.

Another embodiment of the magnetic head of the present invention will now be described. Referring to FIG. 62, the description will be made about only different portions from the thirty fifth embodiment. Although the thirty fifth embodiment is arranged to perform tracking in the case where the relative positional deviation between the magnetic head and the track of the magnetic recording medium is a small such that it is about tens of mm to hundreds of mm, this embodiment is arranged to perform tracking to be performed in the case where the relative positional deviation is relatively large as taken place in the case where a curled magnetic recording medium or the like is used.

That is, this embodiment is arranged in such a manner a coarse movement linear actuator 143 by making use of a voice coil is, as a translating actuator, connected to the bottom surface of the linear guide 160. As a result of the structure thus-arranged, tracking can be performed even if a relatively large positional deviation takes place between the magnetic head and the track of the magnetic recording medium. It should be noted that reference numeral 161 shown in FIG. 62 represents a guide for use at the time of operating the linear guide 160.

Thirty Seventh Embodiment

Another embodiment of the magnetic head of the present invention will now be described. The description will now be made about only different portion from the thirty fifth embodiment with reference to FIG. 59.

The rotating actuators 140a, 140b, the fine-movement actuators 142a and 142b are not limited to the arrangement according to the thirty fifth embodiment shown in FIG. 59 in which they are disposed individually. For example, a structure may be employed in which the fixed shaft 152 is omitted from the structure according to the thirty fifth embodiment. In this case, the rotating actuator is enabled to also possess a function of translating the magnetic head, and therefore, the fine-movement linear actuators 142a and 142b can be omitted from the structure. If the magnetic head of the foregoing structure is translated, it is necessary to simply apply the same-phase voltages to the two rotating actuators. If the rotation is performed, it is necessary only to superpose the reverse-phase voltages on the voltages required at the time of the translation operation.

Thirty Eighth Embodiment

Another embodiment of the magnetic head of the present invention will now be described. The description will be made about only different portions from the thirty fifth embodiment.

The configuration of the magnetic head 105, the rotating actuators 140a, 140b, the fine-movement linear actuators 142a, 142b and the coarse-movement linear actuator 143 is not limited to those according to the thirty fifth and thirty sixth embodiments respectively shown in FIGS. 59 and 62. Although the structures shown in FIGS. 59 and 62 are so arranged that the one fine-movement linear actuator is connected to each of the two sides of the bottom surface of the support frame 151, a similar effect can be obtained even If the same is disposed at the center.

Thirty Ninth Embodiment

Another embodiment of the present invention will now be described.

The rotating actuator and the fine-movement linear actuator are not limited to those making use of the piezoelectric effect. For example, magnetostriction actuators or photostriction actuators may be employed to obtain a similar effect.

Fortieth Embodiment

Another embodiment of the structure will now be described.

The number of the magnetic head unit comprising the magnetic head 105, the magnetic head frame 150 for fixing the magnetic head 105 and each actuator is not limited to one. For example, a structure may be employed in which a plurality of the magnetic head units are disposed in the direction of the width of the magnetic recording medium. In this case, recording/reproducing data to and from a multiplicity of tracks can be performed. Further, recording/reproducing data to and from a variety of magnetic recording mediums can be performed.

Forty First Embodiment

Figure 63:
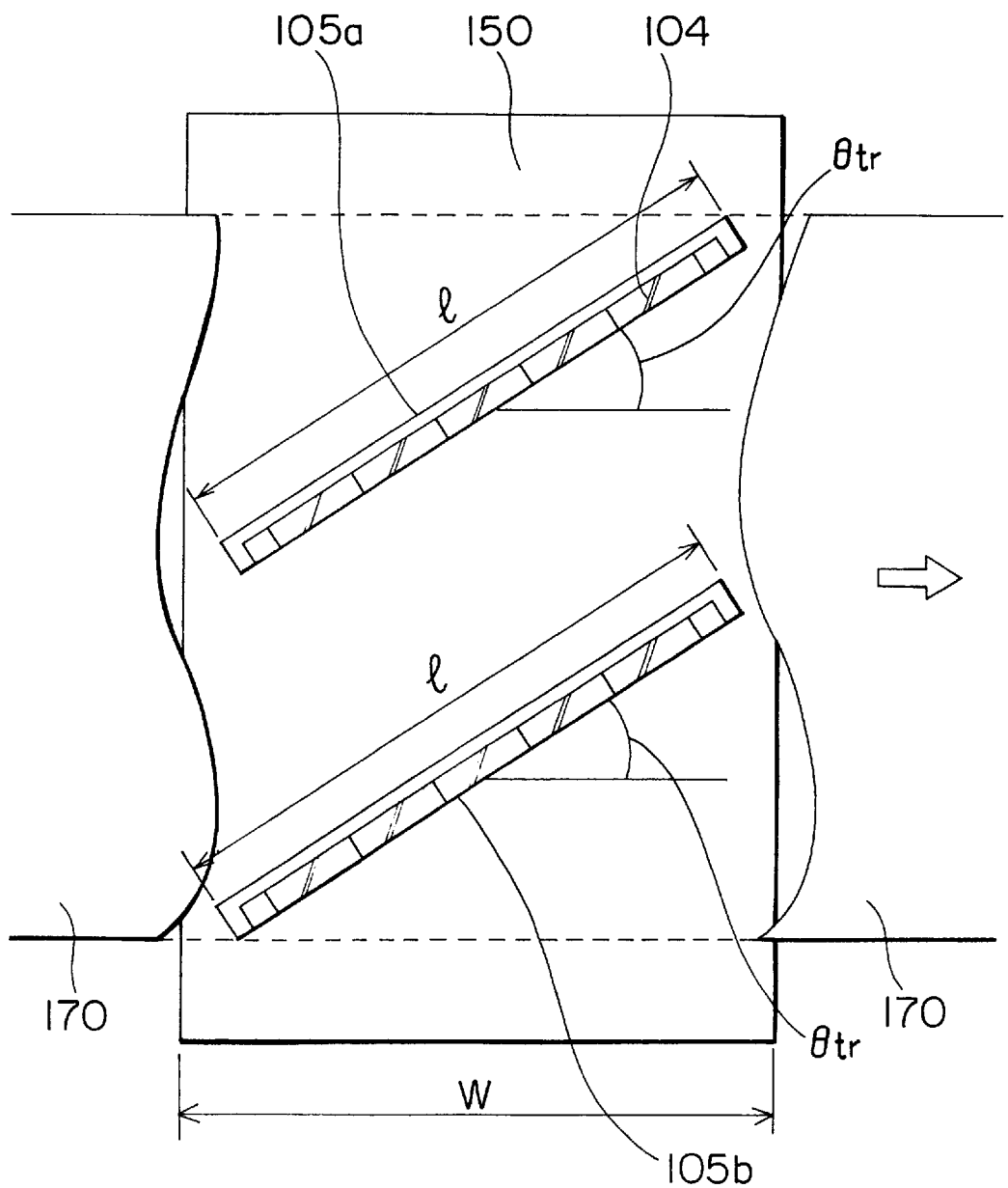
FIG. 63 is a front view which illustrates an essential portion of a magnetic head according to a forty first embodiment of the present invention.

An embodiment of a magnetic head of the present invention will now be described with reference to FIG. 63.

The structure of this embodiment will now be described. Magnetic heads 105a and 105b each comprising a plurality of magnetic head chips 104 formed on a substrate thereof are secured to a two-column magnetic head frame 150, the magnetic head chip 104 being composed of a magnetic core, a coil and a magnetic gap. The magnetic heads 105a and 105b forming the two columns are secured to the magnetic head frame 150 to make the angle made by a direction, in which the magnetic head chips 104 are disposed, and a direction, in which the magnetic recording medium is moved, to be $\theta_{tr}$. The length l of each of the magnetic head 105a and 105b is made in such a manner that the length (l·sin $\theta_{tr}$) obtained by projecting the length, in the direction in which the magnetic head chips 104 on the substrate are disposed, to a direction of the width of the magnetic recording medium 170 is substantially the same as the half of the width of the magnetic recording medium 170. Further, the respective magnetic head chips 104 are secured in the direction of the width of the magnetic recording medium 170 so that they are not superposed in the direction in which the magnetic recording medium 170 is moved.

By disposing the magnetic heads 105 as described above, the width W of the magnetic head frame 150 can be substantially halved as compared with a case where one magnetic head is disposed. Further, the area in which the magnetic recording medium 170 and the magnetic head frame 150 slide with respect to each other can be reduced.

Although the forty first embodiment is arranged in such a manner that the two magnetic heads 105a and 105b are used to form the columns in the same direction as the direction of the width of the magnetic recording medium 170. The number of the magnetic head disposed is not limited to this. If the two or more columns of the magnetic heads are disposed, the arrangement in which l sin $\theta_{tr}$ of the length l of each of the magnetic heads 105 to be (the width of the magnetic recording medium/the number of magnetic head columns) will enables a similar effect to be obtained.

Forty Second Embodiment

Figure 64:
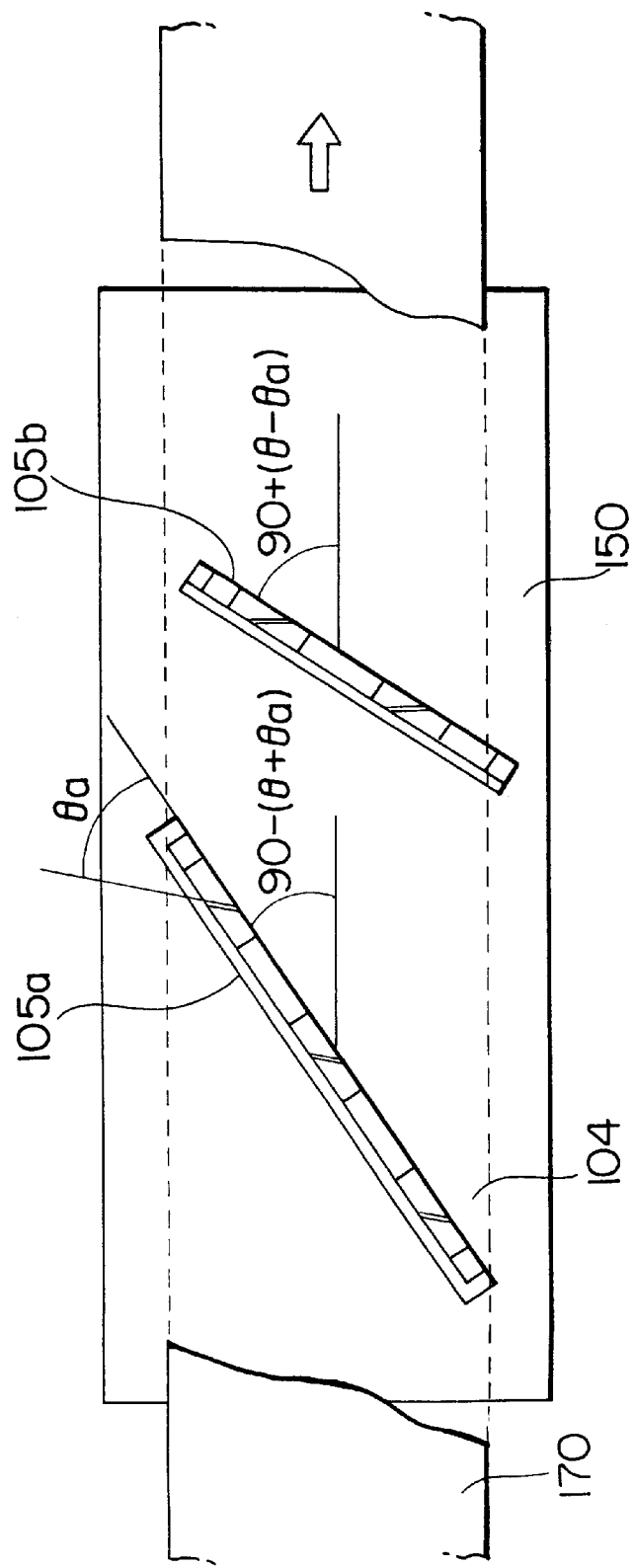
FIG. 64 is a front view which illustrates an essential portion of a magnetic head according to a forty second embodiment of the present invention.

An embodiment of a magnetic head of the present invention will now be described with reference to FIG. 64.

In this embodiment, two magnetic heads 105a and 105b each comprising a plurality of magnetic head chips 104 formed on the substrate thereof are secured to the magnetic head frame 150, each of the magnetic head chips 104 comprising a magnetic core, a coil and a magnetic gap. The two magnetic heads 105a and 105b are formed in such a manner that the magnetic gap of each of their magnetic head chips has the same azimuth angle θa. The two magnetic heads 105a and 105b are disposed in the magnetic head frame 150 in such a manner that their magnetic head chips 104 are not superposed in the direction in which the magnetic recording medium is moved. Assuming that a needed azimuth angle is θ, the magnetic heads 105a and 105b are secured in such a manner that the directions, in which their magnetic head chips 104 are respectively disposed, make angles {90°−(θ+θa)} and {90°+(θ−θa)} from the direction of the track. As a result of the foregoing structure, substantial azimuth angles of ±θ can be obtained. As described above, this embodiment is so arranged that a desired azimuth angle is realized by changing the directions in which the magnetic heads 105a and 105b having the same azimuth angle are disposed. Therefore, the necessity of changing the azimuth angles of the respective magnetic gap can be eliminated. As a result, the magnetic head can be manufactured easily.

Forty Third Embodiment

Figure 65:
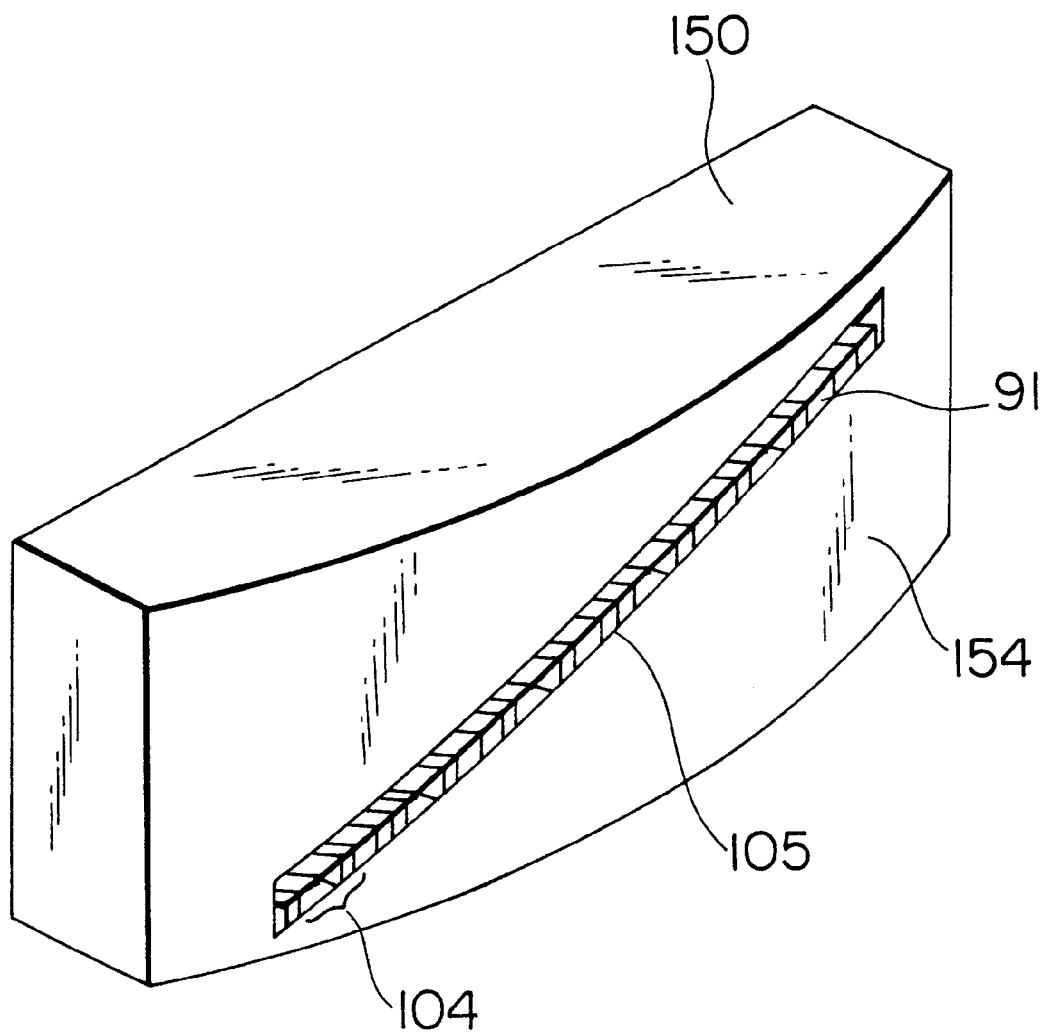
FIG. 65 is a perspective view which illustrates a magnetic head according to a forty third embodiment of the present invention.
Figure 66:
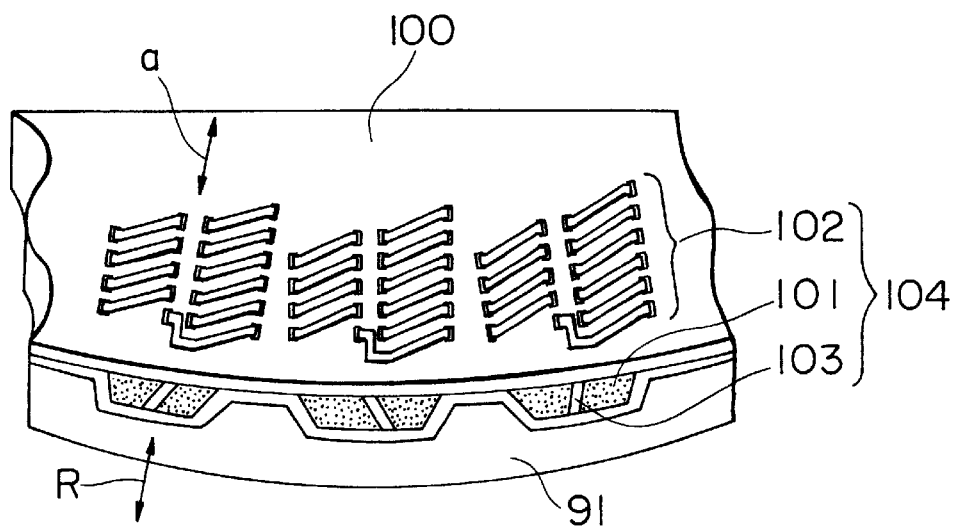
FIG. 66 is an enlarged and perspective view which illustrates an essential portion of the magnetic head according to the forty third embodiment.

An embodiment of a magnetic head will now be described. FIG. 65 is a perspective view which illustrates the magnetic head according to the forty third embodiment, and FIG. 66 is a perspective view which illustrates an essential portion of the magnetic head.

A plurality of magnetic head chips 104 comprising the magnetic core 101, the coil 102 and the magnetic gap 103 are integrally formed on the substrate so that the magnetic head 105 is formed. The shape of the magnetic head on the side adjacent to the magnetic recording medium sliding surface 91 is formed into a curved surface (a circular arc in this embodiment) in a direction in which the magnetic head chips 104 are disposed. Further, the curved surface faces the magnetic recording medium. In addition, the magnetic head chips 104 are radially formed on the substrate 100 along the recording medium sliding surface in such a manner that the direction in which each of their coils is wound (designated by an arrow a) coincides with the direction (designated by an arrow R) of the normal line of the foregoing circular arc. The magnetic head 105 is secured to the magnetic head frame 150 in such a manner that the direction, in which the magnetic head chips 104 are disposed, makes the angle $\theta_{tr}$ from the direction in which the magnetic recording medium is moved. Further, a magnetic recording medium sliding surface 154 of the magnetic head frame 150 has substantially the same curvature as that of the magnetic recording medium sliding surface of the magnetic head 105.

By forming the magnetic recording medium sliding surface into the convex curved surface, a satisfactory state of contact with the magnetic recording medium can be realized.

Forty Fourth Embodiment

Figure 67:
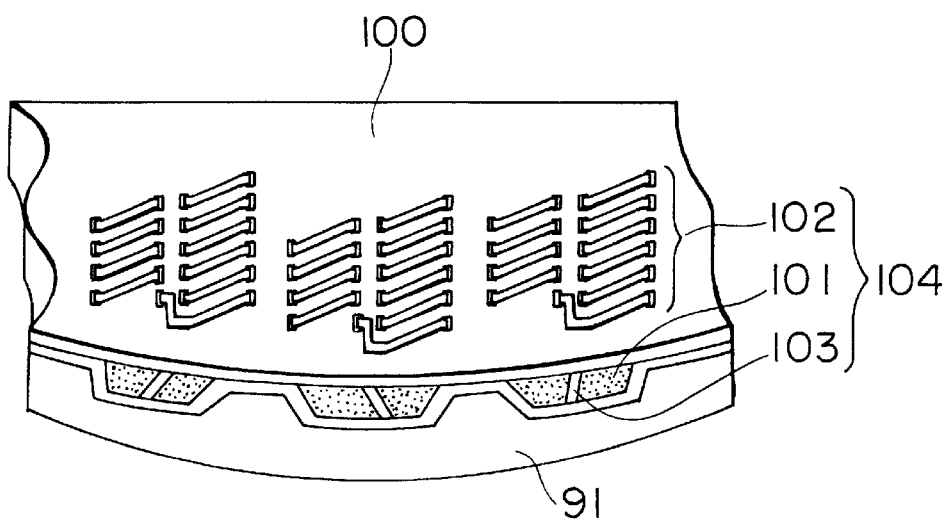
FIG. 67 is an enlarged and perspective view which illustrates an essential portion of a magnetic head according to a forty forth embodiment of the present invention.
Figure 68A:
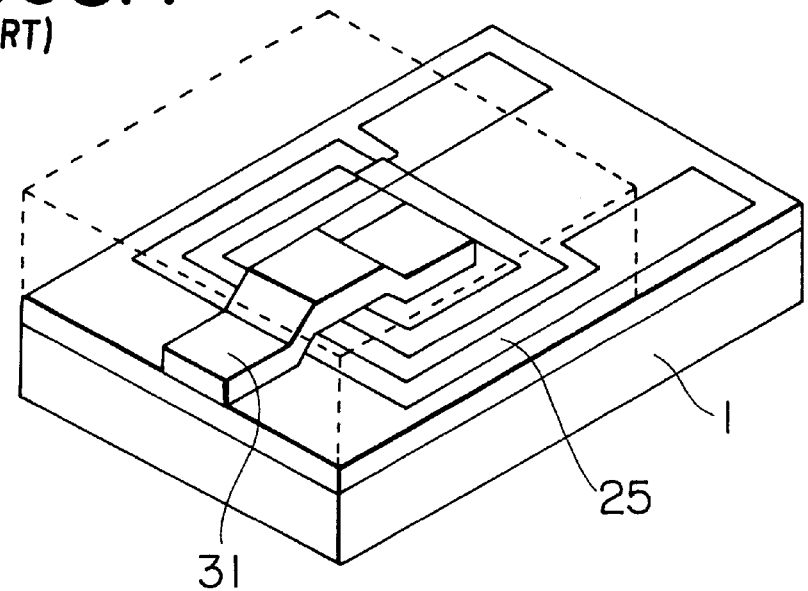
FIGS. 68A and 68B are perspective views which illustrate an essential portion of a conventional magnetic head.
Figure 68B:
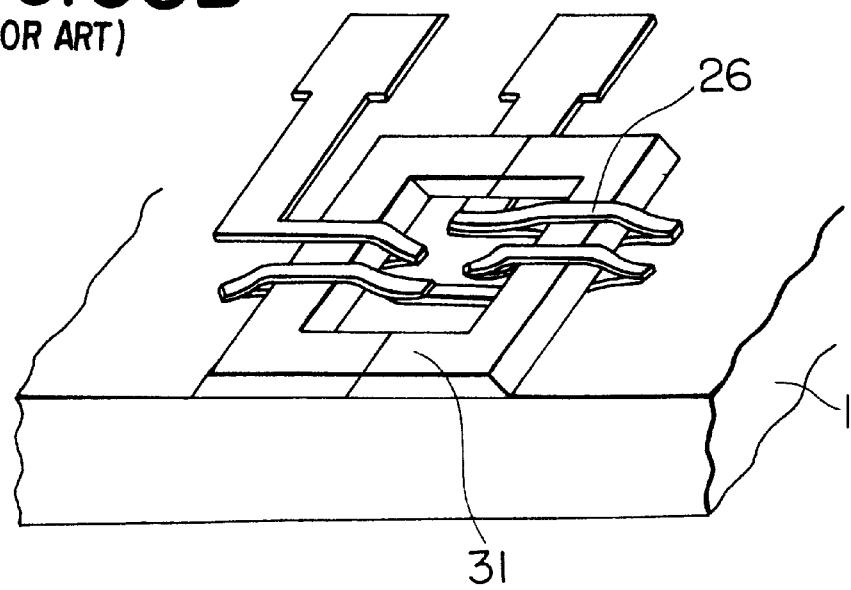

Another embodiment of the present invention will now be described. The description will now be made about only different portions from the forty third embodiment with reference to FIG. 67.

The configuration of the magnetic head chips 104 on the substrate 100 is not limited to that according to the forty third embodiment. In this embodiment, the magnetic head chips 104 are disposed in a stepped manner along the circular arc of the magnetic recording medium sliding surface 91 in such a manner that the direction of winding of the coils 102 of the respective magnetic head chips 104 are in parallel to one another. Also in this case, a similar effect obtainable from the forty third embodiment can be obtained.

Forty Fifth Embodiment

Another embodiment of the magnetic head claimed in claim 10 of the present invention will now be described.

The coil of the magnetic head chip is not limited to the helical coil employed in each of the foregoing embodiments. For example, a magnetic head chip array having, for example, a spiral coil, may be employed to obtain a similar effect to that obtainable from each of the foregoing embodiments.

As described above, the magnetic structure claimed in claim 1 of the present invention comprises the substrate having the groove-shape recess having the slant side-surfaces, the substrate having thereon: the first conductive passage consisting of the plurality of the parallel and conductive passages formed on the two side surface and the bottom surface of the recess; the first insulating layer stacked on the first conductive passage and the substrate; the magnetic core made of the magnetic material enclosed in the recess; the second insulating layer stacked on the magnetic core; and the second conductive passage formed on the second insulating layer to sequentially connect the ends of the first conductive passage to form the helical coil. Therefore, the number of turns of the coil can be increased while eliminating the necessity of enlarging the track intervals. As a result, the coil can easily be formed even if the magnetic core is thickened. Further, a plurality of helical coils having the same number of turns or different number of turns can be formed on the common magnetic core.

The magnetic structure claimed in claim 2 of the present invention comprises the substrate having the plurality of the ridge-like projections each having the slant side-surfaces; the substrate having thereon: the first conductive passage consisting of the plurality of the parallel and conductive passages each of which is formed on the opposing slant surfaces of the adjacent projections and on the bottom surface between the slant surfaces; the first insulating layer stacked on the first conductive passage and the substrate; the magnetic core made of the magnetic material enclosed in the groove-shape recess formed by the adjacent projections and the bottom surface; the second insulating layer stacked on the magnetic core; and the second conductive passage formed on the second insulating layer to sequentially connect the ends of the first conductive passage to form the helical coil, wherein the magnetic core is separated by the projection so that the plurality of the coils are integrally formed on the same substrate. Therefore, the magnetic cores of the multiplicity of magnetic structure can assuredly be separated by the projections formed on the substrate. Since the coils are formed by making use of slant surfaces of the projections, the helical coils can assuredly be formed on thick magnetic core. Since the magnetic structures can accurately and integrally be formed on the same substrate, magnetic structures having uniform characteristics can be manufactured. The number of turns of the coil can be increased and the coils can be formed even if the magnetic core is thick. Further, a multiplicity of magnetic structures can be densely disposed while preventing cross talk.

The magnetic head claimed in claim 3 of the present invention comprises: the substrate on which the plurality of the ridge-like projections each having the slant side surfaces and having the different lengths are at least disposed in such a manner that the longer projections are disposed on the two sides of each of the short projections; the first conductive passage consisting of the plurality of the parallel and conductive passages each of which is formed on the opposing slant surfaces of the adjacent short projection and the long projection and on the bottom surface between the slant surfaces; the first insulating layer stacked on the first conductive passage and the substrate; the magnetic core made of the magnetic material enclosed in the groove-shape recess formed by the adjacent projections and the bottom surface; the magnetic gap made of the magnetic material formed in the magnetic core on the side adjacent to the magnetic recording medium sliding surface; the second insulating layer stacked on the magnetic core; and the second conductive passage formed on the second insulating layer to sequentially connect the ends of the first conductive passage to form the first conductive passage formed on the two sides of the short projection into the one helical coil, wherein the magnetic core is separated by the long projections so that the plurality of the magnetic head chips are integrally formed on the same substrate. Therefore, mutliplex-winding type coils can be formed while preventing enlargement of intervals, and the coils can be formed even if the magnetic core is thickened. Since the coils for a plurality of channels are integrally formed, the relative position between the respective magnetic gaps can easily be made precise.

The magnetic head claimed in claim 4 of the present invention comprises: the substrate having the plurality of the ridge-like projections each having the slant side surfaces; the first conductive passage consisting of the plurality of the parallel and conductive passages each of which is formed on the opposing slant surfaces of the adjacent projections and the bottom surface between the slant surfaces; the first insulating layer stacked on the first conductive passage and the substrate; the first magnetic core made of the magnetic material enclosed in the groove-shape recess formed by the adjacent projections and the bottom surface; the second conductive passage formed on the first magnetic core while interposing the second insulating layer to sequentially connect the first conductive passage ends as to form the helical coils; the non-magnetic insulating layer stacked on the first magnetic core on the side adjacent to the magnetic recording medium sliding surface and on the second conductive passage to form the magnetic gap; the third conductive passage composed of the plurality of the parallel and conductive passages formed on the non-magnetic insulating layer; the third insulating layer stacked on the third conductive passage; the second magnetic core made of the magnetic material stacked to be formed into the ridge-like projections each having the slant surfaces on the non-magnetic insulating layer and the third insulating layer; the fourth insulating layer stacked on the two side surfaces and the top surface of the second magnetic core; and the fourth conductive passage formed on the fourth insulating layer to form the helical coils by sequentially connecting the third conductive passage ends, wherein the plurality of the magnetic head chips are integrally formed. Therefore, a magnetic head can be provided, the number of turns of which can easily be increased, in which the intervals can be shorted significantly, and which exhibits accurate length of the magnetic gap and the relative position.

The magnetic head claimed in claim 5 of the present invention comprises: the substrate having, at substantially the same positions on the top surface and the lower surface thereof, the plurality of the ridge-like projections each having the slant side surfaces, the substrate having the bottom surfaces, each of which is disposed between the adjacent projections, the length of which is shorter than that of the projection and each of which has the end surfaces recessed from the end surfaces of the projection; the first conductive passage formed on the top surface of the substrate and the third conductive passage formed on the lower surface of the same, the first conductive passage and the third conductive passage respectively being disposed on the facing slant surfaces of the adjacent projections, which are formed on the top surface and the lower surface, and the bottom surface between the slant surfaces, and composed of the plurality of the parallel and conductive passages; the first insulating layer stacked on the first conductive passage; the third insulating layer stacked on the third conductive passage; the first magnetic core formed on the upper surface and the second magnetic core formed on the lower surface, the first magnetic core and the second magnetic core being made of the magnetic material enclosed from the upper surfaces of the first and third insulating layers to the two end surfaces of the projection projecting over the two end surfaces of the bottom surface; the magnetic gap made of the non-magnetic material formed on the magnetic core on the side adjacent to the magnetic recording medium sliding surface; the second and fourth insulating layers respectively stacked on the first and second magnetic cores; the second conductive passage formed on the second insulating layer as to sequentially connect the first conductive passage ends to form the helical coil; and the fourth conductive passage formed on the lower surface of the fourth insulating layer to sequentially connect the third conductive passage ends to form the helical coil, wherein the plurality of magnetic head chips are integrally formed. Therefore, disposition of the coils on the upper surface of the substrate and the lower surface of the same enables the distance between coils of the magnetic head for the plural channels can be lengthened. Therefore, the mutual influence of the coils can be eliminated considerably. Further, a magnetic head can be provided, the number of turns of which can easily be increased, in which the intervals can be shorted significantly, and which exhibits accurate length of the magnetic gap and the relative position.

The magnetic head claimed in claim 6 of the present invention comprises the second magnetic core made of the magnetic material formed on the first and second conductive passage according to claim 2 while interposing the non-magnetic insulating layer for forming the magnetic gap, wherein the plurality of the magnetic head chip are integrally formed on the same substrate. Therefore, magnetic heads for the plural channels formed into a narrow-track structure in which exciting magnetic pole and magnetic pole to be excited are disposed while interposing the magnetic gap can easily be formed. In particular, multi-channel magnetic heads suitable to vertical magnetic recording operation can be provided.

The magnetic head claimed in claim 7 of the present invention and according to any one of claims 1 to 6 has the arrangement that the first conductive passage is formed from the bottom surface of the groove-shape recess to the two side surfaces and the top surface of the same. Therefore, the allowance of the positional error of the contact hole at the time of forming the helical coil surrounding the magnetic core can be enlarged, causing the reliability to be improved and the manufacturing cost to be reduced.

The magnetic head claimed in claim 8 of the present invention and according to any one of claims 1 to 6 has the arrangement that the first conductive passage is formed from the recess formed on the top surface of the groove-shape recess to the two side surfaces and the top surface of the same. Therefore, the allowance of the positional error of the contact hole at the time of forming the helical coil surrounding the magnetic core can be enlarged, causing the reliability to be improved and the manufacturing cost to be reduced. Further, the conductive passages formed on the top surface of the substrate can assuredly be separated from each other, and therefore, insulation can be maintained.

The magnetic head claimed in claim 9 of the present invention and according to any one of claims 1 to 8 has the arrangement that the first conductive passage is at least formed in the groove portion formed from the bottom surface to the side surfaces of the groove-shape recess. Therefore, the magnetic core can be formed while preventing formation of projections and pits, and accordingly, a magnetic core exhibiting excellent magnetic flux efficiency can be obtained. Further, insulation between the conductive passages formed in the recess by the groove portion can be maintained.

The magnetic head claimed in claim 10 of the present invention comprises, on the common substrate thereof, the plurality of the magnetic head chips each having the magnetic core, the coil and the magnetic gap, the magnetic head, wherein the power supply line, the means for establishing the electrical connections between the power supply line and each coil of the magnetic head chips, and the means for controlling the electrical connections are integrally formed with the substrate. Therefore, the number of connections between the coils of the magnetic head chips and an external electric circuit can significantly be decreased. Further, the electrode pads can be omitted to connect the coils and the external electric circuit. Therefore, the track pitch can be shortened, the recording density can be raised and the reliability can be improved.

The magnetic head of the present invention has the plurality of the magnetic head chips on the common substrate thereof, the magnetic head comprising: the reproduction signal amplifying circuit formed integrally with the substrate. Therefore, the S/N ratio of the reproduction signal can be improved and the number of connections between the coils of the magnetic head chips and an external electric circuit can significantly be decreased.

The magnetic head of the present invention has, on the substrate thereof, the plurality of the magnetic head chips each having the coil, the magnetic head comprising: the means for reciprocating the substrate in the direction in which the head chips are disposed, wherein the substrate is reciprocated in the direction, in which the head chips are disposed, at the amplitude shorter than the shortest recording wavelength of the magnetic recording medium and as well as at the speed sufficiently higher than the speed at which the magnetic recording medium is moved so that the signal recorded on the magnetic recording medium is reproduced. Therefore, a reproduction signal having sufficiently high level voltage can be obtained even if the number of turns of the coil is too small and even if the relative speed between the recording medium and the magnetic head is unsatisfactory. Further, the size of the actuator required in the reciprocating means can be reduced.

The magnetic head of the present invention has the plurality of the magnetic head chips formed on the common substrate thereof, the magnetic head comprising: the means for causing the direction in which the magnetic head chips are disposed on the substrate to be diagonal with respect to the direction in which the magnetic recording medium is moved; and the means for rotating the substrate around the axis perpendicular to the recording surface, wherein the substrate is rotated by the rotating means to reproduce the signal recorded on the magnetic recording medium while making the magnetic gap of at least one magnetic head chip to coincide with each track of the magnetic recording medium. Therefore, reproduction can be performed while eliminating an influence of the change of the track width occurring due to expansion/contraction of the width of the tape caused from the temperature change and an influence of the change of the track angle.

The magnetic head of the present invention has the plurality of magnetic head chips formed on the common substrate thereof, the magnetic head comprising: the means for causing the direction in which the magnetic head chips are disposed on the substrate to be diagonal with respect to the direction in which the magnetic recording medium is moved; the means for rotating the substrate around the axis perpendicular to the recording surface; and the means for translating the substrate in the direction of the width of the magnetic recording medium, wherein the substrate is translated and rotated by the translating means and the rotating means to reproduce the signal recorded on the magnetic recording medium while making the magnetic gap of at least one magnetic head chip to coincide with the direction of each track of the magnetic recording medium. Therefore, reproduction can be performed while eliminating an influence of the change of the track width occurring due to expansion/contraction of the width of the tape caused from the temperature change and an influence of the change of the track angle. Further, even if deviation in the direction of the width of the magnetic recording medium takes place in the positional relationship between the magnetic recording medium and the magnetic head, it can be modified and reproduction can be performed.

The magnetic head of the present invention comprises: the plurality of magnetic head chips formed on the common substrate thereof, wherein the direction in which the magnetic head chips are disposed on the substrate is caused to be diagonal with respect to the direction in which the magnetic recording medium is moved, and the plurality of the substrates are disposed in the direction of the magnetic recording medium, the substrate having, in the direction in which the magnetic head chips are disposed, the length shorter than the width of the recording medium when the length is projected to the direction of the width of the magnetic recording medium. Therefore, the length of the magnetic head in the direction, in which the magnetic recording medium is moved, can be shortened, the contact area can be decreased and the movement resistance of the magnetic recording medium can be reduce.

The magnetic head of the present invention comprises: the plurality of the magnetic head chips formed on the common substrate thereof, wherein the plurality of the substrates, on which all magnetic gaps of the magnetic head chips are made to be the same angle, are disposed in the direction in which the magnetic recording medium is moved, and the substrates are disposed in such a manner that at least the two angles are made by directions in which the magnetic head chips are disposed from the direction in which the magnetic recording medium is moved so that at least the two azimuth angles are made. Therefore, a desired azimuth angle can easily be given to the magnetic head and it can easily be manufactured.

The magnetic head of the present invention comprises: the plurality of the magnetic head chips on the common substrate thereof, wherein the shape of the substrate on the side adjacent to the magnetic recording medium sliding surface is the curved surface in the direction in which the magnetic head chips are disposed, and the curved surface projects toward the magnetic recording medium. Therefore, excellent contact of the magnetic recording medium with respect to the magnetic head can be realized.

What is claimed is:

1. A magnetic structure comprising a substrate having a plurality of ridge-like projections, each of said projections having slant side surfaces, adjacent slant side surfaces which oppose each other defining opposed slant side surfaces, said plurality of projections including a first subset of long projections having a first length and a second subset of short projections having a second length shorter than said first length, said long and short projections being arranged in an alternating fashion with nearest neighboring short projections being separated from one another by a respective one of the long projections, a short projection and an adjacent long projection defining a groove-shape recess therebetween;
   a first plurality of parallel and conductive passages formed on opposed slant side surfaces of adjacent long and short projections;
   a first insulating layer stacked on said first plurality of conductive passages and said substrate;
   a magnetic core made of magnetic material enclosed in said recess;
   a second insulating layer stacked on said magnetic core; and
   a second plurality of conductive passages formed on said second insulating layer to sequentially connect ends of said first plurality of conductive passages to form a helical coil.

2. A magnetic structure comprising a substrate having a plurality of ridge-like projections, each of said projections having slant side surfaces, adjacent slant side surfaces which oppose each other defining opposed slant side surfaces, said plurality of projections including a first subset of long projections having a first length and a second subset of short projections having a second length shorter than said first length, said long and short projections being arranged in an alternating fashion with nearest neighboring short projections being separated from one another by a respective one of the long projections, a short projection and an adjacent long projection defining a groove-shape recess therebetween;
   a first plurality of parallel and conductive passages each of which is formed on opposing slant surfaces of adjacent projections and on a bottom surface between said slant surfaces;
   a first insulating layer stacked on said first plurality of conductive passages and said substrate;
   a magnetic core made of magnetic material enclosed in a groove-shape recess formed by said adjacent projections and said bottom surface;
   a second insulating layer stacked on said magnetic core; and
   a second plurality of conductive passages formed on said second insulating layer to sequentially connect ends of said first plurality of conductive passages to form a helical coil, wherein said magnetic core is separated from adjacent cores by said adjacent projections so that a plurality of coils are integrally formed on the same substrate.

3. A magnetic structure comprising a second magnetic core made of magnetic material formed on said first and second plurality of conductive passages according to claim 2 while interposing a non-magnetic insulating layer for forming said magnetic gap, wherein a plurality of magnetic head chips are integrally formed on the same substrate.

4. A magnetic structure comprising:
   a substrate having a plurality of ridge-like projections each having slant side surfaces, adjacent slant side surfaces which oppose each other defining opposed slant side surfaces, said plurality of projections including a first subset of long projections having a first length and a second subset of short projections having a second length shorter than said first length disposed in such a manner that a respective one of said long projections is disposed laterally adjacent one side of each of said short projections and a respective another of said long projections is disposed laterally adjacent another side of said each of said short projections;
   a first plurality of conductive passages formed on opposing slant surfaces of a short projection and one of its laterally adjacent long projections and on a bottom surface between said slant surfaces;
   a first insulating layer stacked on said first plurality of conductive passages and said substrate;
   a magnetic core made of magnetic material enclosed in a groove-shape recess formed by said short projection and one of its laterally adjacent long projections and said bottom surface;
   a magnetic gap made of magnetic material formed in said magnetic core on the side adjacent to a magnetic recording medium sliding surface;
   a second insulating layer stacked on said magnetic core; and
   a second plurality of conductive passages formed on said second insulating layer to sequentially connect ends of said first plurality of conductive passages and to join a first conductive passage formed on one side of a short projection with a first conductive passage formed on another side of said short projection into one helical coil, wherein
   said magnetic core is separated by said long projections so that a plurality of magnetic head chips are integrally formed on the same substrate.

5. A magnetic structure comprising:
   a substrate having a plurality of ridge-like projections, each of said projections having slant side surfaces, adjacent slant side surfaces which oppose each other defining opposed slant side surfaces, said plurality of projections including a first subset of long projections having a first length and a second subset of short projections having a second length shorter than said first length, said long and short projections being arranged in an alternating fashion with nearest neighboring short projections being separated from one another by a respective one of the long projections, a short projection and an adjacent long projection defining a groove-shape recess therebetween;
   a first plurality of parallel and conductive passages each of which is formed on opposing slant surfaces of adjacent projections and the bottom surface between said slant surfaces;
   a first insulating layer stacked on said first plurality of conductive passages and said substrate;
   a first magnetic core made of magnetic material enclosed in a groove-shape recess formed by said adjacent projections and said bottom surface;

a second plurality of conductive passages formed on said first magnetic core while interposing a second insulating layer to sequentially connect ends of said first plurality of conductive passages, so as to form helical coils;

a non-magnetic insulating layer stacked on said first magnetic core on the side adjacent to a magnetic recording medium sliding surface and on said second plurality of conductive passages to form a magnetic gap;

a third plurality of conductive parallel passages formed on said non-magnetic insulating layer;

a third insulating layer stacked on said third plurality of conductive passages;

a second magnetic core made of magnetic material stacked to be formed into ridge-like projections each having slant surfaces on said non-magnetic insulating layer and said third insulating layer;

a fourth insulating layer stacked on the two side surfaces and the top surface of said second magnetic core; and a fourth plurality of conductive passages formed on said fourth insulating layer to form helical coils by sequentially connecting said ends of said plurality of third conductive passage, wherein a plurality of magnetic head chips are integrally formed.

6. A magnetic structure according to any one of claims 1, 2, 4 and 5, wherein said first plurality of conductive passages is formed from the bottom surface of said groove-shape recess to the two side surfaces and the top surface of the same.

7. A magnetic structure according to claim 6, wherein said first plurality of conductive passages is at least formed in a groove portion formed from the bottom surface of said substrate to said side surfaces of adjacent projections.

8. A magnetic structure according to any one of claims 1, 2, 4, 5, and 3, wherein said first plurality of conductive passages is formed from a recess formed on the top surface of the two side surfaces of adjacent projections and the top surface of the groove-shape recess.

9. A magnetic structure according to claim 8, wherein said first plurality of conductive passages is at least formed in a groove portion formed from the bottom surface of said substrate to said side surfaces of adjacent projections.

10. A magnetic structure according to any one of claims 1, 2, 4, 5, and 3, wherein said first plurality of conductive passages is at least formed in a groove portion formed from the bottom surface of said substrate to said side surfaces of adjacent projections.

* * * * *